(12) United States Patent
Humfeld

(10) Patent No.: US 10,851,215 B2
(45) Date of Patent: *Dec. 1, 2020

(54) GRAPHENE-AUGMENTED COMPOSITE MATERIALS

(71) Applicant: The Boeing Company, Chicago, IL (US)

(72) Inventor: Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,463

(22) Filed: Jul. 16, 2019

(65) Prior Publication Data

US 2019/0338087 A1 Nov. 7, 2019

Related U.S. Application Data

(63) Continuation of application No. 15/948,674, filed on Apr. 9, 2018, now Pat. No. 10,400,075, which is a
(Continued)

(51) Int. Cl.
*C08J 5/04* (2006.01)
*C08K 9/04* (2006.01)
(Continued)

(52) U.S. Cl.
CPC ............. *C08J 5/042* (2013.01); *C08J 5/005* (2013.01); *C08J 5/24* (2013.01); *C08K 9/04* (2013.01);
(Continued)

(58) Field of Classification Search
CPC ..... C08J 5/042; C08J 5/005; C08J 5/24; C08J 2379/04; C08J 2363/00; C08J 2379/08; C08K 9/04

See application file for complete search history.

(56) References Cited

U.S. PATENT DOCUMENTS 5,181,421 A 1/1993 Kline
7,832,983 B2 11/2010 Kruckenberg
(Continued)

FOREIGN PATENT DOCUMENTS

CN 102409528 A 4/2012
CN 103015157 A 4/2013
(Continued)

OTHER PUBLICATIONS

Office Action dated Jul. 13, 2017 in U.S. Appl. No. 14/589,007.
(Continued)

*Primary Examiner* — Kyoung Lee
(74) *Attorney, Agent, or Firm* — Ostrager Chong Flaherty & Broitman P.C.

(57) ABSTRACT

Graphene fibers made from a graphene film formed into an elongated fiber-like shape and composite materials made from the graphene fibers. The elongated fiber-like shape may be the graphene film in a rolled spiral orientation or the graphene film in a twisted formation. The graphene film has imide groups formed on at least an outer surface of the graphene film. Methods of increasing strength of a composite material include combining a resin matrix with a plurality of the graphene fibers to form a prepreg material and curing the prepreg material to form the composite material.

22 Claims, 37 Drawing Sheets

Related U.S. Application Data continuation of application No. 15/297,363, filed on Oct. 19, 2016, now Pat. No. 9,963,562, which is a continuation of application No. 14/865,820, filed on Sep. 25, 2015, now Pat. No. 9,518,160, which is a continuation-in-part of application No. 14/589,085, filed on Jan. 5, 2015, now Pat. No. 9,421,739, and a continuation-in-part of application No. 14/589,057, filed on Jan. 5, 2015, now Pat. No. 9,434,826, and a continuation-in-part of application No. 14/589,007, filed on Jan. 5, 2015, now Pat. No. 10,266,677, and a continuation-in-part of application No. 14/589,036, filed on Jan. 5, 2015.

(51) Int. Cl.
C08J 5/24 (2006.01)
C08J 5/00 (2006.01)

(52) U.S. Cl.
CPC ........ C08J 2363/00 (2013.01); C08J 2379/04 (2013.01); C08J 2379/08 (2013.01)

(56) References Cited

U.S. PATENT DOCUMENTS

| | | | |
|---|---|---|---|
| 8,361,321 | B2 | 1/2013 | Stetson et al. |
| 8,647,548 | B1 | 2/2014 | Humfeld |
| 8,715,609 | B2 | 5/2014 | Humfeld et al. |
| 9,963,562 | B2 * | 5/2018 | Humfeld ............... C08K 9/04 |
| 2009/0124705 | A1 | 5/2009 | Meyer |
| 2011/0017587 | A1 | 1/2011 | Zhamu et al. |
| 2011/0052813 | A1 | 3/2011 | Ho |
| 2011/0281070 | A1 | 11/2011 | Mittal |
| 2012/0077020 | A1 | 3/2012 | Muramatsu |
| 2012/0088864 | A1 | 4/2012 | Wang |
| 2012/0298396 | A1 | 11/2012 | Hong et al. |
| 2012/0330044 | A1 | 12/2012 | Hou et al. |
| 2013/0034724 | A1 | 2/2013 | Sodano |
| 2013/0164498 | A1 | 6/2013 | Langone |
| 2014/0050920 | A1 | 2/2014 | Ray |
| 2014/0121350 | A1 | 5/2014 | You et al. |
| 2014/0308517 | A1 | 10/2014 | Zhamu et al. |
| 2015/0004667 | A1 | 1/2015 | McKinney |
| 2015/0031818 | A1 | 1/2015 | Moser |
| 2015/0079340 | A1 | 3/2015 | Bullock |

FOREIGN PATENT DOCUMENTS

| | | |
|---|---|---|
| CN | 103614902 A | 3/2014 |
| CN | 103396586 B | 11/2014 |
| JP | 2008248457 A | 10/2008 |
| KR | 101436500 B1 | 10/2014 |
| WO | 2007130979 A2 | 11/2007 |
| WO | 2012058553 A2 | 5/2012 |
| WO | 2012094634 A2 | 7/2012 |
| WO | 2012094634 A3 | 7/2012 |
| WO | 2013191809 A1 | 12/2013 |
| WO | 2014172619 A1 | 10/2014 |

OTHER PUBLICATIONS

Lin et al., Bulk preparation of holey graphene via controlled catalytic oxidation, Nanoscale, 20113, 5 Page 7814-7824.
Fang et al., "Constructing hierarchically structured interphases for strong and tough epoxy nanocomposites by amine-rich graphene surfaces." Journal of Materials Chemistry, vol. 20, No. 43, Sep. 20, 2010, pp. 9635-9643.
Office Action dated Aug. 24, 2017 in U.S. Appl. No. 14/589,036.
Kuila et al., "Chemical Functionalization of Graphene and its Applications," Progress in Materials Science, vol. 50 (Mar. 30, 2012), pp. 1061-1105.
Office Action dated Feb. 9, 2018 in U.S. Appl. No. 14/589,036.
Office Action dated Jan. 23, 2019 in U.S. Appl. No. 14/589,036.
Eaton et al., "Nano-reinforcement of Resin Infused Carbon Fibre Laminates using Carbon Nano-tubes and Graphene", 3 pages, published Oct. 14, 2014.
Fang et al., "Constructing hierarcchically structured interphases for strong and tough epoxy nanocomposites by amine-rich graphene surfaces", The Royal Society of Chemistry 2010, J. Mater. Chem., 2010, 20, 9635-9643.
Hahn et al., "Graphite Nanoplatelet Composites and Their Applications", Chapter 7 of "Comosite Materials: A Vision 'for the Future", pp. 169-186, Springer-Verig London Limited 2011.
Matei, Dan G. et al., "Functional Single-Layer Graphene Sheets from Aromatic Monolayers," Advanced Materials, 2013, 25, 4146-4151, Wiley-VCH Verlag GmbH & Co. KGaA, Weinhein, Germany.
Bhimanapati, Ganesh R., et al., "Heterogeneous Boron Nitride and Graphene Oxide: A New 2D Material System," Department of Materials Science and Engineering, Center for 2-Dimensional and Layered Materials, Penn State University, Pennsylvania, United States.
Stenzenberger, Horst, Technochemie GmbH, Germany, Bismaleimide Resins/BMI Resin Chemistry.
"HexPly(R) F650 A Bismaleimide Resin for Advanced Composites", Product Data Sheet, October 2005, Hexcel Corporation, Stamford, Connecticut.
U.S.P.T.O. Office Action in co-pending U.S. Appl. No. 14/589,057, dated Nov. 20, 2015.
European Search Report in corresponding application No. EP 15188442.6, dated Apr. 6, 2016.
European Search Report in related application No. EP 15188441.8, dated May 20, 2016, of The Boeing Company.
Database WPI, Week 201433, Thomson Scientific, London, GB; AN 2014-H03644, XP002757211, Shanghai Inst. Technology, Mar. 5, 2014.
Database WPI, Week 201474, Thomson Scientific, London, GB; AN 2014-U10828, XP002757154, Korea Inst. Machinery & Materials, Oct. 17, 2014.
Database WPI, Week 201251, Thomson Scientific, London, GB; AN 2012-E63084, XP002757212, Harbin Inst. Technology, Apr. 11, 2012.
Database WPI, Week 201370, Thomson Scientific, London, GB; AN 2013-P18120, XP002757215, Univ. Tianjin Polytechnic, Apr. 3, 2013.
Database WPI, Week 200876, Thomson Scientific, London, GB; AN 2008-M91181, XP002757213, Mitsui Bussan KK, Oct. 16, 2008.
European Search Report in related application No. EP 15188443.4, dated May 13, 2016, of The Boeing Company.
Federico, Bosia et al., "In Silico Tensile Tests and Design of Hierarchical Graphene Fibres and Composites," Physica Status Solidi. B, Basic Research, vol. 250, No. 8, Jul. 24, 2013, pp. 1492-1495.
USPTO Office Action dated Jun. 23, 2016 in U.S. Appl. No. 14/865,820.
Non-Final Office Action dated Jun. 29, 2020 in U.S. Appl. No. 16/294,568.

* cited by examiner

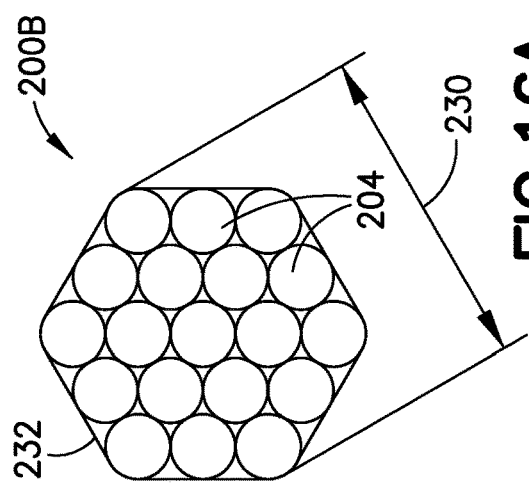
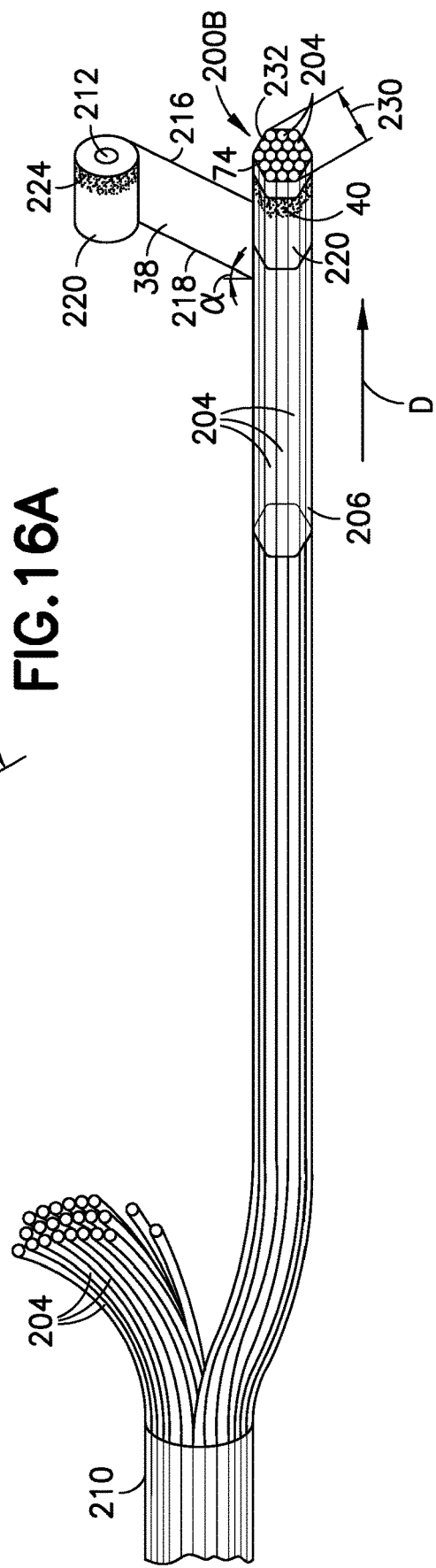
FIG. 16A
FIG. 16

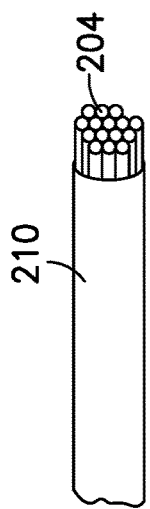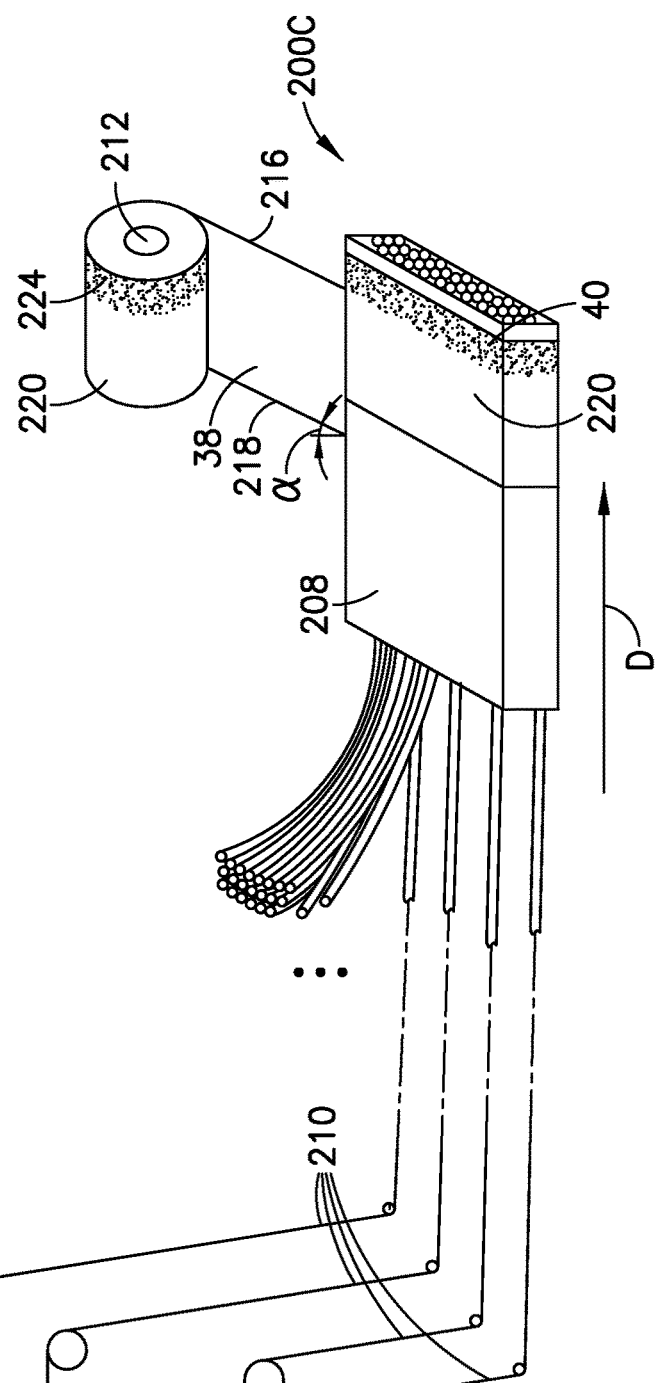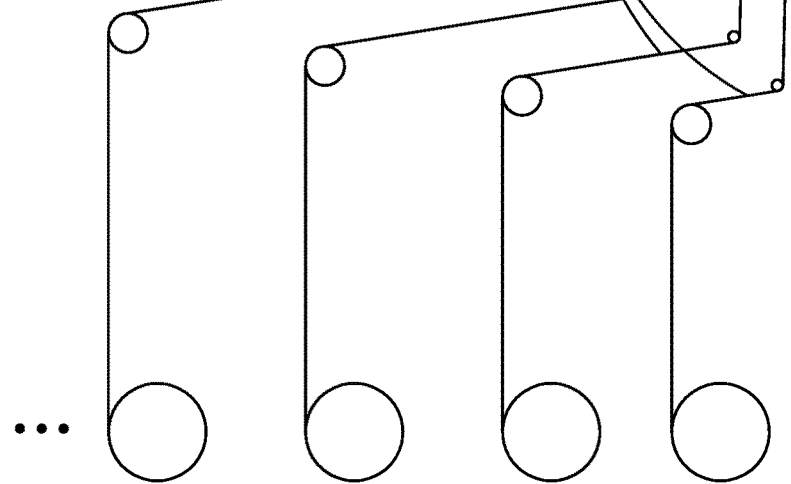
FIG. 17A
FIG. 17

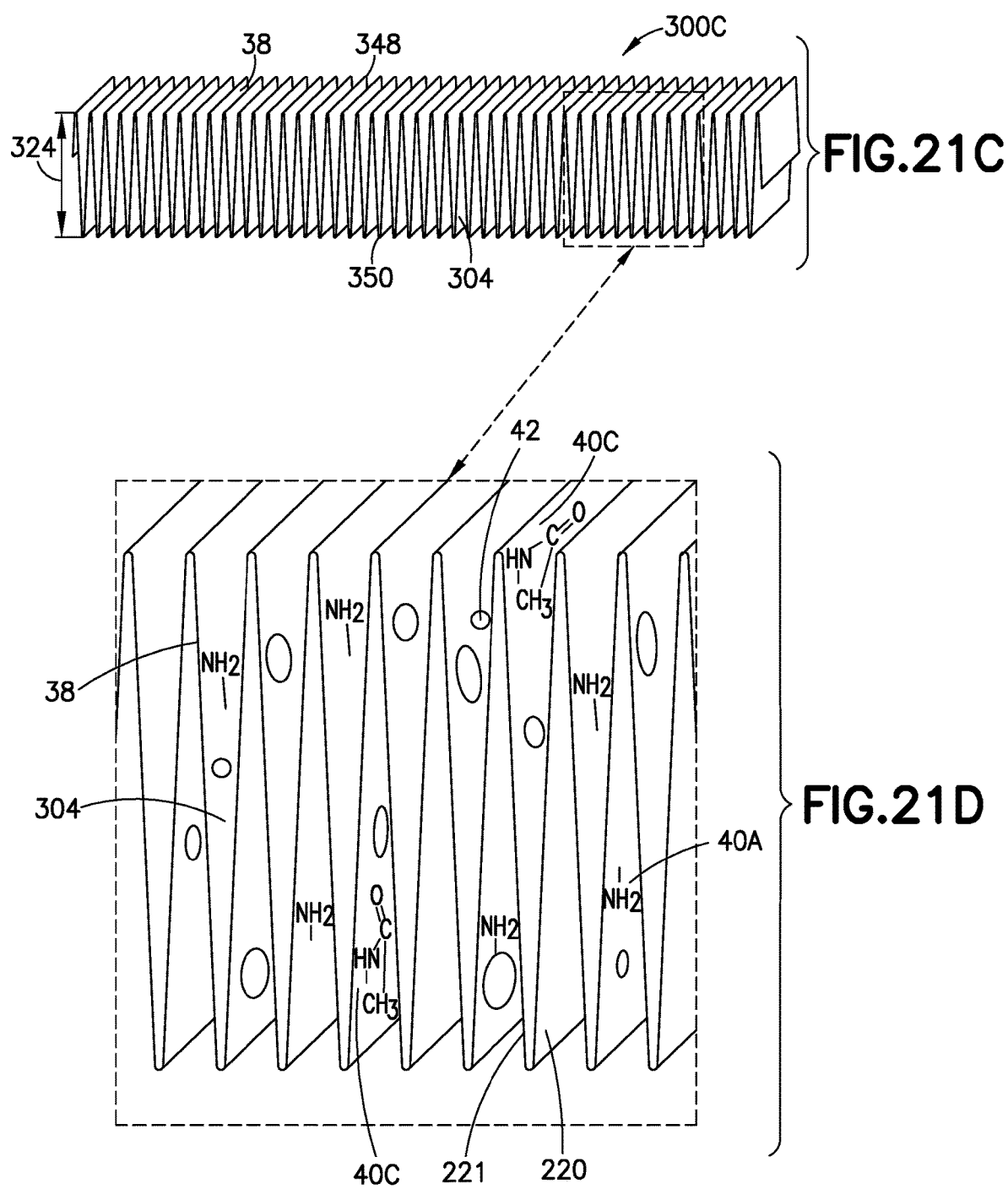

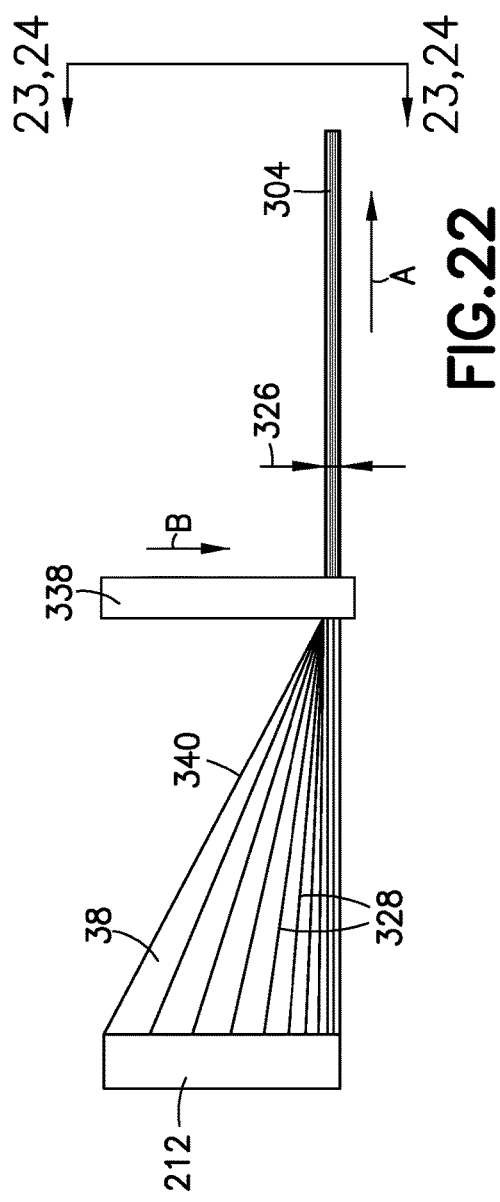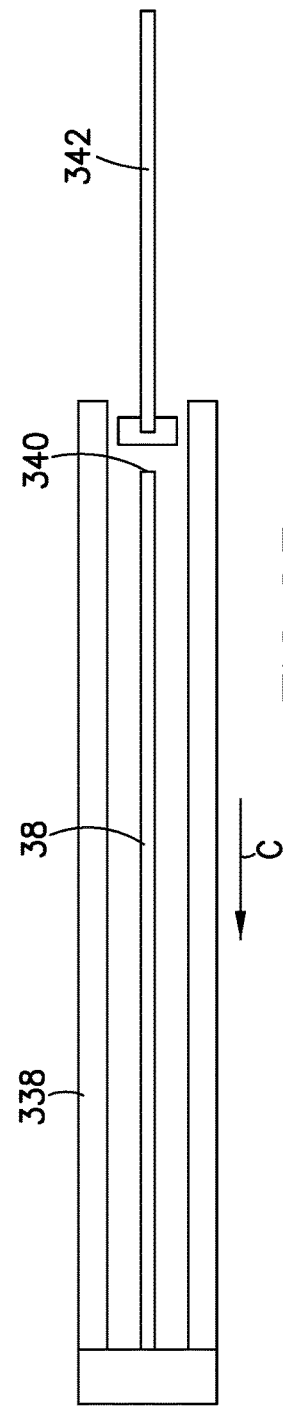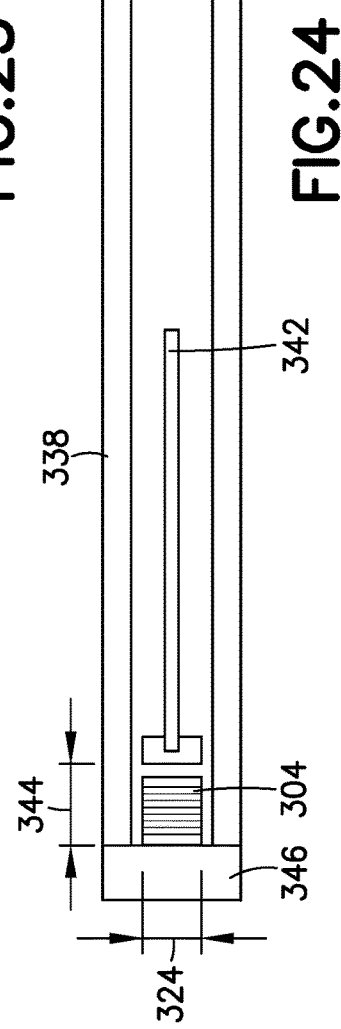

GRAPHENE-AUGMENTED COMPOSITE MATERIALS

CROSS-REFERENCE TO RELATED APPLICATIONS

This application is a continuation of U.S. patent application Ser. No. 15/948,674 filed Apr. 9, 2018, which is a continuation of U.S. patent application Ser. No. 15/297,363 filed Oct. 19, 2016 (now U.S. Pat. No. 9,963,562), which is a continuation of U.S. patent application Ser. No. 14/865,820 filed Sep. 25, 2015 (now U.S. Pat. No. 9,518,160), which is a continuation-in-part of U.S. patent application Ser. No. 14/589,007 filed Jan. 5, 2015 (now U.S. Pat. No. 10,266,677) and a continuation-in-part of U.S. patent application Ser. No. 14/589,057 filed Jan. 5, 2015 (now U.S. Pat. No. 9,434,826), and a continuation-in-part of U.S. patent application Ser. No. 14/589,085 filed Jan. 5, 2015 (now U.S. Pat. No. 9,421,739), and a continuation-in-part of U.S. patent application Ser. No. 14/589,036 filed Jan. 5, 2015, the disclosures of which are incorporated herein by reference thereto.

TECHNICAL FIELD

This disclosure generally relates to composite materials augmented with graphene, composite structures including component parts made from graphene-augmented composite materials, and methods for manufacturing graphene-augmented composite materials and composite structures with component parts made from graphene-augmented composite materials.

BACKGROUND

Composite materials are used in the manufacture of a wide variety of structures and component parts due to their high strength and rigidity, low weight, corrosion resistance and other favorable properties. For example, in the aerospace industry, composite materials are becoming widely used to manufacture aerospace structures and component parts for aerospace structures such as aircraft ribs, spars, panels, fuselages, wings, wing boxes, fuel tanks, tail assemblies and other component parts of an aircraft because they are lightweight and strong, and therefore provide fuel economy and other benefits. As used herein, the term "composite structure" means a structure that is manufactured, fabricated or assembled, in whole or in part, from one or more component parts made from composite materials (i.e., composite components) including, without limitation, aerospace structures.

One type of composite material commonly used in the aerospace industry is carbon fiber reinforced plastic ("CFRP"). CFRP generally comprises one or more composite layers or plies laminated together to form a sheet, laminate or layup. Each of the composite layers or plies comprises a reinforcement material and a matrix material. The matrix material surrounds, binds and supports the reinforcement material, and is generally a non-conductive polymer such as an epoxy resin. For aerospace applications, an aerospace grade resin is used, typically having four (4) or more epoxide groups in each epoxy monomer molecule to form multiple connections. The reinforcement material provides structural strength to the matrix material and the CFRP, and generally consists of strands of carbon fiber, which are electrically conductive.

It is desirable to increase the amount of carbon in CFRP to further improve mechanical and/or electrical properties of composite structures without increasing weight or disturbing other desirable properties. But, simply increasing the amount of carbon fiber reinforcement material in CFRP does not meet this goal and is not cost efficient. Other forms of carbon, such as graphene, which has exceptional mechanical strength and thermal conductivity, would have beneficial effects in composite structures. Graphene is a hexagonal array of carbon atoms extending over two dimensions (i.e., it is one atom thick) that is typically produced in small flakes (or nanoplatelets). Each carbon atom in graphene is covalently bonded to three other carbon atoms, providing exceptional strength. However, mixing graphene into an epoxy resin or other aerospace grade resin comprising carbon fibers makes the resin weaker to strain in every direction because graphene will not bond with the carbon fibers and does not interact much with the resin.

Accordingly, there is room for improving the mechanical and electrical properties of composite structures and related methods for manufacturing composite structures that provide advantages over known composite structures and manufacturing methods.

SUMMARY

The foregoing purposes, as well as others, are achieved by integrating functionalized graphene into CFRP composite materials as a supplement to or as a replacement for carbon reinforcement fibers, resin matrix material, or both, and in embodiments that employ a resin matrix material, matching the chemistry of the resin matrix material with the chemistry of the graphene functionalization to provide multiple bonding connections. As used herein, functionalized graphene means any form, shape and size of graphene that is chemically augmented to provide additional functionality, such as functionalized graphene nanoplatelets (GNP), functionalized graphene sheets and functionalize graphene films.

Functionalized graphene may be functionalized by various chemical and physical enhancements to the surface(s) and/or edges of the graphene. For example, functionalized graphene may be formed with amine groups on one or more surfaces of the functionalized graphene, epoxide groups on at least one edge of the functionalized graphene and/or holes formed through the functionalized graphene. In other embodiments, functionalized graphene may be formed with imide groups, or a combination of amine groups and imide groups, or benzoxazine groups, on one or more surfaces of the functionalized graphene and/or holes formed through the functionalized graphene. Epoxide groups are not necessary with imide group functionalization. Alternatively, functionalized graphene may be formed with benzoxazine groups on one or more surfaces of the functionalized graphene, epoxide groups on at least one edge of the functionalized graphene and/or holes formed through the functionalized graphene.

In embodiments that employ a matrix material, the chemistry of the matrix material is matched to the chemistry of the surface functionalization on the functionalized graphene to form multiple strong bonds between the matrix material and the functionalized graphene, therefore overcoming prior difficulties of compositing graphene with aerospace-grade and other resins. When the surface functionalization is added amine groups, the matrix material comprises an epoxy resin such that the amine groups on the surface of the functionalized graphene form strong bonds with epoxide groups in the epoxy resin matrix material and the epoxide groups in the functionalized graphene form strong bonds with amine groups in the epoxy resin matrix material. When the surface functionalization is added imide groups, or a combination of amine groups and imide groups, the matrix material comprises a bismaleimide (BMI) resin such that multiple BMI monomers in the BMI resin are reacted to the imide groups and/or amine groups in the functionalized graphene and thus covalently bonded to the graphene, forming a macromolecular system with large, multiply-connected macromolecules. When the surface functionalization is added benzoxazine groups, the matrix material comprises a benzoxazine (BXA) resin such that the BXA resin polymerizes with the benzoxazine groups in the functionalized graphene to form a macromolecular system with large, multiply-connected macromolecules. Holes may be provided through the functionalized graphene to provide additional edges where epoxide groups can form and bond to amine groups in epoxy resins or benzoxazine groups in benzoxazine resins.

In a first embodiment, a composite material is disclosed comprising carbon reinforcement fibers and a matrix material. The matrix material comprises 0.1% to 100% by weight functionalized graphene nanoplatelets having imide groups formed on a surface of the graphene nanoplatelets, and may also have amine groups formed on the surface of the graphene nanoplatelets. The graphene nanoplatelets further comprise holes formed through the graphene nanoplatelets that are substantially circular and have a diameter of 1-2 nanometers. The matrix material comprises an aerospace-grade bismaleimide resin having 0.1% to 5.0% by weight functionalized graphene nanoplatelets. In one aspect of this embodiment, the graphene nanoplatelets form an interlayer between two layers of the bismaleimide resin, and the interlayer is a macromolecular complex of the bismaleimide resin. In another aspect of this embodiment, the matrix material comprises 100% by weight functionalized graphene nanoplatelets, and the matrix material is a macromolecular complex of the graphene nanoplatelets.

Another aspect of this embodiment is a method of increasing strength of a composite material comprising carbon reinforcement fibers and a resin matrix material. The method comprises the steps of mixing functionalized graphene nanoplatelets into the resin matrix material to form a graphene-resin mixture, the functionalized graphene nanoplatelets having imide groups formed on a surface of the graphene nanoplatelets; combining the graphene-resin mixture with a plurality of the carbon reinforcement fibers to form a prepreg material; and curing the prepreg material to form the composite material.

In another, but related, method of increasing strength of a composite material comprising carbon reinforcement fibers and a resin matrix material, the method comprises the steps of combining the resin mixture with a plurality of the carbon reinforcement fibers to form a prepreg material; depositing functionalized graphene nanoplatelets onto a top surface of the prepreg material to form a graphene interlayer, the functionalized graphene nanoplatelets having imide groups formed on a surface of the graphene nanoplatelets; laying a second prepreg material on top of the graphene interlayer; and curing the prepreg material, the graphene interlayer and the second prepreg material to form the composite material.

In yet another, but related, method of increasing strength of a composite material comprising carbon reinforcement fibers and a resin matrix material, the method comprises the steps of forming a bed of the carbon reinforcement fibers; depositing functionalized graphene nanoplatelets through a top surface of the bed of the carbon reinforcement fibers to penetrate the entire bed of fibers and form a carbon fiber/graphene prepreg material, the functionalized graphene nanoplatelets having imide groups formed on a surface of the graphene nanoplatelets; and curing the carbon fiber/graphene prepreg material to form the composite material.

In a second embodiment, a composite material is disclosed comprising carbon reinforcement fibers and a matrix material. The matrix material comprises 0.1% to 100% by weight functionalized graphene nanoplatelets having benzoxazine groups formed on a surface of the graphene nanoplatelets and epoxide groups formed on at least one edge of the graphene nanoplatelets. The graphene nanoplatelets further comprise holes formed through the graphene nanoplatelets that are substantially circular and have a diameter of 1-2 nanometers. The matrix material comprises an aerospace-grade benzoxazine resin having 0.1% to 5.0% by weight functionalized graphene nanoplatelets wherein the graphene nanoplatelets are present throughout benzoxazine resin and the benzoxazine resin is a macromolecular complex. In one aspect of this embodiment, the graphene nanoplatelets form an interlayer between two layers of the benzoxazine resin, and the interlayer is a macromolecular complex of the benzoxazine resin. In another aspect of this embodiment, the matrix material comprises 100% by weight functionalized graphene nanoplatelets, and the matrix material is a macromolecular complex of the graphene nanoplatelets.

Another aspect of this embodiment is a method of increasing strength of a composite material comprising carbon reinforcement fibers and a resin matrix material. The method comprises the steps of mixing functionalized graphene nanoplatelets into the resin matrix material to form a graphene-resin mixture, the functionalized graphene nanoplatelets having benzoxazine groups formed on a surface of the graphene nanoplatelets and epoxide groups formed on at least one edge of the graphene nanoplatelets; combining the graphene-resin mixture with a plurality of the carbon reinforcement fibers to form a prepreg material; and curing the prepreg material to form the composite material.

In another, but related, method of increasing strength of a composite material comprising carbon reinforcement fibers and a resin matrix material, the method comprises the steps of combining the resin mixture with a plurality of the carbon reinforcement fibers to form a prepreg material; depositing functionalized graphene nanoplatelets onto a top surface of the prepreg material to form a graphene interlayer, the functionalized graphene nanoplatelets having benzoxazine groups formed on a surface of the graphene nanoplatelets and epoxide groups formed on at least one edge of the graphene nanoplatelets; laying a second prepreg material on top of the graphene interlayer; and curing the prepreg material, the graphene interlayer and the second prepreg material to form the composite material.

In yet another, but related, method of increasing strength of a composite material comprising carbon reinforcement fibers and a resin matrix material, the method comprises the steps of forming a bed of the carbon reinforcement fibers; depositing functionalized graphene nanoplatelets through a top surface of the bed of the carbon reinforcement fibers to penetrate the entire bed of fibers and form a carbon fiber/graphene prepreg material, the functionalized graphene nanoplatelets having benzoxazine groups formed on a surface of the graphene nanoplatelets and epoxide groups formed on at least one edge of the graphene nanoplatelets; and curing the carbon fiber/graphene prepreg material to form the composite material.

In a third embodiment, a graphene-augmented carbon fiber comprises a functionalized graphene film disposed about at least one carbon fiber filament, the functionalized graphene film having imide groups formed on an outer surface of the graphene film. The functionalized graphene film is wrapped about the carbon fiber filament in a spiral orientation to a thickness of about 0.1 to about 3.0 microns to form about 300 to about 9,000 layers of the functionalized graphene film on top of the carbon fiber filament. The imide groups are formed in a functionalized area on the outer surface of the functionalized graphene film that is within about 10 microns from at least one edge of the functionalized graphene film. The functionalized graphene film is about 0.5 microns to about 100 microns wide and comprises at least one hole formed through the graphene film having a diameter of 1-2 nanometers.

In one aspect of this embodiment, the functionalized graphene film is wrapped around a single carbon fiber filament. In another aspect, the functionalized graphene film is wrapped around a substantially cylindrical bundle of at least one of 7, 19, 37 or 61 carbon fiber filaments in a spiral orientation and comprises holes formed through the graphene film having a size of greater than about 100 carbon atoms.

In yet another aspect of this embodiment, a graphene-augmented bed of carbon fiber comprises a functionalized graphene film wrapped around a substantially rectangular bed of carbon fiber filaments separated from a plurality of carbon fiber tows, the functionalized graphene film having imide groups formed on an outer surface of the graphene film. The substantially rectangular bed of carbon fiber filaments is about 12 inches wide and about 250 microns thick, and comprises about 600,000 of the carbon fiber filaments. The functionalized graphene film is about 0.5 microns to about 100 microns wide, comprises substantially circular holes formed through the graphene film having a diameter of 1-20 nanometers, and is wrapped about the rectangular bed of carbon fiber filaments to a thickness of about 0.1 to about 3.0 microns to form about 300 to about 9,000 layers of the functionalized graphene film on top of the carbon fiber filaments.

A method of increasing strength of a composite material comprising carbon reinforcement fibers and a resin matrix material in accordance with this embodiment comprises the steps of forming imide groups on an outer surface of a graphene film to form a functionalized graphene film; wrapping the functionalized graphene film about each of the carbon reinforcement fibers in a spiral orientation to form graphene-augmented carbon fibers; combining the resin matrix material with a plurality of the graphene-augmented carbon fibers to form a prepreg material; and curing the prepreg material to form the composite material. In one aspect of this method, each of the carbon reinforcement fibers in the graphene-augmented carbon fibers comprises a carbon fiber filament. In another aspect, each of the carbon reinforcement fibers in the graphene-augmented carbon fibers comprises a substantially cylindrical bundle of at least one of 7, 19, 37 or 61 carbon fiber filaments. In yet another aspect of this method, each of the carbon reinforcement fibers in the graphene-augmented carbon fibers comprises a substantially rectangular bed of carbon fiber filaments separated from a plurality of carbon fiber tows. In each aspect of the method, the imide groups are formed on the outer surface of the graphene film in a functionalized area that is within about 10 microns from at least one edge of the graphene film, and the functionalized graphene film is wrapped about the carbon reinforcement fibers to a thickness of about 0.1 to about 3.0 microns to form about 300 to about 9,000 layers of the functionalized graphene film on top of the carbon fiber.

In a fourth embodiment, a graphene-augmented carbon fiber comprises a functionalized graphene film disposed about at least one carbon fiber filament, the functionalized graphene film having benzoxazine groups formed on an outer surface of the graphene film and epoxide groups formed on at least one edge of the graphene film. The functionalized graphene film is wrapped about the carbon fiber filament in a spiral orientation to a thickness of about 0.1 to about 3.0 microns to form about 300 to about 9,000 layers of the functionalized graphene film on top of the carbon fiber filament. The benzoxazine groups are formed in a functionalized area on the outer surface of the functionalized graphene film that is within about 10 microns from the at least one edge of the functionalized graphene film. The functionalized graphene film is about 0.5 microns to about 100 microns wide and comprises at least one hole formed through the graphene film having a diameter of 1-2 nanometers.

In one aspect of this embodiment, the functionalized graphene film is wrapped around a single carbon fiber filament. In another aspect, the functionalized graphene film is wrapped around a substantially cylindrical bundle of at least one of 7, 19, 37 or 61 carbon fiber filaments in a spiral orientation and comprises holes formed through the graphene film having a size of greater than about 100 carbon atoms. In yet another aspect of this embodiment, a graphene-augmented bed of carbon fiber comprises a functionalized graphene film wrapped around a substantially rectangular bed of carbon fiber filaments separated from a plurality of carbon fiber tows, the functionalized graphene film having benzoxazine groups formed on an outer surface of the graphene film and epoxide groups formed on at least one edge of the graphene film. The substantially rectangular bed of carbon fiber filaments is about 12 inches wide and about 250 microns thick, and comprises about 600,000 of the carbon fiber filaments. The functionalized graphene film is about 0.5 microns to about 100 microns wide, comprises substantially circular holes formed through the graphene film having a diameter of 1-20 nanometers, and is wrapped about the rectangular bed of carbon fiber filaments to a thickness of about 0.1 to about 3.0 microns to form about 300 to about 9,000 layers of the functionalized graphene film on top of the carbon fiber filaments.

A method of increasing strength of a composite material comprising carbon reinforcement fibers and a resin matrix material in accordance with this embodiment comprises the steps of forming benzoxazine groups on an outer surface of a graphene film and epoxide groups on at least one edge of the graphene film to form a functionalized graphene film; wrapping the functionalized graphene film about each of the carbon reinforcement fibers in a spiral orientation to form graphene-augmented carbon fibers; combining the resin matrix material with a plurality of the graphene-augmented carbon fibers to form a prepreg material; and curing the prepreg material to form the composite material. In one aspect of this method, each of the carbon reinforcement fibers in the graphene-augmented carbon fibers comprises a carbon fiber filament. In another aspect, each of the carbon reinforcement fibers in the graphene-augmented carbon fibers comprises a substantially cylindrical bundle of at least one of 7, 19, 37 or 61 carbon fiber filaments. In yet another aspect of this method, each of the carbon reinforcement fibers in the graphene-augmented carbon fibers comprises a substantially rectangular bed of carbon fiber filaments separated from a plurality of carbon fiber tows. In each aspect of the method, the functionalized graphene film is wrapped about the carbon reinforcement fibers to a thickness of about 0.1 to about 3.0 microns to form about 300 to about 9,000 layers of the functionalized graphene film on top of the carbon fiber.

In a fifth embodiment, a composite prepreg material comprises a plurality of layers of graphene film having a size that spans an entire width and an entire length of the composite prepreg material, each of the layers of graphene film being functionalized with holes formed through the graphene film and imide groups formed on both an upper and a lower surface of the graphene film. The layers of graphene film are stacked on top of one another such that upper and lower surfaces of adjacent layers of the graphene film are in contact. In one aspect of this embodiment, the graphene film is functionalized with holes having a size of about 6-19 carbon atoms and imide groups having a surface density on both the upper and the lower surface of the graphene film of about 4.0 E10 to about 4.0 E13 groups per square millimeter of the graphene film.

In another aspect of this embodiment, the graphene film is folded to form a crumpled graphene sheet having a height that spans an entire height of the composite prepreg material, and the holes in the graphene sheet have a size of greater than about 100 carbon atoms and imide groups having a surface density on both the upper and the lower surface of the graphene film of about 4.0 E10 to about 4.0 E13 groups per square millimeter of the graphene film.

In a method of making a composite prepreg material of this embodiment, a plurality of layers of graphene film are functionalized with holes formed through the graphene films and imide groups formed on both an upper and a lower surface of the graphene film and having a size that spans an entire width and an entire length of the composite prepreg material, and the layers are laminated to form the composite prepreg material. In one aspect of this method, the plurality of graphene layers are stacked on top of one another such that upper and lower surfaces of adjacent layers of the graphene film are in contact. In another aspect, the plurality of graphene layers are formed by folding the graphene film to form a crumpled graphene sheet having a height that spans an entire height of the composite prepreg material.

In a sixth embodiment, a composite prepreg material comprises a plurality of layers of graphene film having a size that spans an entire width and an entire length of the composite prepreg material, each of the layers of graphene film being functionalized with holes formed through the graphene film, benzoxazine groups formed on both an upper and a lower surface of the graphene film and/or epoxide groups formed on at least one edge of the graphene film. The layers of graphene film are stacked on top of one another such that upper and lower surfaces of adjacent layers of the graphene film are in contact. In one aspect of this embodiment, the graphene film is functionalized with holes having a size of about 6-19 carbon atoms and imide groups having a surface density on both the upper and the lower surface of the graphene film of about 4.0 E10 to about 4.0 E13 groups per square millimeter of the graphene film.

In another aspect of this embodiment, the graphene film is folded to form a crumpled graphene sheet having a height that spans an entire height of the composite prepreg material, and the holes in the graphene sheet have a size of greater than about 100 carbon atoms and benzoxazine groups having a surface density on both the upper and the lower surface of the graphene film of about 4.0 E10 to about 4.0 E13 groups per square millimeter of the graphene film.

In a method of making a composite prepreg material of this embodiment, a plurality of layers of graphene film are functionalized with holes formed through the graphene films, benzoxazine groups formed on both an upper and a lower surface of the graphene film and/or epoxide groups formed on at least one edge of the graphene film. The graphene film has a size that spans an entire width and an entire length of the composite prepreg material, and the layers are laminated to form the composite prepreg material. In one aspect of this method, the plurality of graphene layers are stacked on top of one another such that upper and lower surfaces of adjacent layers of the graphene film are in contact. In another aspect, the plurality of graphene layers are formed by folding the graphene film to form a crumpled graphene sheet having a height that spans an entire height of the composite prepreg material.

In a seventh embodiment, a graphene fiber comprises a graphene film formed into an elongated fiber-like shape and imide groups formed on at least an outer surface of the graphene film. In one aspect of this embodiment, the elongated fiber-like shape comprises the graphene film in a rolled spiral orientation, and the imide groups are formed in a functionalized area on the outer surface of the graphene film that is within about 10 microns from the at least one edge of the graphene film. The graphene fiber of this aspect has a diameter of about 1 to about 7 microns, a circumference of about 3 to about 22 microns, and a center hollow area having a diameter of less than 500 nanometers. The spiral orientation comprises the graphene film rolled at an angle less than 0.6 degrees and overlapping layers of the graphene film. In another aspect of this embodiment, the elongated fiber-like shape comprises the graphene film in a twisted formation, and the graphene film further comprises at least one hole formed through the graphene film. The elongated fiber-like shape can be combined with a matrix material to form a composite material.

A method of increasing strength of a composite material in accordance with this embodiment comprises forming a graphene fiber comprising a graphene film formed into an elongated fiber-like shape and having imide groups formed on at least an outer surface of the graphene film; combining a resin matrix material with a plurality of the graphene fibers to form a prepreg material; and curing the prepreg material to form the composite material. In one aspect of the method, the step of forming the graphene fiber comprises rolling the graphene film in a spiral orientation to form the elongated fiber-like shape of the graphene fiber. In another aspect of the method, the step of forming the graphene fiber comprises twisting the graphene film to form the elongated fiber-like shape and forming at least one hole in the graphene film. The method further comprises combining carbon fiber with the graphene fiber to form a prepreg material.

In an eighth embodiment, a graphene fiber comprises a graphene film formed into an elongated fiber-like shape, benzoxazine groups formed on at least an outer surface of the graphene film and epoxide groups formed on at least one edge of the graphene film. In one aspect of this embodiment, the elongated fiber-like shape comprises the graphene film in a rolled spiral orientation, and the benzoxazine groups are formed in a functionalized area on the outer surface of the graphene film that is within about 10 microns from the at least one edge of the graphene film. The graphene fiber of this aspect has a diameter of about 1 to about 7 microns, a circumference of about 3 to about 22 microns, and a center hollow area having a diameter of less than 500 nanometers. The spiral orientation comprises the graphene film rolled at an angle less than 0.6 degrees and overlapping layers of the graphene film. In another aspect of this embodiment, the elongated fiber-like shape comprises the graphene film in a twisted formation, and the graphene film further comprises at least one hole formed through the graphene film. The elongated fiber-like shape can be combined with a matrix material to form a composite material.

A method of increasing strength of a composite material in accordance with this embodiment comprises forming a graphene fiber comprising a graphene film formed into an elongated fiber-like shape, benzoxazine groups formed on at least an outer surface of the graphene film and epoxide groups formed on at least one edge of the graphene film; combining a resin matrix material with a plurality of the graphene fibers to form a prepreg material; and curing the prepreg material to form the composite material. In one aspect of the method, the step of forming the graphene fiber comprises rolling the graphene film in a spiral orientation to form the elongated fiber-like shape of the graphene fiber. In another aspect of the method, the step of forming the graphene fiber comprises twisting the graphene film to form the elongated fiber-like shape and forming at least one hole in the graphene film. The method further comprises combining carbon fiber with the graphene fiber to form a prepreg material.

Composite structures, including aerospace structures, comprising component parts made with composite materials having the disclosed functionalized graphene, aircraft comprising such composite structures, and methods for making such composite structures are also considered to be within the scope of the present disclosure. Other objects, features, and advantages of the various embodiments in the present disclosure will be explained in the following detailed description with reference to the appended drawings.

BRIEF DESCRIPTION OF DRAWINGS

FIG. 16 is an illustration of another embodiment of a graphene-augmented carbon fiber and exemplary equipment for producing a graphene-augmented carbon fiber in accordance with this disclosure.

FIG. 16A is an illustration of a cross-section of the graphene-augmented carbon fiber shown in FIG. 16.

FIG. 17 is an illustration of yet another embodiment of a graphene-augmented bed of carbon fiber filaments and exemplary equipment for producing a graphene-augmented bed of carbon fiber filaments in accordance with this disclosure.

FIG. 17A is an illustration of carbon tow used in the production of the graphene-augmented bed of carbon fiber filaments shown in FIG. 17.

FIG. 21C is an illustration of another embodiment of a crumpled composite prepreg material in accordance with this disclosure.

FIG. 21D is an illustration showing a magnified view of a portion of the crumpled prepreg material in FIG. 21C.

FIG. 22 is an illustration of equipment that may be used for folding a graphene film to form the crumpled composite prepreg material shown in FIGS. 21A and 21B.

FIG. 23 is an illustration of a right side view of the equipment shown in FIG. 22 before a plunger is activated to fold the graphene film.

FIG. 24 is an illustration of a right side view of the equipment shown in FIG. 22 after the plunger is activated to fold the graphene film.

DETAILED DESCRIPTION

In the following detailed description, various embodiments of composite materials are described with reference to aerospace structures to illustrate the general principles in the present disclosure. It will be recognized by one skilled in the art that the present disclosure may be practiced in other analogous applications or environments and/or with other analogous or equivalent variations of the illustrative embodiments. For example, the composite materials may be used in any industry that seeks the benefits of strong and light-weight materials. One of ordinary skill in the art will recognize and appreciate that the composite materials and related methods of increasing strength, stiffness and modulus in composite materials of the disclosure can be used in any number of applications involving such vehicles and structures. It should also be noted that those methods, procedures, components, or functions which are commonly known to persons of ordinary skill in the field of the disclosure are not described in detail herein.

Figure 1:
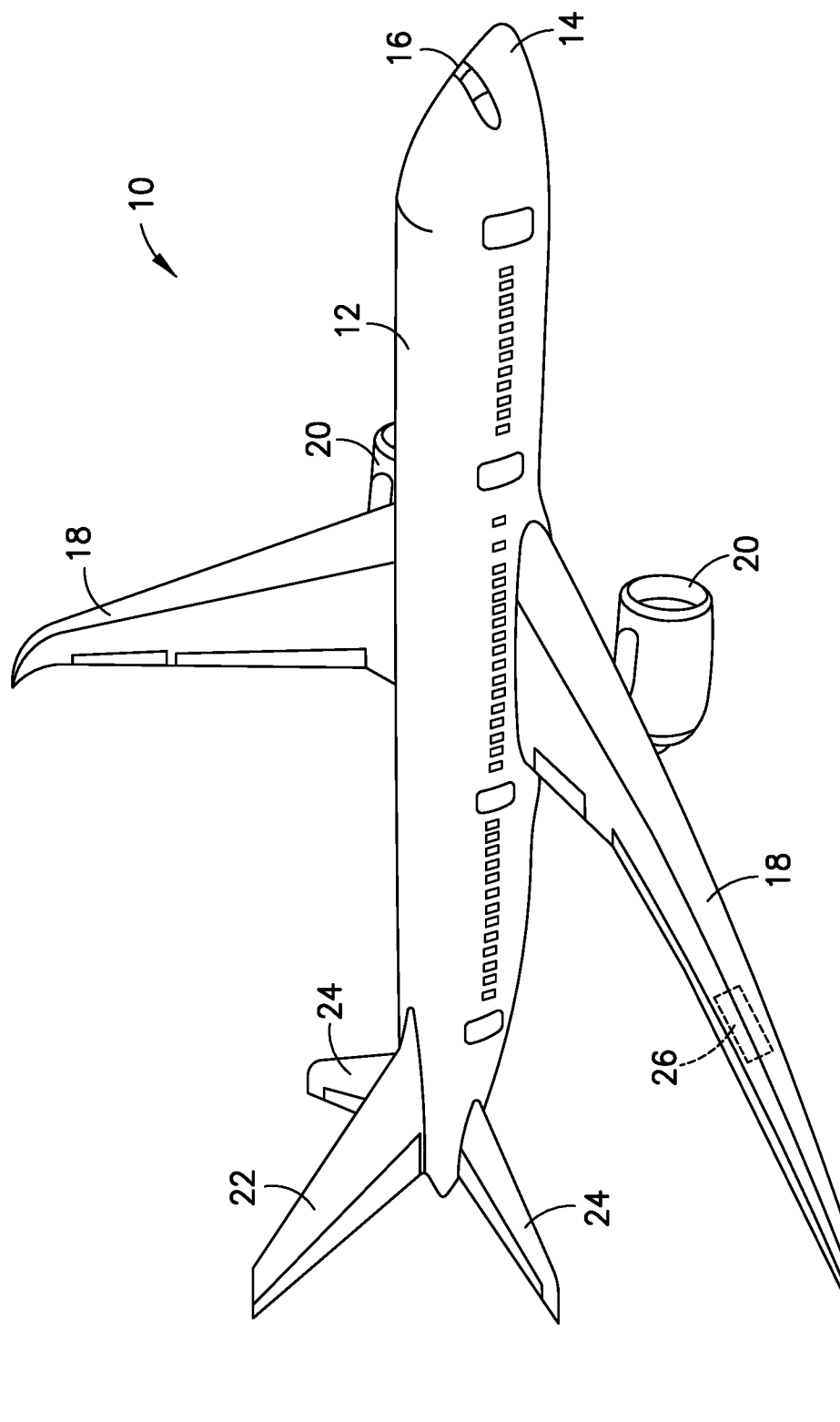
FIG. 1 is an illustration of a perspective view of an aircraft that may incorporate the composite materials disclosed herein.

Referring more particularly to the drawings, FIG. 1 is an illustration of a perspective view of an exemplary aircraft 10 that may incorporate a composite structure 26 comprising a composite material augmented with functionalized graphene in accordance with this disclosure. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more composite structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other vehicles or items having composite structures.

Figure 2:
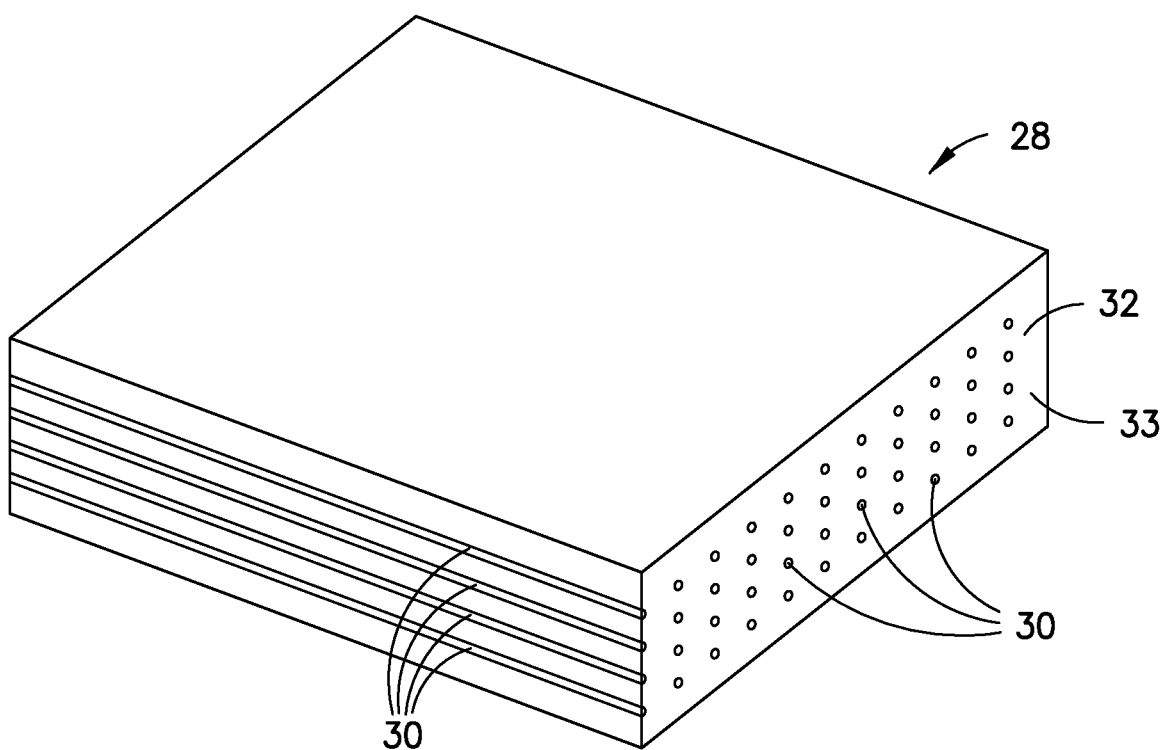
FIG. 2 is an illustration of a typical composite material comprising carbon reinforcement fibers and a matrix material.

The composite structures 26 may be any type of structure that is manufactured, fabricated or assembled, in whole or in part, from one or more component parts made from composite materials. An exemplary illustration of a typical CFRP-type of composite material 28 is shown in FIG. 2 comprising a single layer of carbon reinforcement fibers 30 impregnated with a matrix material 32. The matrix material 32 surrounds, binds and supports the carbon reinforcement fibers 30 and generally comprises a non-conductive polymer such as an epoxy or other type of resin 33.

For aerospace applications, an aerospace-grade resin is used as the matrix material 32, having four (4) or more epoxide groups in each epoxy monomer molecule to form multiple connections. Typically, the molecules are tri- or tetra-functional epoxies and bi-functional amines. Since one component is at least tri-functional, the result of the extensive epoxy-amine chemical reaction is a dendrimeric structure, which provides strength and toughness greater than non-aerospace grade bi-functional epoxy resins. Aerospace-grade resins suitable for the composite materials of this disclosure include epoxy-amine resin systems having a cure temperature in the range of about 250° F. to 355° F. Examples of such resins include, but are not limited to, a toughened epoxy resin 3900-2 available from Toray Resin Company, a division of Toray Industries, Inc., Troy, Mich., and the CYCOM® 977-3 and CYCOM® 5320-1 curing resins available from Cytec Industries Inc., West Paterson, N.J.

Other aerospace-grade resins suitable for the composite materials of this disclosure include bismaleimide (BMI) resins and benzoxazine (BXA) resins. In a BMI resin system, BMI monomer molecules make up about 50-75% of the total weight of the resin system Other components include comonomers, reactive diluents, elastomers and catalysts, and can include an amine. A BMI monomer molecule contains a 5-member ring structure including a nitrogen atom (N) bonded to the rest of the molecule, and four carbon (C) atoms. Or, of the four carbon atoms, two are double-bonded to each other and one of the other two carbon atoms. The other two carbon atoms are also single bonded to the nitrogen atom, and are double-bonded an oxygen (O) atom. The total BMI molecular structure contains 7 atoms; a 5-member ring and the two attached oxygen atoms. For a BMI molecule to be useful as an aerospace-grade resin it must contain at least two such 7-member groups BMI molecules are available from specialty chemical companies and include 1,1'-(Methylenedi-4,1-phenylene)bismaleimide, N,N'-(4-Methyl-1,3-phenylene)bismaleimide, 1,4-Di(maleimido)butane, and N,N'-(1,3-Phenylene)dimaleimide. One common comonomer to use is o,o'-diallylbisphenol A (also known as DABA). The reaction chain for the copolymerization of BMI with DABA results in two BMI molecules being connected to the same DABA molecule. The DABA molecule has another side to which two more BMI molecules react, making DABA tetrafunctional. This is analogous to tetrafunctional epoxy resin systems and results in similar properties Examples of such BMI resin systems have a cure temperature in the range of about 355° F. to 375° F. and include, but are not limited to, RM-3010 available from Renegade Materials Corporation and HexPly® F650 available from Hexcel. The cure temperature can be reduced by adding accelerators or catalysts.

In a BXA resin system, BXA monomer molecules are combined with other components that may include an epoxy. A BXA monomer molecule contains a 6-member ring including an oxygen (O) atom, a nitrogen (N) atom, and 4 carbon (C) atoms. For a BXA monomer molecule to be useful as an aerospace-grade resin it must contain at least two such rings. BXA monomer molecules are available from specialty chemical companies and include bisphenol A benzoxazine, bisphenol F benzoxazine, phenylphthalein benzoxazine, and thiodiphenol benzoxazine. For example, SigmaAldrich of St. Louis, Mo. markets a line of BXA monomer molecules that may be used in a BXA resin system including 2H-1,4-Benzoxazine-3(4H)-one, 6-Bromo-2H-1,4-benzoxazin-3(4H)-one, 6-Chloro-2H-1,4-benzoxazine-3(4H)-one, 6-Fluoro-2H-1,4-benzoxazine-3(4H)-one, 6-Nitro-2H-1,4-benzoxazine-3(4H)-one, 6-Chloro-3,4-dihydro-2H-1,4-benzoxazine Aldrich$^{CPR}$, 6-Amino-2H-1,4-benzoxazine-3(4H)-one, 8-Amino-2H-1,4-benzoxazine-3(4H)-one Aldrich$^{CPR}$, 3,4-Dihydro-2H-1,4-benoxazine Aldrich$^{CPR}$, and 3,4-Dihydro-2H-1,4-benzoxazine-6-ol Aldrich$^{CPR}$. Polybenzoxazine is produced by homopoloymerization of benzoxazines (i.e., there is no initiator or second reactant necessary). Benzoxazine or polybenzoxazine can be cross-linked into an aerospace-grade resin via the reaction between benzoxazine and the epoxy in the resin. Examples of suitable BXA resin systems have a cure temperature in the range of about 400° F. to 430° F. and include, but are not limited to, resin systems available from Henkel Corporation under the brand name LOCTITE® and from Huntsman Corporation under brand name ARALDITE® and under their XU and DT product lines. The cure temperature can be reduced by adding accelerators or catalysts.

Figure 3A:
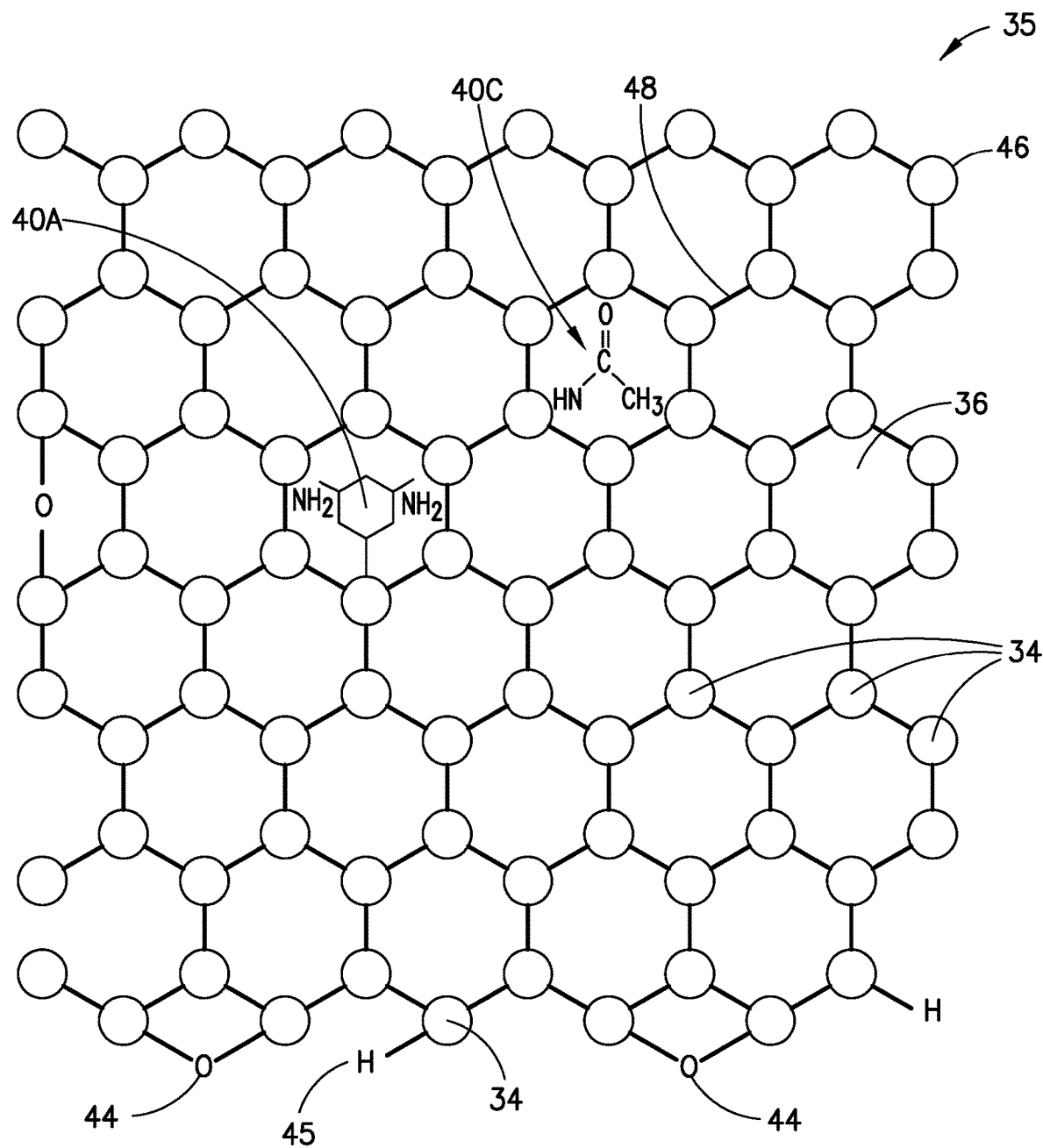
FIG. 3A is an illustration of one embodiment of a functionalized graphene nanoplatelet that may be used in the improved composite materials of this disclosure.
Figure 3B:
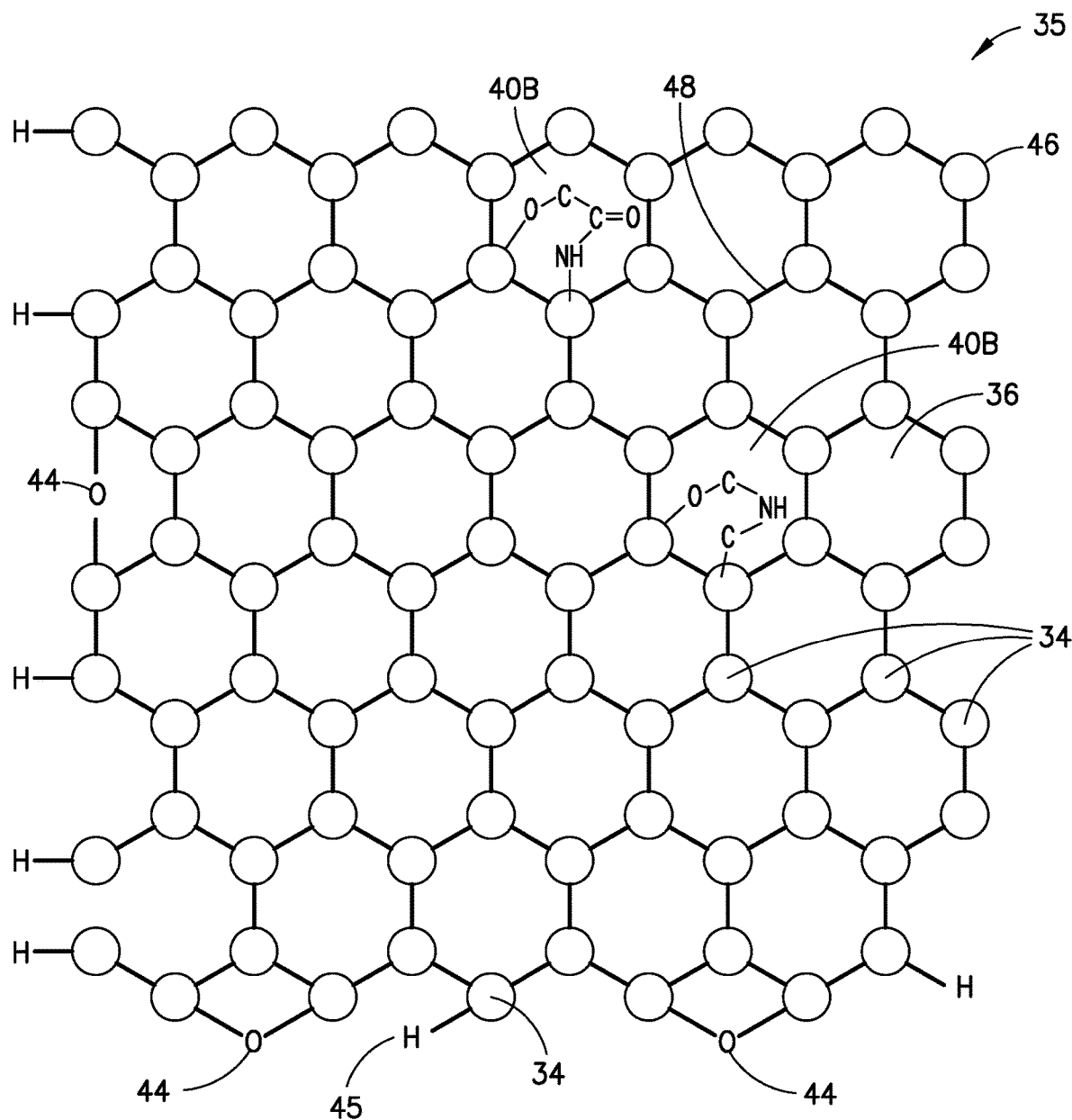
FIG. 3B is an illustration of another embodiment of a functionalized graphene nanoplatelet that may be used in the improved composite materials of this disclosure.
Figure 3C:
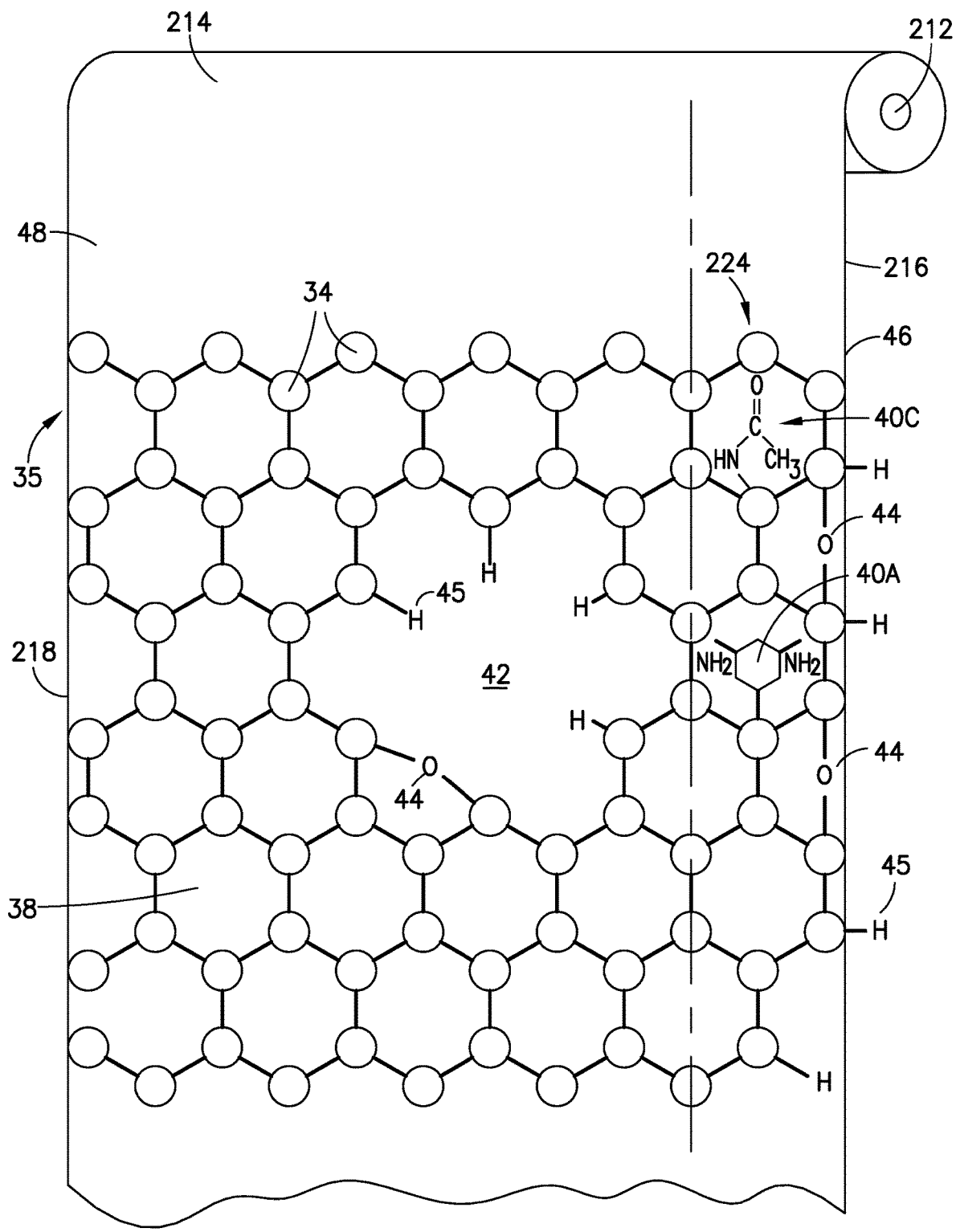
FIG. 3C is an illustration of one embodiment of a functionalized graphene sheet or film that may be used in the improved composite materials of this disclosure.
Figure 3D:
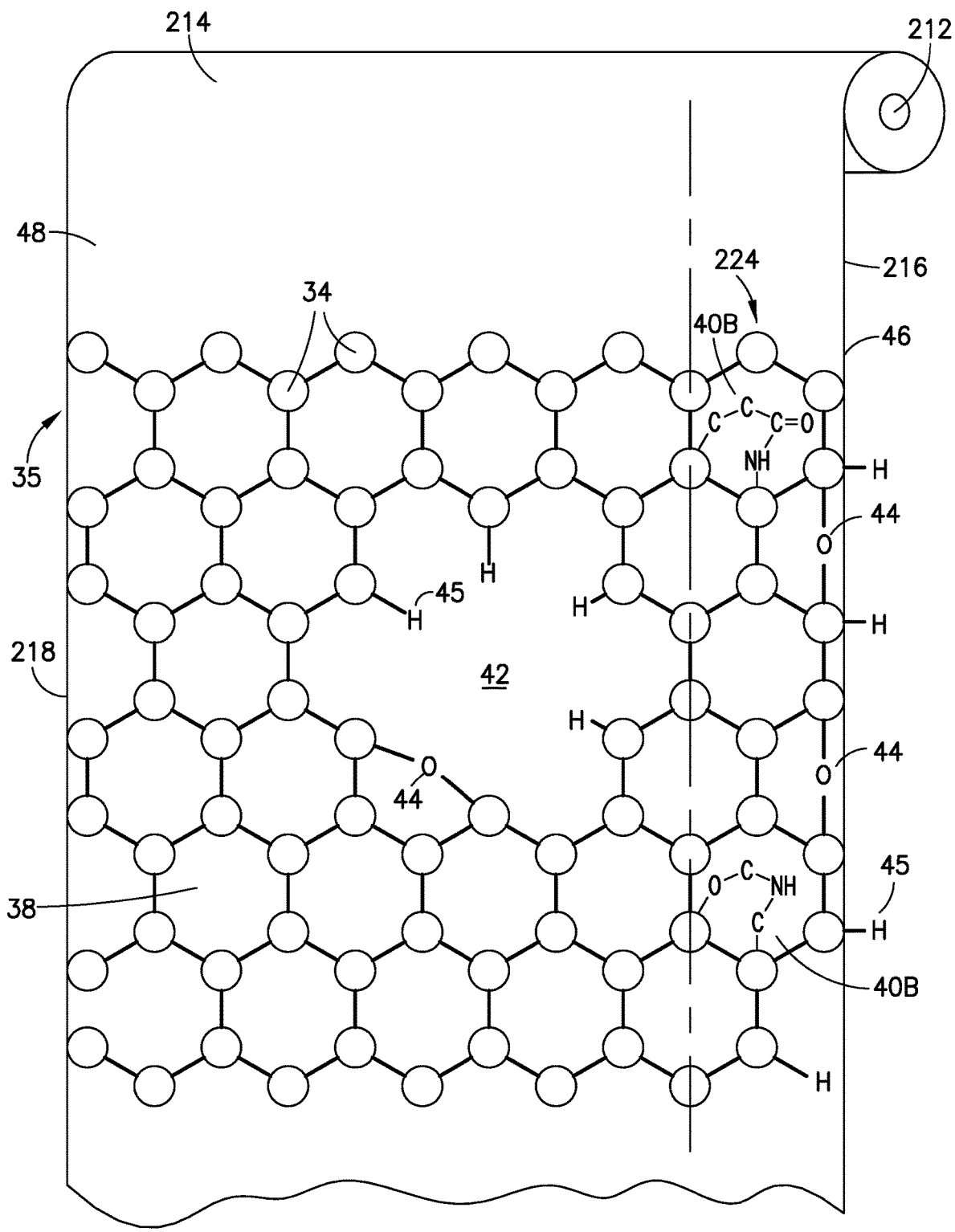
FIG. 3D is an illustration of another embodiment of a functionalized graphene sheet or film that may be used in the improved composite materials of this disclosure.
Figure 4:
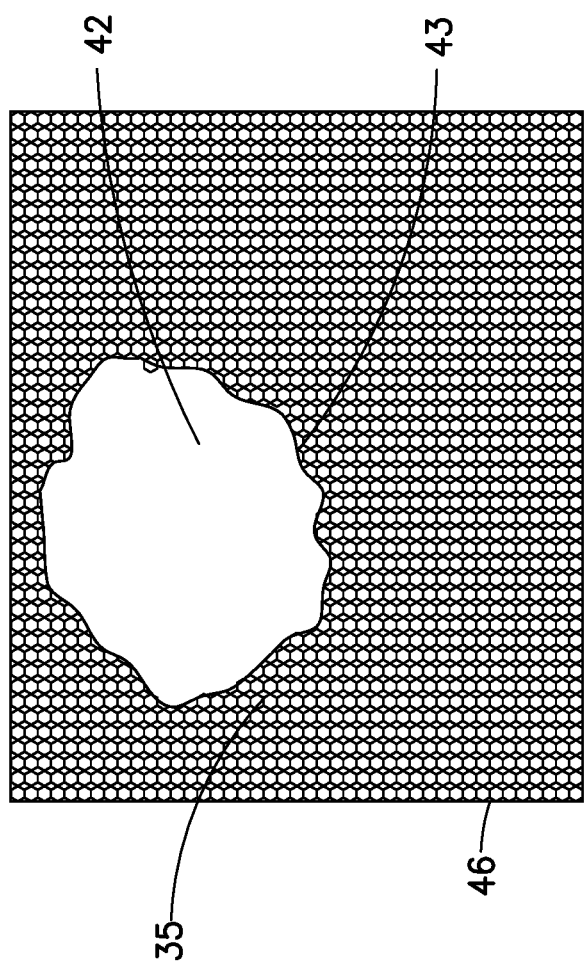
FIG. 4 is an illustration of another embodiment of a functionalized graphene nanoplatelet that may be used in the improved composite materials of this disclosure.

In view of its exceptional properties, graphene has attracted tremendous research interest in recent years, particularly in the field of electronics. As illustrated in FIGS. 3A and 3B, graphene is a hexagonal array of carbon atoms 34 extending over two dimensions (i.e., it is one atom thick). Each carbon atom 34 in graphene is covalently bonded to three other carbon atoms 34, providing exceptional strength. Graphene can now be made flawlessly or with controlled flaws in a molecular monolayer of unlimited length and width. It may be produced in the form of small flakes, or nanoplatelets (GNP) 36, as shown in FIGS. 3A and 3B, or scaled into sheets or films 38 for roll-to-roll processing as shown in FIGS. 3C and 3D, with grain size on the order of 100 nanometers. The controlled flaws can include chemical functionalization 40, such as amino-terminated groups (or amine groups) 40A (FIGS. 3A, 3C), benzoxazine-terminated groups (or benzoxazine groups) 40B (FIGS. 3B, 3D), imide-terminated groups (or imide groups) 40C (FIG. 3A, 3C), or a combination of amine groups 40A and imide groups 40C (FIG. 3A, 3C), with controlled density. In addition, graphene can now be oxidized by weak acids in whole or in part to form graphene derivatives, such as graphene oxide (GO) and reduced graphene oxide (rGO), having epoxide groups 44 throughout the graphene, on part of the graphene, or only at edges 46 of the graphene. Referring to FIGS. 3C, 3D and 4, graphene may also be formed with holes 42 having a predetermined size and location to provide additional edges 43 where epoxide groups 44 can form.

It has been determined that integrating such functionalized graphene 35 in the form of functionalized graphene nanoplatelets (GNP) 36 or functionalized graphene sheets or films 38 with added amine groups 40A, imide groups 40C, a combination of amine groups 40A and imide groups 40C, or benzoxazine groups 40B formed on a surface 48 of the functionalized graphene 35, epoxide groups 44 formed on at least one edge 46 of the functionalized graphene 35 and/or holes 42 formed through the functionalized graphene 35, into CFRP-type composite materials 28 provides substantial benefits to the strength, stiffness and modulus of the composite materials 28, whereas the compositing of non-functionalized graphene includes no chemical interactions between the resin 33 in the matrix material 32 and the non-functionalized graphene, resulting in slip plane formation and decreased strength, stiffness and modulus in aerospace-grade resin matrix materials 32.

Graphene may be functionalized with amine groups 40A, imide groups 40C or benzoxazine groups 40B on the surface 48 by several methods including, for example, the methods disclosed in U.S. Publication No. 2014/0121350 A1 to YOU et al., published May 1, 2014, for preparing a polyimide-graphene composite material, and the method disclosed in Matei, Dan G. et al., "Functional Single-Layer Graphene Sheets from Aromatic Monolayers," *Advanced Materials,* 2013, 25, 4146-4151, WILEY-VCH Verlag GmbH & Co., Weinheim, Germany.

Figure 5:
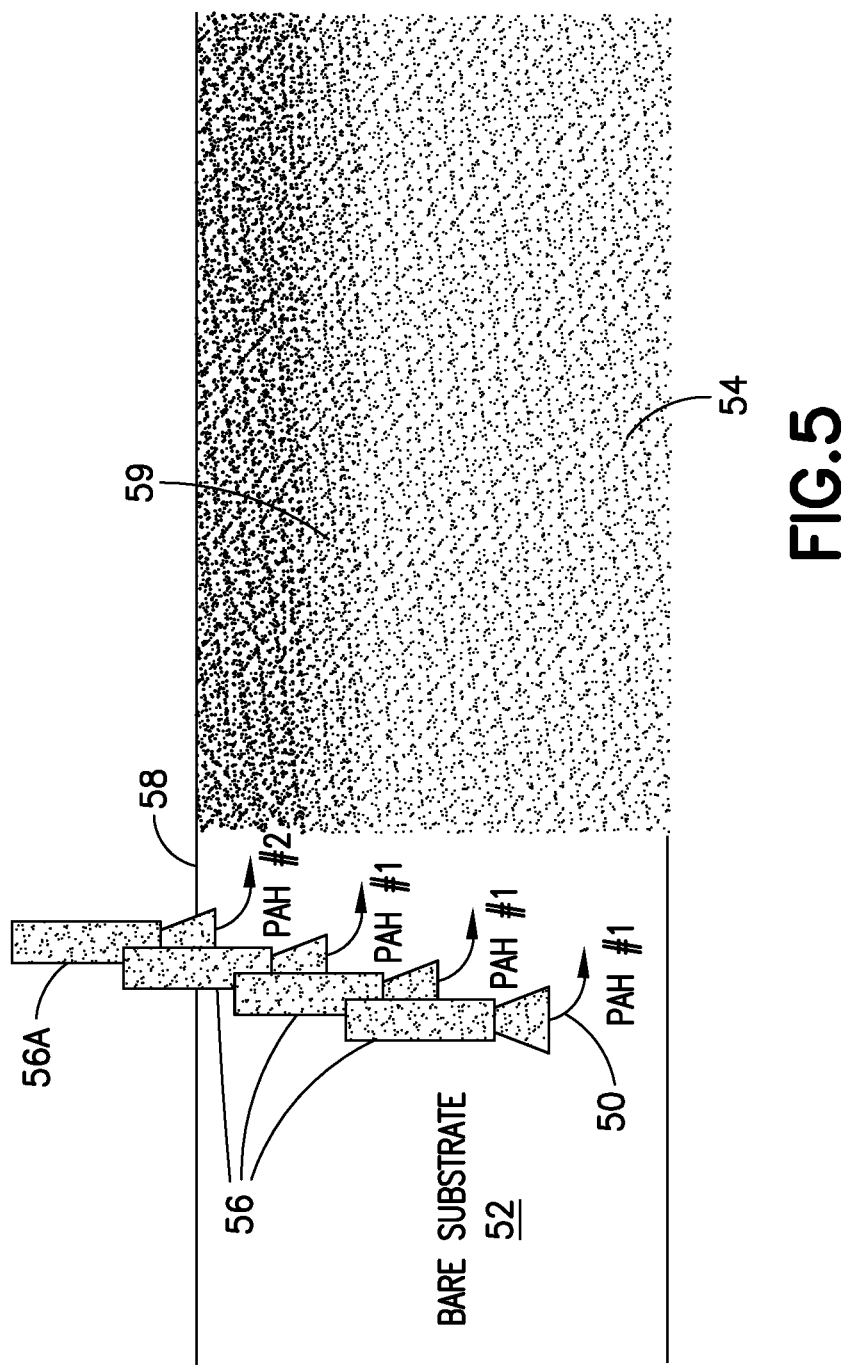
FIG. 5 is an illustration of exemplary equipment for producing a functionalized graphene sheet or film.

In one method of graphene production, illustrated in FIG. 5, polycyclic aromatic hydrocarbon (PAH) molecules 50 adsorb to a surface of a substrate 52 and the interactions of their aromatic rings cause them to form a self-assembled monolayer (SAM) 54. The remainder of each PAH molecule 50 beyond its first aromatic ring sticks up from the SAM 54. The PAH molecules 50 may be delivered to the substrate 52 via nozzles 56 arranged across a width of the substrate 52. By including a second species of PAH molecules with an amine group 40A and/or an imide group 40C, or a benzoxazine group 40B, at some low concentration relative to the first species of PAH molecules 50, a SAM 54 with additional amine groups 40A, benzoxazine groups 40B, imide groups 40C, or a combination of amine groups 40A and imide groups 40C can be formed. For example, one out of every 100 aromatic molecules may have an extra amine group 40A, benzoxazine group 40B and/or imide group 40C sticking up out of it. In general, the percentage of PAH molecules 50 that have amine groups 40A, benzoxazine groups 40B, imide groups 40C, or a combination of amine groups 40A and imide groups 40C will be proportional to the percentage of resulting graphene carbon atoms that have amine groups 40A, benzoxazine groups 40B, imide groups 40C, or a combination of amine groups 40A and imide groups 40C attached thereto.

The concentration of amine groups 40A, benzoxazine groups 40B, imide groups 40C, or a combination of amine groups 40A and imide groups 40C may be controlled locally to produce functionalized graphene 35 that has chemical functionalization 40 only in desired regions such as in a functionalized area 224 near an edge 224 of the functionalized graphene 35. For example, in FIG. 5, three of the four nozzles 56 deliver a first PAH species (PAH #1) and the fourth nozzle 56A positioned near one edge 58 of the substrate 52 delivers a second PAH species (PAH #2) so the amine groups 40A, benzoxazine groups 40B, imide groups 40C, or a combination of amine groups 40A and imide groups 40C are positioned near the one edge 58. Some mixing occurs between the nozzles 56, 56A to form a gradient area 59 of increasing functionalization toward the one edge 58. The surface of the substrate 52 that the PAH molecules 50 adsorb to becomes the outer surface 48 of the functionalized graphene 35 in some embodiments.

Electron irradiation is used to induce bonds between the aromatic molecules at the surface 48 of the substrate 52 to form a carbon nanomembrane (CNM). Temperature induced annealing in a vacuum or under protective atmosphere will complete the conversion of CNM into graphene. Other methods of adding amine groups 40A, benzoxazine groups 40B, imide groups 40C, or a combination of amine groups 40A and imide groups 40C, may be used.

Any type of amine structure may be added to provide the amine groups 40A including, for example, 4,4' diamino diphenyl sulfone; 1-(4-aminophenyl)-1,3,3-trimethylindan-5-amine; N,N-bis(4-aminophenyl)benzene-1,4-diamine; 4,4'-methylenedianiline; 4,4'-oxydianiline; 3,3'-[1,3-phenylenebis(oxy)]dianiline; 4,4'-(9H-fluorene-9,9-diyl)dianiline; 4,4'-[1,3-phenylenebis(oxy)]dianiline; 4,4'-methylenebis(2-ethylaniline); 3,3'-[(2,2-dimethylpropane-1,3-diyl)bis(oxy)]dianiline; 3,3'-[1,4-phenylenebis(methylene)]dianiline; 4,4'-sulfonylbis(N-methylaniline); 4,4'-[1,4-phenylenebis(oxy)]dianiline; 3,3'-sulfonyldianiline; aniline; 4,4'-(phenylphosphoryl)dianiline; 3-aminophenol; 4,4'-methylenedicyclohexanamine; 4,6-diethyl-2-methylbenzene-1,3-diamine; 2-(aminomethyl)-2,5,5-trimethylcyclohexanamine; 4,4'-thiodianiline; 2,2'-dimethylbiphenyl-4,4'-diamine; N-isopropyl-N'-phenylbenzene-1,4-diamine; N-(1,3-dimethylbutyl)-N'-phenylbenzene-1,4-diamine (Phenyl DMB); and N-cyclohexyl-N'-phenylbenzene-1,4-diamine (Phenyl CH).

Benzoxazine is a 6-member ring including an oxygen (O) atom, a nitrogen (N) atom, and 4 carbon (C) atoms. Many types of structure may modify the benzoxazine groups 40B, resulting in molecules such as 2H-1,2-benzoxazine, which is an aromatic ring where two of the carbon atoms are also part of the benzoxazine ring. Any benzoxazine structure with a benzene ring may be added to provide the benzoxazine groups 40B including, for example, 2H-1,4-Benzoxazine-3(4H)-one, 6-Bromo-2H-1,4-benzoxazin-3(4H)-one, 6-Chloro-2H-1,4-benzoxazine-3(4H)-one, 6-Fluoro-2H-1,4-benzoxazine-3(4H)-one, 6-Nitro-2H-1,4-benzoxazine-3(4H)-one, 6-Chloro-3,4-dihydro-2H-1,4-benzoxazine Aldrich$^{CPR}$, 6-Amino-2H-1,4-benzoxazine-3(4H)-one, 8-Amino-2H-1,4-benzoxazine-3(4H)-one Aldrich$^{CPR}$, 3,4-Dihydro-2H-1,4-benoxazine Aldrich$^{CPR}$, and 3,4-Dihydro-2H-1,4-benzoxazine-6-ol Aldrich$^{CPR}$.

An imide group connected to a phenol ring is called an analide. Any analide molecule may be added to the PAH species that is self-assembling on the substrate 52 (as previously described) to provide the imide groups 40C, including, for example, acetanilide, 4-nitroacetanilide and benzanilide.

Functionalized Graphene 35 may be functionalized with additional epoxide groups 44 by oxidation. For example, functionalized graphene 35 can be oxidized by weak acids in whole or in part to form graphene derivatives, such as graphene oxide (GO) and reduced graphene oxide (rGO), having epoxide groups 44 throughout the graphene derivative, on part of the graphene derivative, or only at its edges 46. The weak acid would first attack the edges 46 of the functionalized graphene 35 where there are hydrogen terminations 45. The amount of oxidation is determined by the acid strength and exposure time. Examples of weak acids include formic acid, acetic acid and hydrogen sulfide. It is noted that "weak" does not mean that acid has a high pH. Instead, an acid is described as weak if it is only partially ionized in solution. Exposing graphene to a solution of formic acid for up to 30 minutes and then cleaning with ethanol may provide the desired density of epoxide groups 44.

Other methods of adding epoxide groups 44 may be used, and any type of epoxide structures may be added including, for example, 2,2'-[propane-2,2-diylbis(4,1-phenyleneoxymethylene)]dioxirane; 2,2'-[methylenebis(4,1-phenyleneoxymethylene)]dioxirane; 2,2'-[methylenebis(2,1-phenyleneoxymethylene)]dioxirane; 2,2'-[ethane-1,1-diylbis(4,1-phenyleneoxymethylene)]dioxirane; (Bis M); 4-(oxiran-2-ylmethoxy)-N,N-bis(oxiran-2-ylmethyl)aniline; 2,2'-[thiobis(4,1-phenyleneoxymethylene)]dioxirane; 2,2'-[sulfonylbis(4,1-phenyleneoxymethylene)]dioxirane; 2,2'-[butane-1,4-diylbis(oxymethylene)]dioxirane; 3-(oxiran-2-ylmethoxy)-N,N-bis(oxiran-2-ylmethyl)aniline; 2,2'-oxybis(6-oxabicyclo[3.1.0]hexane); 2,2'-[1,4-phenylenebis(oxymethylene)]dioxirane; 2,2'-[prop-1-ene-1,2-diylbis(4,1-phenyleneoxymethylene)]dioxirane; 2,2'-[1,3-phenylenebis(oxymethylene)]dioxirane; 2,2'-[cyclohexane-1,2-diylbis(oxymethylene)]dioxirane; 2,2'-[(2,2-dichloroethene-1,1-diyl)bis(4,1-phenyleneoxymethylene)]dioxirane; 2,2'-[cyclohexane-1,4-diylbis(methyleneoxymethylene)]dioxirane; (Bis I); (Bis AF); (Bis Z); (Bis C); (Bis TMC); (Bis P); 2,2'-{propane-2,2-diylbis[(2,6-dibromo-4,1-phenylene)oxymethylene]}dioxirane; 7-oxabicyclo[4.1.0]hept-3-ylmethyl 7-oxabicyclo[4.1.0]heptane-3-carboxylate.

Optionally, as shown in FIGS. 3C, 3D and 4, functionalized graphene 35 may be further functionalized by adding at least one hole 42 through the functionalized graphene 35 to provide additional edges 43 where epoxide groups 44 can form. The at least one hole 42 may be formed by providing energy (such as with a laser) to remove PAH molecules 50 from the surface of the SAM 54 prior to formation of the CNM rather than cross-linking them. The amount of energy added and the laser spot size determines the number of molecules liberated and thus the size of the resulting hole 42. Preferably, the at least one hole 42 is formed in the functionalized graphene 35 to have a substantially circular shape with a diameter of about 1-2 nanometers and a size of about 12-80 carbon atoms 34. That is, about 12-80 carbon atoms 34 are removed from the functionalized graphene 35 to form the at least one hole 42 in the functionalized graphene 35. The at least one hole 42 may be positioned anywhere on the functionalized graphene 35. The functionalized graphene 35 has a density of holes 42 in the range of about 4 E7 to about 4 E10 holes per square millimeter, or about 1 hole per 1,000 to 1 million carbon atoms 34. The holes 42 in the functionalized graphene 35 provide space for molecules in, for example, a matrix material 32 to penetrate the holes 42 and be mechanically constrained by the functionalized graphene 35, thereby further improving bonding capabilities.

The following example sets disclose several products and methods showing how functionalized graphene 35 in the form of functionalized GNP 36 and functionalized graphene sheets and films 38 can be utilized to make graphene-augmented composite materials for use in composite structures 26.

Example Set #1

Figure 6:
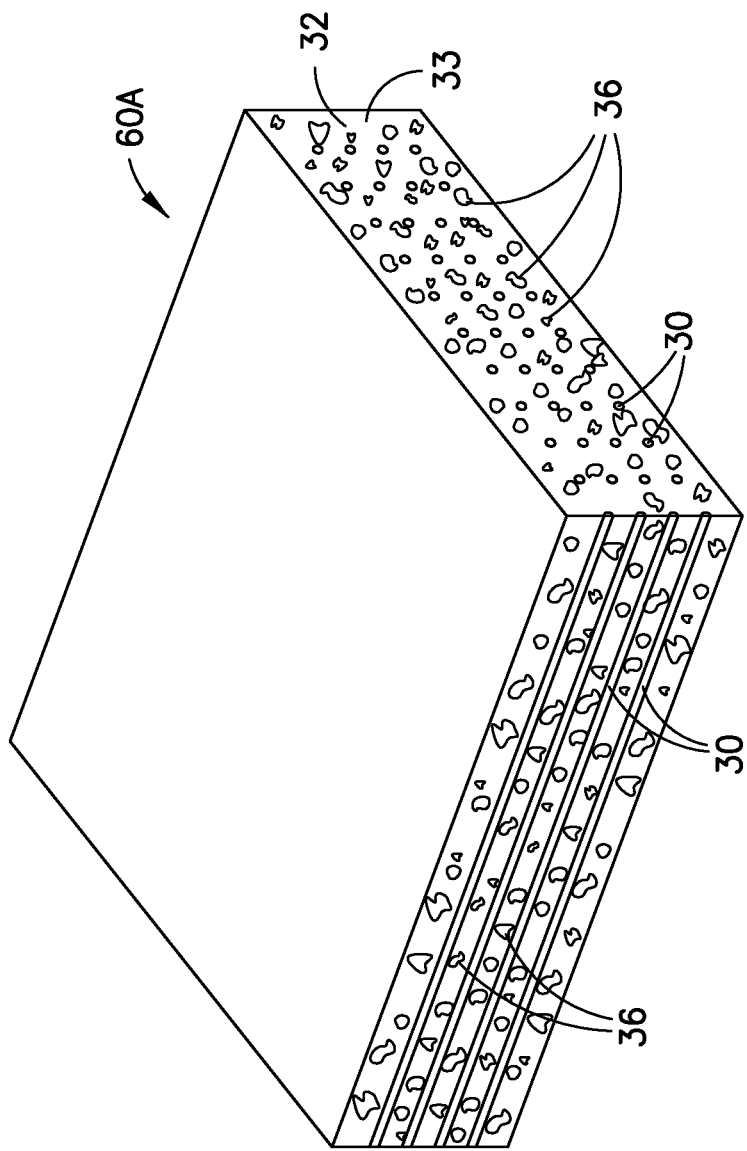
FIG. 6 is an illustration of one embodiment of an improved composite material augmented with functionalized graphene nanoplatelets in accordance with this disclosure.
Figure 7:
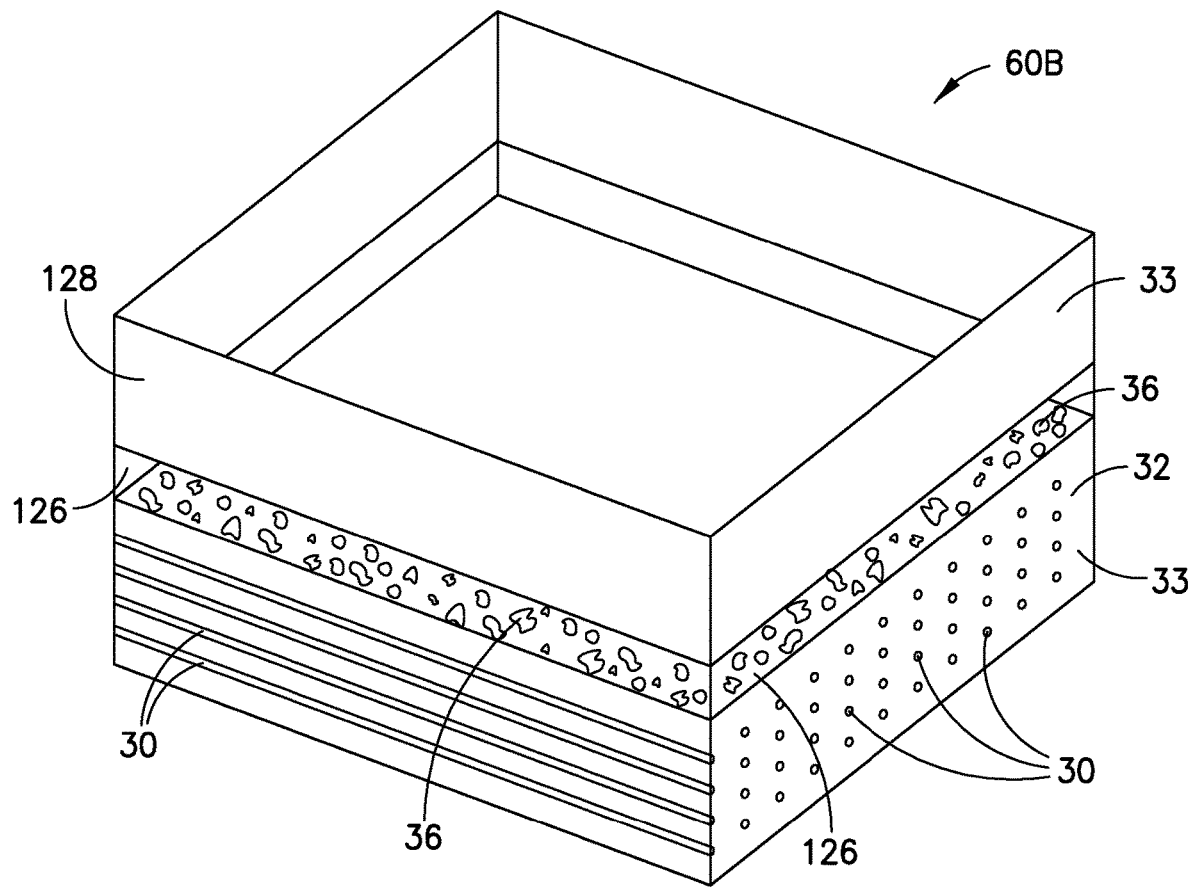
FIG. 7 is an illustration of another embodiment of an improved composite material augmented with functionalized graphene nanoplatelets in accordance with this disclosure.
Figure 8:
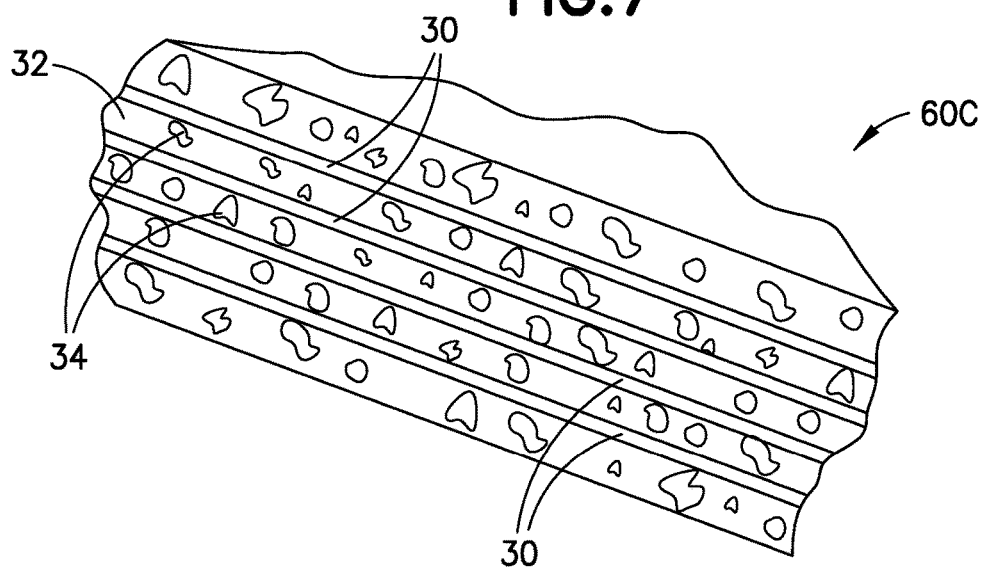
FIG. 8 is an illustration of yet another embodiment of an improved composite material augmented with functionalized graphene nanoplatelets in accordance with this disclosure.

In a first set of examples, functionalized graphene 35 in the form of functionalized graphene nanoplatelets (GNP) 36 as disclosed above is integrated into CFRP composite materials 28 as a supplement to or as a replacement for resin matrix material 32. FIGS. 6-8 illustrate three exemplary embodiments of improved composite materials 60A, 60B, 60C, respectively, wherein the matrix material 32 comprises from about 0.1% to 100% by weight functionalized GNP 36. At 100 weight %, the matrix material 32 comprises no resin 33; only functionalized GNP 36, as shown in FIG. 8.

The functionalized GNP 36 has a generally rectangular shape with edges 46 having a length on the order of 10-5,000 nanometers (0.01-5 microns). FIG. 3A is an illustration of a functionalized GNP 36 having added amine groups 40A on the surface 48 of the functionalized GNP 36, and added epoxide groups 44 on at least one of the edges 46 of the functionalized GNP 36. FIG. 3A also shows imide groups 40C added to the surface 48 of the functionalized GNP 36. The imide groups 40C may be added alone or added in combination with amine groups 40A, and in embodiments with added imide groups 40C, it is not necessary to add epoxide groups 44. In an alternative embodiment of this example (shown in FIG. 3B), the functionalized GNP 36 has added benzoxazine groups 40B (instead of added amine groups 40A or added imide groups 40C) on the surface 48 of the functionalized GNP 36 and added epoxide groups 44 on at least one of the edges 46 of the functionalized GNP 36.

The amine groups 40A, benzoxazine groups 40B, imide groups 40C, or combination of amine groups 40A and imide groups 40C, on the surface 48 of the functionalized GNP 36 have a surface density of about 4.0 E10 to about 2.0 E12 groups per square millimeter (about 4.0 E4 to about 2.0 E6 groups per square micrometer or about 0.4 to about 2.0 groups per square nanometer). The surface density of amine groups 40A, benzoxazine groups 40B, imide groups 40C, or combination of amine groups 40A and imide groups 40C may also be described as about 0.1% to about 5.0% of carbon atoms 34 in the functionalized GNP 36 have amine groups 40A, benzoxazine groups 40B, imide groups 40C, or combination of amine groups 40A and imide groups 40C bonded thereto. That is, 1 to 50 carbon atoms 37 per 1,000 carbon atoms have an amine group 40A, benzoxazine groups 40B, imide groups 40C, or combination of amine groups 40A and imide groups 40C bonded thereto.

In embodiments with added epoxide groups 44, the functionalized GNP 36 has a linear density of epoxide groups 44 formed on the at least one of the edges 46 of the functionalized GNP 36 of about 7,000 to about 700,000 groups per millimeter (or about 0.007 to about 0.7 groups per nanometer, or about 7 to about 700 per micrometer). The density of epoxide groups 44 may also be represented as about 0.1% to about 10% of carbon atoms at the edges 46 of the functionalized GNP 36 have epoxide groups 44 bonded thereto. That is, 1 to 100 carbon atoms 34 per 1,000 carbon atoms 34 has an epoxide group 44 bonded thereto.

Figure 9:
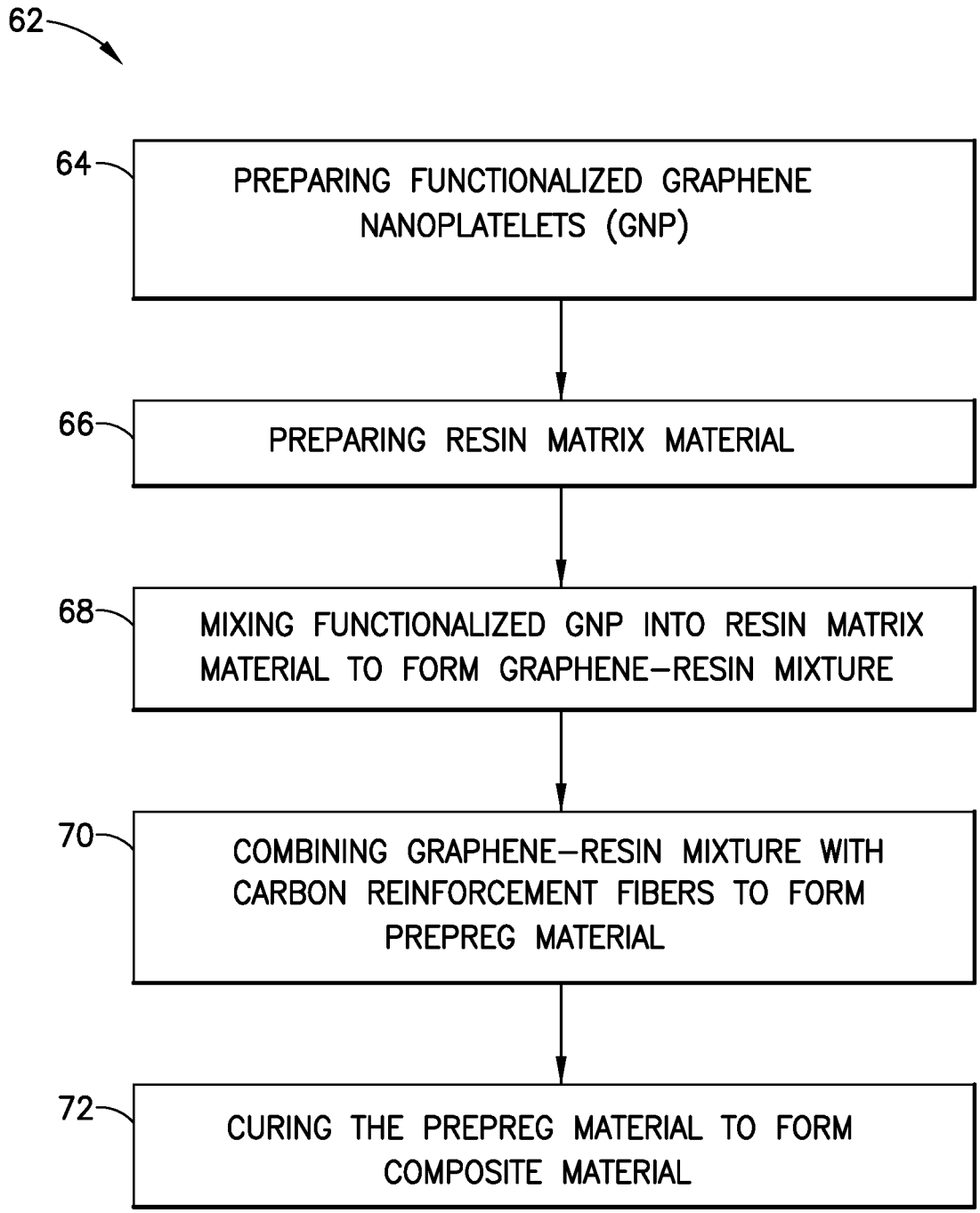
FIG. 9 is an illustration of a flow diagram of an exemplary method for increasing the strength, modulus and stiffness of a composite material with functionalized graphene nanoplatelets.

FIG. 9 is an illustration of a flow diagram of an exemplary embodiment of a method 62 of increasing strength, modulus and stiffness of the composite material 28 shown in FIG. 2 comprising carbon reinforcement fibers 30 and a matrix material 32. The method 62 comprises step 64 of preparing functionalized GNP 36 having either amine groups 40A, benzoxazine groups 40B, imide groups 40C, or combination of amine groups 40A and imide groups 40C formed on a surface 48 of the functionalized GNP 36 and optionally epoxide groups 44 formed on at least one of the edges 46 of the functionalized GNP 36 in accordance with the disclosure above. The functionalized GNP 34 should be roughly rectangular in shape with edges 46 having a length on the order of about 100-5,000 nanometers (0.1-5 microns). Optionally, the functionalized GNP 36 may also be provided with holes 42 formed through the functionalized GNP 36 as disclosed above.

In step 66, a matrix material 32 is prepared to be an aerospace-grade resin 33. For example, for functionalized GNP 36 with additional amine groups 40A, the aerospace-grade resin 33 comprises an epoxy resin; for functionalized GNP 36 with added benzoxazine groups 40B, the aerospace-grade resin comprises a benzoxazine resin; and for functionalized GNP 36 with added imide groups 40C, the aerospace-grade resin comprises a BMI resin as disclosed above. The matrix material 32 may be prepared having the qualities of an aerospace-grade resin, or purchased from a supplier of aerospace-grade resins.

Step 68 of the method 62 comprises mixing the functionalized GNP 36 into the matrix material 32 to form a graphene-resin mixture 74 using equipment and processes known in the art for mixing resins. For example, a mixer having hinge stirrers, paw type stirrers or twisted stirrers, or other types of stirrers may be used. The temperature of the matrix material 32, the speed of the stirrer and the mixing time depend on the type of equipment used, the type of resin 33, and the density of functionalization of the functionalized GNP 36. The functionalized GNP 36 may be added to the matrix material 32 either during preparation of the matrix material 32 or after the matrix material 32 is prepared to a volume density of about 0.1% to 5.0% of the graphene-resin mixture 74. The epoxy-amine stoichiometry and the benzoxazine-epoxy stoichiometry should be modified as appropriate given the addition of the amine groups 40A, benzoxazine groups 40B and epoxide groups 44 on the functionalized GNP 36. The goal is for the graphene-resin mixture 74 to have the same ratio of epoxide groups 44 to amine groups 40A or benzoxazine groups 40B as the ratio of epoxide groups 44 to amine groups 40A or epoxide groups 44 to benzoxazine groups 40B in the matrix material 32.

Optionally, extreme shear may be provided to the graphene-resin mixture 74 using any commercially-available high shear mixer to cause the functionalized GNP 36 to initially flatten and to advance the graphene-resin mixture 74 to a cure state of approximately 0.1 to lock in the flat functionalized GNP 36 state. Cure state is measured from 0 to 1; 1 being a 100% degree of cure. There are multiple ways to determine the current cure state of a resin. For example, the amount of energy released when a single epoxide group reacts with an amine group is known, and the number of groups per unit mass of a given resin is known. A sample of resin can be put into a Digital Scanning calorimeter (DSC) to determine the amount of energy released by the sample over an interval of time (and simultaneously control the temperature). The determined amount of energy released can be divided by the energy per reaction to determine the number of reactions that have occurred, and then divided by the number of groups, or number of possible reactions, in the sample mass to determine the cure state of the resin. Another way to determine cure state is to place a sample of resin into a DSC, raise the temperature and wait; that would reveal the amount of energy that was released by advancing the resin to a 100% (1.0) degree of cure, which can then be used to determine what the resin's cure state had been. Alternatively, the resin's viscosity or modulus can be tested at some specific temperature. Both of these properties are known to vary with the cure state of the resin. Therefore, the viscosity or modulus as a function of the cure state and temperature can be used to determine the cure state. The glass transition temperature also varies with cure state and leaves a signal on certain types of DSC runs, so it can be detectable and used to infer the cure state.

The method 62 (FIG. 9) further comprises the step 70 of combining the graphene-resin mixture 74 with a plurality of carbon reinforcement fibers 30 to form a composite prepreg material 76. Preferably, the plurality of carbon reinforcement fibers 30 are pre-impregnated with the uncured graphene-resin mixture 74 using equipment and processes known in the art for making prepreg materials. The reinforcement fibers 30 preferably comprise carbon fibers, carbon-based fibers such as graphite fibers, aramid fibers, fiberglass fibers, glass fibers, KEVLAR® fibers (KEVLAR is a registered trademark of E.I. Du Pont De Nemours and Company Corporation of Wilmington, Del.), a combination thereof, or other suitable carbon or non-carbon fibers. The composite prepreg material 76 may comprise the reinforcement fibers 30 in unidirectional (aligned) or fabric (woven) form, impregnated to a desired amount with the graphene-resin mixture 74. The graphene-resin mixture 74 preferably transfers stresses between the reinforcement fibers 30 and thus protects the reinforcement fibers 30 from mechanical and/or environmental stresses.

Figure 10:
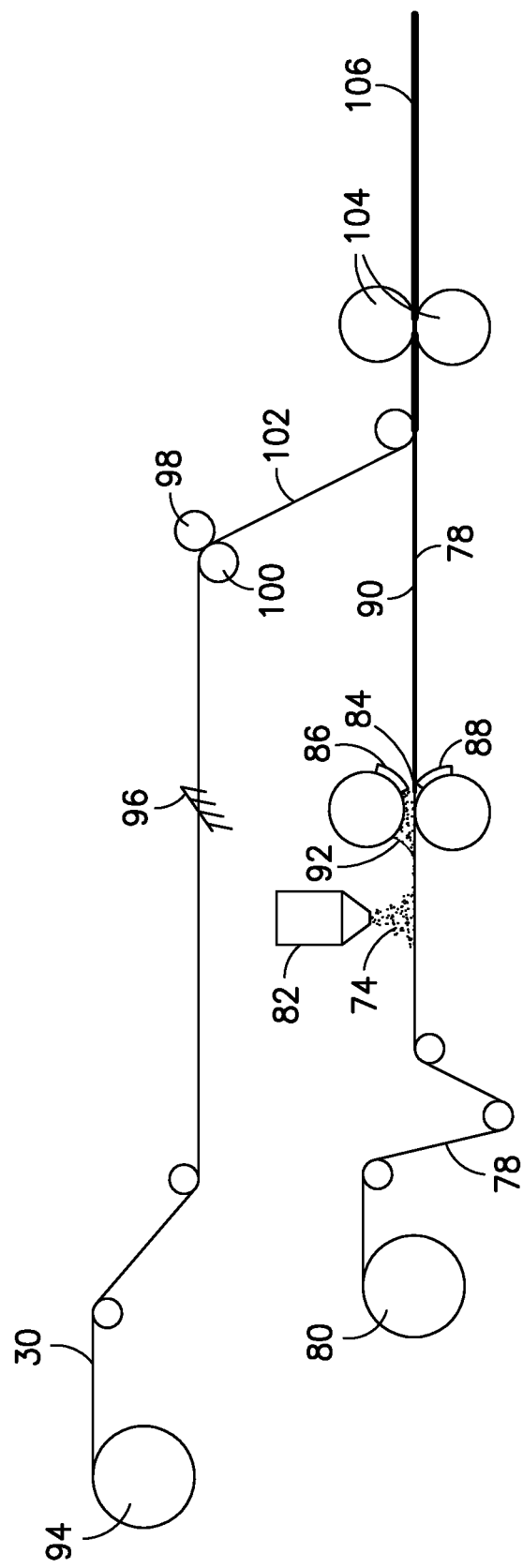
FIG. 10 is an illustration of an exemplary manufacturing process line that may be used in the method shown in FIG. 9.

An exemplary illustration of equipment that may be used in step 70 to form the composite prepreg material 76 is shown in FIG. 10. A backing paper 78 is fed from a backing paper roll 80. The graphene-resin mixture 74 is deposited onto the backing paper 78 by any known type of resin application device 82 such as a fluid dispenser. The backing paper 78 and graphene-resin mixture 74 is fed through a nip 84 between a spreader bar 86 and a backing bar 88 to form a graphene-resin film 90. The height of the nip 84 between the spreader bar 86 and the backing bar 88 determines the thickness of the graphene-resin film 90. The graphene-resin mixture 74 forms a meniscus 92 behind the spreader bar 86 because there is too much graphene-resin mixture 74 to be squeezed through the nip 84. One or more creels 94 of carbon fiber 30 are fed through a spreading comb 96 and through a second nip of a spreader 98 and a backing bar 100 to produce a bed 102 of aligned carbon fibers on top of the graphene-resin film 90. The bed 102 of aligned carbon fibers 30 and the backing paper 78 with graphene-resin film 90 are fed toward a pair of nip rollers 104. The nip rollers 104 are heated to decrease the resin viscosity and apply a pressure such that the graphene-resin film 90 penetrates the bed 102 of aligned carbon fibers 30 to produce a composite prepreg material 106.

In step 72 of the method 62, the composite prepreg material 106 is cured with heat and/or pressure sufficient to form the composite material 60A (shown in FIG. 6) using equipment and processes known in the art. Alternatively, the composite prepreg material 106 may be formed into various shapes to form component parts for composite structures, and then cured.

In the resulting composite material 60A, the amine groups 40A or the benzoxazine groups 40B in the functionalized GNP 36 form strong bonds with epoxide groups 44 in the resin 33 of the matrix material 32, and epoxide groups 44 in the functionalized GNP 36 form strong bonds with amine groups 40A or benzoxazine groups 40B in the resin 33 of the matrix material 32. In embodiments with imide groups 40C in the functionalized GNP 36, the imide groups 40C for strong bonds with the bismaleimde in the resin 33. This method results in a nanocomposite wherein the resin 33 of the matrix material 32 is a macromolecule comprised of a base amine monomer (such as 44'DDS), base epoxy monomer (such as Bisphenyl F), and the functionalized GNP 36, or comprises the polybenzoxazine-epoxy resin and the functionalized GNP 36, or comprises the BMI resin and the functionalized GNP 36. The dendrimeric structure of the macromolecule has been replaced with a more complicated structure that may contain loops interpenetrating other similar macromolecules, and when there are holes 42 in the functionalized GNP 36, the complicated structure may contain linkages that penetrate the holes 42, either within the same macromolecule or in other similar macromolecules.

Figure 11:
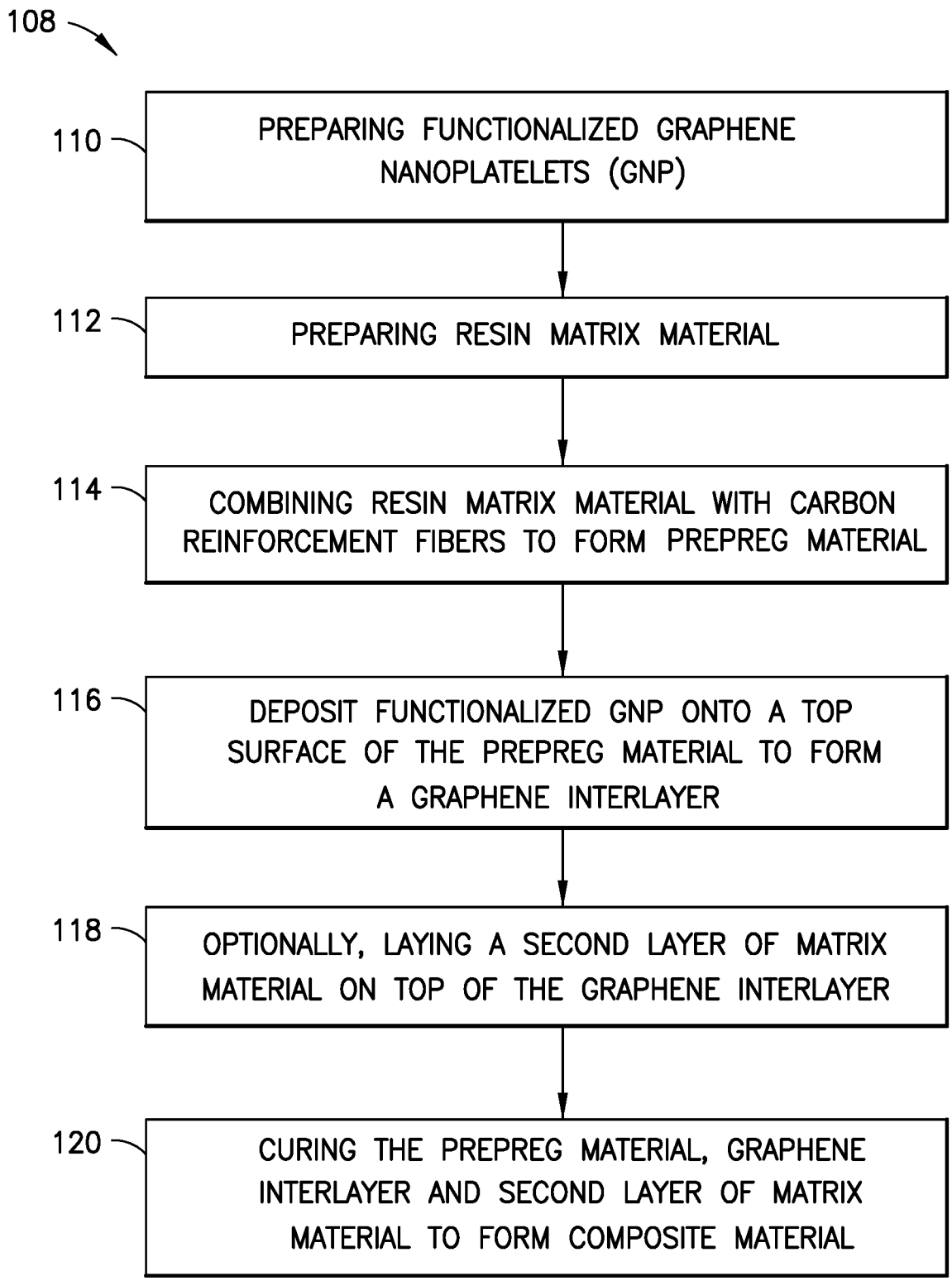
FIG. 11 is an illustration of a flow diagram of another exemplary method for increasing the strength, modulus and stiffness of a composite material with functionalized graphene nanoplatelets.

FIG. 11 is an illustration of a flow diagram of another exemplary embodiment of a method 108 of increasing strength, modulus and stiffness of a composite material 28 comprising carbon reinforcement fibers 30 and a matrix material 32. The method 108 comprises step 110 of preparing functionalized GNP 36 having amine groups 40A or benzoxazine groups 40B formed on a surface 48 of the functionalized GNP 36 and epoxide groups 44 formed on at least one of the edges 46 of the functionalized GNP 36 in accordance with the disclosure above. The functionalized GNP 36 should be roughly rectangular in shape with edges 46 having a length on the order of about 100-5,000 nanometers (0.1-5 microns). Optionally, the functionalized GNP 36 may be provided with holes 42 formed through the functionalized GNP 36 as disclosed above.

In step 112, a matrix material 32 is prepared to be an aerospace-grade resin 33. The matrix material 32 may be prepared having the qualities of an aerospace-grade resin, or purchased from a supplier of aerospace-grade resins. The matrix material 32 in this embodiment does not include any functionalized GNP 36 and may comprise an aerospace-grade epoxy resin, a BMI resin, or a BXA resin, as described herein.

Figure 12:
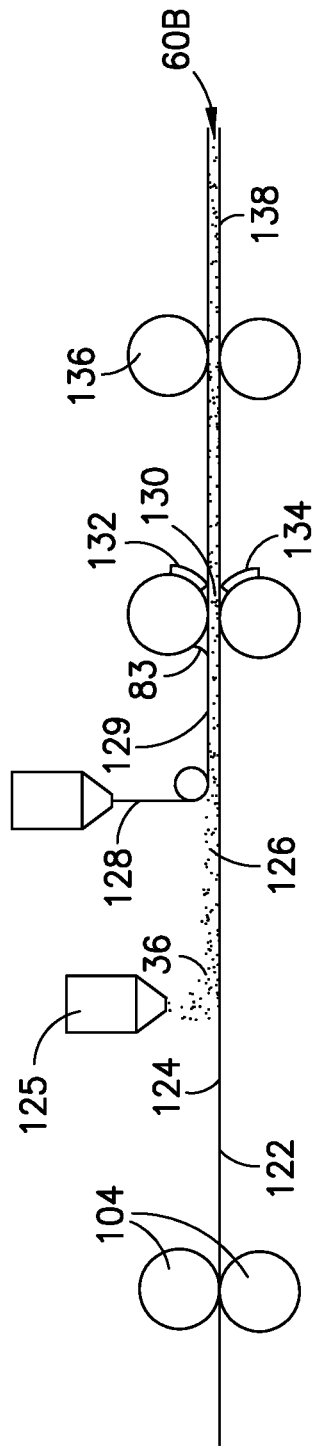
FIG. 12 is an illustration of an exemplary manufacturing process line that may be used in the method shown in FIG. 11.

The method 108 further comprises the step 114 of combining the matrix material 32 with a plurality of carbon reinforcement fibers 30 using equipment and processes known in the art to form a composite prepreg material 122. For example, the equipment illustrated in FIG. 10 may be used by applying a matrix material 32 (without any functionalized GNP 36) from the application device 82 to form an alternative composite prepreg material 122. In FIG. 12, the prepreg material 122 is shown exiting the nip rollers 104 shown in FIG. 10.

In step 116, referring to the exemplary processing equipment in FIG. 12, functionalized GNP 36 is deposited via an applicator 125 onto a top surface 124 of the prepreg material 122 to form a graphene interlayer 126 (see FIG. 7). Any known aerial application method and equipment for depositing solid flakes, powders, or liquids, such as dusting, dispersion by sonication in a low vapor-pressure solvent, or pouring or spraying at such a mass rate that after the solvent evaporates, the remaining functionalized GNP 36 may be used to cover the desired area on the top surface 124 of the prepreg material 122. The graphene interlayer 126 preferably covers up to about 30% of the area of the top surface 124 of the prepreg material 122.

In step 118, an optional second layer 128 of matrix material 32 may be laid on top of the graphene interlayer 126 to form a film to bind the functionalized GNP 36. The second layer 128 of matrix material 32 may or may not include any functionalized GNP 36. The second layer 128 of matrix material 32 is preferably fabricated as a film on a second backing paper that goes through its own spreader bar that determines its thickness. Then, the second layer 128 is laid onto the graphene interlayer 126 such that the film is positioned adjacent the graphene interlayer 126 and the second backing paper 129 is exposed. The prepreg material 122, the graphene interlayer 126 and the second layer 128 of matrix material 32 are fed through a second nip 130 between a second spreader bar 132 and a second backing bar 134, and then toward a pair of heated nip rollers 136 to consolidate the final prepreg 138. The second backing paper 129 in the second layer 128 should then be removed. In step 312, the final prepreg 138 is cured to form the composite material 60B (see FIG. 7) using equipment and processes known in the art. If the second layer 128 of matrix material 32 includes functionalized GNP 36, then shear could be applied in the mixer that mixes the functionalized GNP 36 with the matrix material 32.

Figure 13:
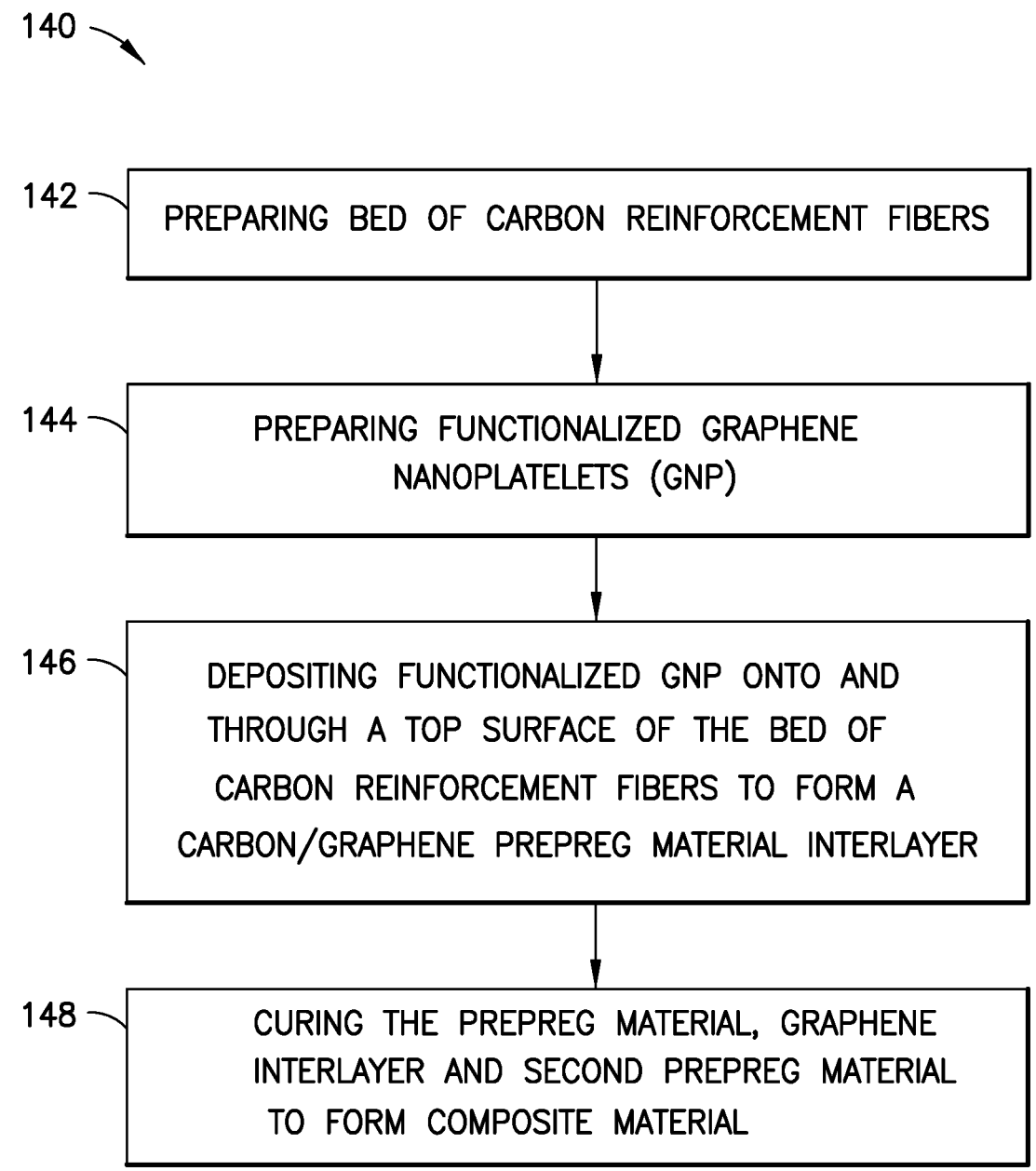
FIG. 13 is an illustration of a flow diagram of yet another exemplary method for increasing the strength, modulus and stiffness of a composite material with functionalized graphene nanoplatelets.
Figure 14:
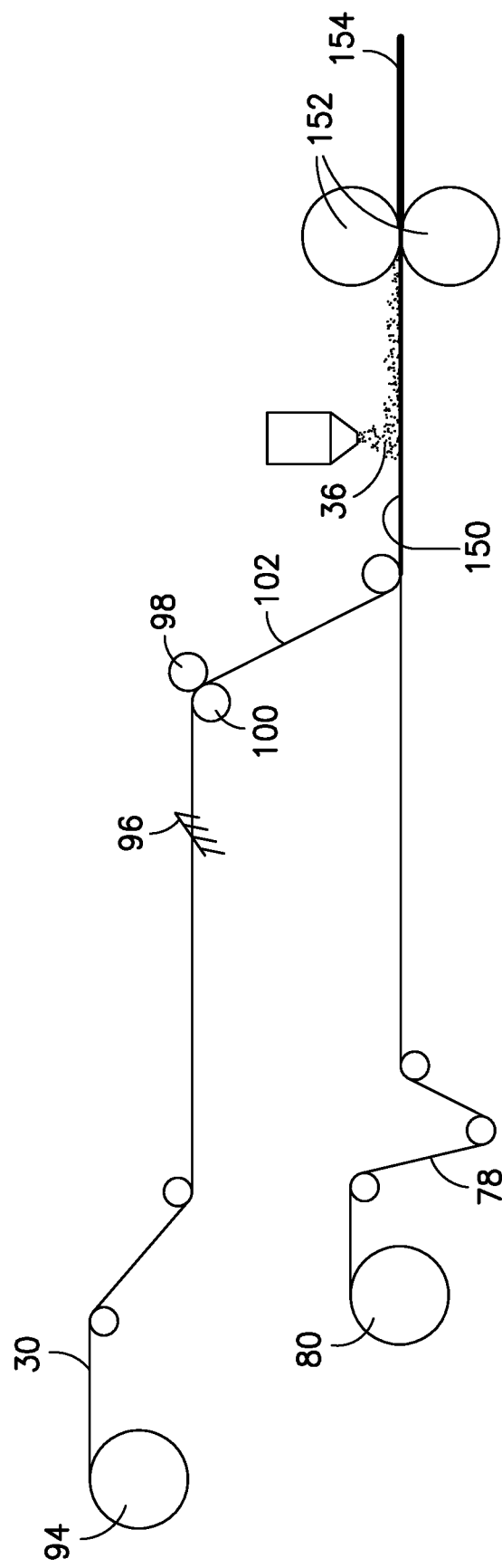
FIG. 14 is an illustration of an exemplary manufacturing process line that may be used in the method shown in FIG. 13.

Applying this method results in a carbon fiber reinforced polymer laminate with nanocomposite interlayer toughener. The toughening interlayer 126 is a macromolecule comprised of the base amine monomer (such as 44'DDS), base epoxy monomer (such as Bisphenyl F), and the functionalized GNP 36 or the BXA resin and functionalized GNP 36 or the BMI resin and functionalized GNP 36. The dendrimeric structure of the macromolecule in the interlayer 126 has been replaced with a more complicated structure that may contain loops interpenetrating other similar macromolecules. If the functionalized GNP 36 has holes 42, then the complicated structure may also contain linkages that penetrate the holes 42, either within the same macromolecule or in other similar macromolecules FIG. 13 is an illustration of a flow diagram of yet another embodiment of a method 140 of increasing strength, modulus and stiffness of a composite material 28 comprising carbon reinforcement fibers 30 and a matrix material 32. In this method, the matrix material 32 comprises 100% functionalized GNP 36 and no resin 33. The functionalized GNP 36 may be functionalized with added amine groups 40A, benzoxazine groups 40B, imide groups 40C or a combination of amine groups 40A and imide groups 40C as disclosed above. The functionalized GNP 36 has edges 46 having a length on the order of 10-100 nanometers, smaller than the previous embodiments. In step 142, and referring to an exemplary process line shown in FIG. 14, a bed 102 of carbon reinforcement fibers 30 is formed on a backing paper 78. Similar to the equipment shown in FIG. 10, one or more creels 94 of carbon fiber 30 are fed through a spreading comb 96 and through a second set of a spreader 98 and a backing bar 100 to produce a bed 102 of aligned carbon fibers 30 on top of the backing paper 78. In step 144, functionalized GNP 36 is prepared as disclosed above, but of a smaller size. In step 146, functionalized GNP 36 is deposited onto and through a top surface 150 of the bed 102 of carbon reinforcement fibers 30 to penetrate the entire bed 102 of fibers. The carbon reinforcement fibers 30 with the functionalized GNP 36 are then passed through a pair of nip rollers 152 to compress and form a carbon/graphene prepreg material 154. The functionalized GNP 36 is deposited to a controlled even density, such as 60 grams per square meter to 120 grams per square meter. In step 148, the carbon/graphene prepreg material is cured with equipment and processes known in the art to form the composite material 60C shown in FIG. 8. The functionalized GNP 36 in this method 140 creates a macromolecule through epoxy-amine reaction, epoxy-benzoxazine reaction, amine-bismaleimide reaction, or imide-bismaleamide reaction.

Example Set #2

In a second set of examples, graphene-augmented carbon fibers 200A, 200B and 200C comprising a functionalized graphene film 38 disposed about one or more carbon fiber filaments 204 are integrated into CFRP composite materials 28 (like the one shown in FIG. 2) as a supplement to or as a replacement for carbon reinforcement fibers 30. The functionalized graphene film 38 may be functionalized with a chemical functionalization 40 as disclosed herein, such as amine groups 40A, benzoxazine groups 40B, imide groups 40C, or a combination of amine groups 40A and imide groups 40C, on an outer surface 48 of the graphene film 38, epoxide groups 44 formed on at least one edge 46 of the functionalized graphene film 38, and/or holes 42 formed through the functionalized graphene film 38.

Figure 15:
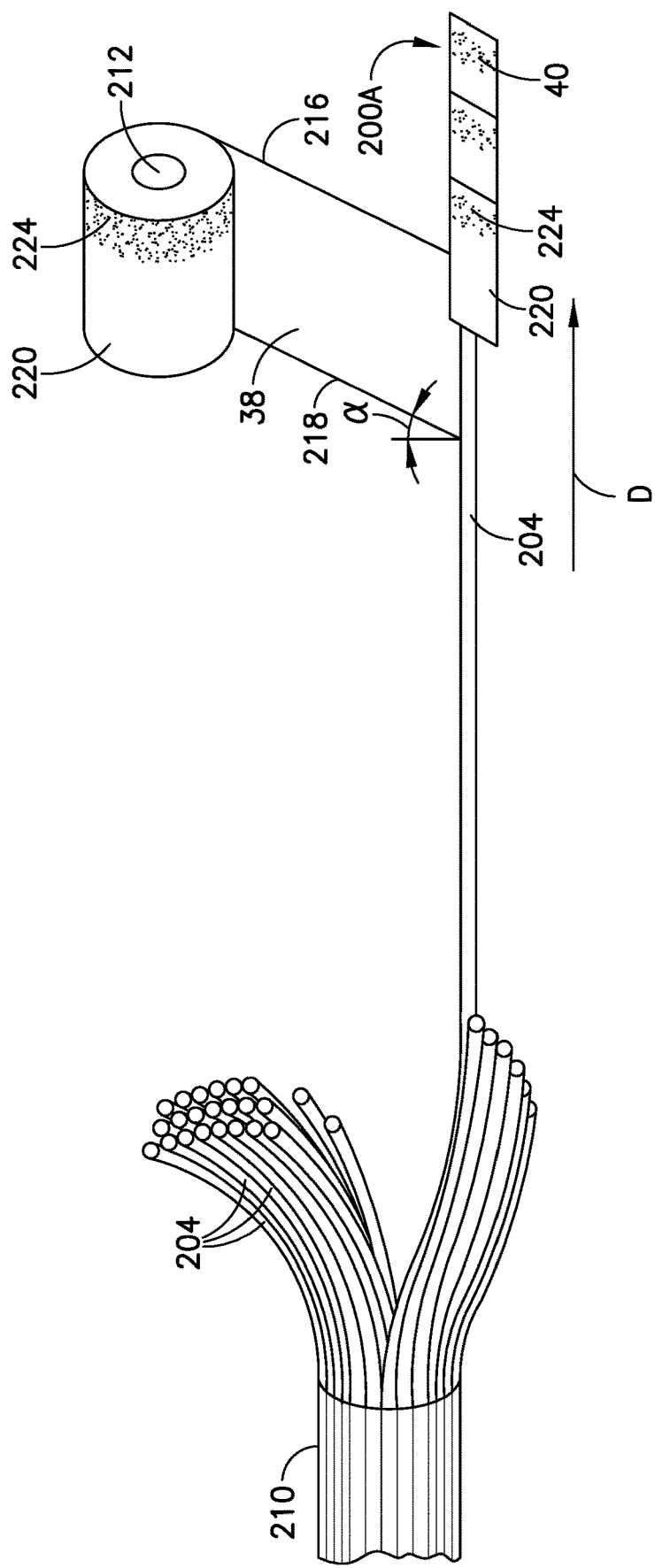
FIG. 15 is an illustration of one embodiment of a graphene-augmented carbon fiber and exemplary equipment for producing a graphene-augmented carbon fiber in accordance with this disclosure.

FIGS. 15-17 illustrate three exemplary embodiments of graphene-augmented carbon fibers 200A, 200B and a graphene-augmented bed 200C of carbon fiber filaments 204, respectively, wherein a graphene film 38 is wrapped about a single carbon fiber filament 204 (FIG. 15), a substantially cylindrical bundle 206 of either 7, 19, 37 or 61 carbon fiber filaments 204 (FIG. 16), for example, or any other suitable quantity of carbon fiber filaments 204, and a substantially rectangular bed 208 of a plurality of carbon fiber tows 210 each comprising a plurality of carbon fiber filaments 204 (FIG. 17). These embodiments are further described below.

The graphene film 38 employed in all of the embodiments disclosed herein is formed as a long, thin graphene sheet having a width in the range of about 0.5 microns to about 100 microns from a first edge 216 to a second edge 218, and rolled on a spool 212 for dispensing about at least one carbon fiber filament 204. The graphene film 38 may include chemical functionalization 40 on an outer surface 220 of the graphene film 38 and/or at one or both of the first edge 216 and the second edge 218. FIGS. 3C and 3D are blown-up illustrations of a roll 214 of functionalized graphene film 38 wound on a spool 212 having either added amine groups 40A, benzoxazine groups 40B, imide groups 40C, or a combination of amine groups 40A and imide groups 40C in a functionalized area 224 on the outer surface 220 of the functionalized graphene film 38, and added epoxide groups 44 on the first edge 216 of the functionalized graphene film 38. When the functionalized graphene film 38 is functionalized with imide groups 40C, there is no need to add epoxide groups 44. The functionalized area 224 preferably extends the length of the functionalized graphene film 38 and up to about 10 microns in from the first edge 216 (toward the second edge 218). Referring to FIG. 5, during production of the functionalized graphene film 38, the amine groups 40A, benzoxazine groups 40B, imide groups 40C, or a combination of amine groups 40A and imide groups 40C are positioned near one edge 58 of the substrate 52 and delivered to the substrate 52 via the fourth nozzle 56A as previously described.

The amine groups 40A, benzoxazine groups 40B, imide groups 40C, or a combination of amine groups 40A and imide groups 40C on the outer surface 220 of the graphene film 38 have a surface density of about 4.0 E10 to about 2.0 E12 groups per square millimeter (about 4.0 E4 to about 2.0 E6 groups per square micrometer or about 0.4 to about 2.0 groups per square nanometer) of the functionalized area 224. The surface density of amine groups 40A, benzoxazine groups 40B, imide groups 40C, or a combination of amine groups 40A and imide groups 40C may also be described as about 0.1% to about 5.0% of carbon atoms 34 in the functionalized area 224 have amine groups 40A, benzoxazine groups 40B, imide groups 40C, or a combination of amine groups 40A and imide groups 40C bonded thereto. That is, 1 to 50 carbon atoms 34 per 1,000 carbon atoms in the functionalized area 224 have an amine group 40A, benzoxazine groups 40, imide groups 40, or a combination of amine groups 40A and imide groups 40C bonded thereto.

Referring to FIGS. 3C and 3D, the graphene film 38 has a linear density of epoxide groups 44 formed on at least one of the first edge 216 and the second edge 218 of the graphene film 38, preferably on the side of the functionalized area 224, of about 7,000 to about 700,000 groups per millimeter (or about 0.007 to about 0.7 groups per nanometer, or about 7 to about 700 per micrometer). The density of epoxide groups 44 may also be represented as about 0.1% to about 10% of carbon atoms at the first edge 216 of the graphene film 38 have epoxide groups 44 bonded thereto. That is, 1 to 100 carbon atoms 34 per 1,000 carbon atoms 34 has an epoxide group 44 bonded thereto. In embodiments with functionalization comprising imide groups 40C or a combination of imide groups 40C and amine groups 40A, added epoxide groups 44 are not required.

Referring again to FIGS. 15-17, the graphene film 38 is wrapped about one or more carbon fiber filaments 204 in a spiral orientation. Successive layers of the graphene film 38 partially overlap previous wrapped layers of graphene film 38 such that the functionalized area 224 on the outer surface 220 of the graphene film 38 is not covered, and remains exposed. In certain embodiments, the graphene film 38 is wrapped about the one or more carbon fiber filaments 204 to a thickness of about 0.1 microns to about 3.0 microns to form about 300 to about 9,000 layers of graphene film 38 on top of the one or more carbon fiber filaments 204. The diameter of the wrapped graphene-augmented carbon fibers 200A, 200B, 200C should be in the range of about 1 micron to about 7 microns, and about 5 microns to about 7 microns for use in aerospace applications. During the wrapping process, one or more carbon fiber filaments 204 are positioned to move in a lengthwise direction under tension to keep the carbon fiber filaments 204 taut.

In FIGS. 15-17, the single carbon fiber filament 204, the bundle 206 of carbon fiber filaments 204, and the bed 208 of carbon fiber filaments 204 are positioned to move in a horizontal direction to the right as shown by arrow D. A spool 212 of graphene film 38 is rotated around the single carbon fiber filament 204, the bundle 206 of carbon fiber filaments 204, and the bed 208 of carbon fiber filaments 204, at an angle α of 0.6 degrees or less such that when unrolled from the spool 212 and wrapped around the moving one or more carbon fiber filaments 204, the graphene film 38 wraps in a spiral orientation. Other orientations and arrangements can also be employed. A corner of the loose end of the graphene film 38 may be attached to the one or more carbon fiber filaments 204 to start the wrapping process and to pull the graphene film 38 as the one or more carbon fiber filaments 204 moves in the direction D. The wrapping angle α leads to a ratio of 1 width to 100 length. As the graphene film 38 is wrapped around the one or more carbon fiber filaments 204, successive layers of the graphene film 38 overlap previously wrapped layers. If the wrapped graphene-augmented carbon fibers 200A, 200B have a final diameter of 5 microns and were rolled at 0.6 degree angle α, the graphene film 38 will have an offset distance between overlaps of 50 microns. The graphene film 38 should be maintained to have a tension of about 0.001 Newtons (N) per meter width of graphene film 38, and the speed may be adjusted depending on the desired result. If the graphene film 38 is wrapped in a slow manner, a spiral on the surface of the carbon fiber filaments 204 will have considerable space between the adjacent wraps of the graphene film 38 (or filament length between adjacent wraps of graphene film 38). The space or filament length between adjacent wraps is preferably 0 microns to 10 microns. For this application, the entire outer surface 220 of the graphene film 38 may be functionalized with amine groups 40A, benzoxazine groups 40B, imide groups 40C or a combination of amine groups 40A and imide groups 40C, and both the first edge 216 and the second edge 218 of the graphene film 38 may be functionalized with epoxide groups 44 (in embodiments that do not include imide groups 40C). In preferred embodiments, the graphene film 38 is wrapped in a faster manner, resulting in many layers of graphene film 38 rolled atop each other in an offsetting spiral orientation. The graphene film 38 should be wrapped tight enough around the carbon fiber filaments 204 such that there is no space between the graphene film 38 and the carbon fiber filament 204.

FIG. 15 shows one embodiment of a graphene-augmented carbon fiber 200A comprising a single carbon fiber filament 204 wrapped with a graphene film 38 as disclosed above. In this embodiment, the outer surface 220 of the graphene film 38 may be functionalized with amine groups 40A, benzoxazine groups 40B, imide groups 40C or a combination of amine groups 40A and imide groups 40C in the functionalized area 224 and, in embodiments that do not include imide groups 40C, epoxide groups 44 on the first edge 216 also in the functionalized area 224. Holes 42 are not necessary for graphene film 35 in this embodiment. The wrapping process provides that the chemical functionalization 40 in the functionalized area 224 is on the outside of the graphene-augmented carbon fiber 200A and in the outermost few nanometers of the graphene-augmented carbon fiber 200A, resulting from the wrapped layers of functionalized graphene film 38. Graphene-augmented carbon fibers 200A may be used to form CFRP composite materials 28 using the same equipment and processes that are used with traditional carbon fibers. For example, thousands to hundreds of thousands of graphene-augmented fibers 200A may be combined together or may be combined with traditional carbon fibers to form a fiber bed, which is then impregnated with a resin matrix material 32 to form a composite prepreg material. The composite prepreg material can be formed into a composite structure and cured. In this embodiment, the carbon fiber filaments 204 have a highly ordered carbon structure on their outermost few nanometers, and the diameters of the carbon fiber filaments 204 are artificially increased because of the significant amount of perfectly crystalline graphene in the outermost few nanometers of the graphene-augmented carbon fiber 200A. This improves modulus and the strength of interactions between the graphene-augmented fibers 200A and the resin matrix material 32, such that the graphene augmented fiber 200A becomes part of the macromolecular resin complex.

Carbon fiber filaments 204 used in all embodiments of Example Set #2 are separated from a carbon fiber tow 210. Carbon fiber tows 210 are commercially available from many sources, and typically comprise thousands of individual carbon fiber filaments 204. For example, carbon fiber tows 210 having 1,000 carbon fiber filaments 204, 3,000 carbon fiber filaments 204, 6,000 carbon fiber filaments 204, 12,000 carbon fiber filaments 204 or 24,000 carbon fiber filaments 204 are typical in the aerospace industry. Outside of aerospace, carbon fiber tows 210 having up to about 300,000 carbon fiber filaments 204 are available.

FIG. 16 shows another embodiment of a graphene-augmented carbon fiber 200B comprising a substantially cylindrical bundle 206 of 19 carbon fiber filaments 204 wrapped with a graphene film 38 as disclosed above. Bundles 206 may also comprise groups of 7, 37 or 61 carbon fiber filaments 204, or any other suitable quantity of carbon fiber filaments. In this embodiment, the graphene film 38 has a width of about 0.5 microns to about 10 microns and has holes 42 through the graphene film 38. The holes 42 are substantially circular and have a diameter of about 1 to about 20 nanometers, and preferably have a size greater than about 100 carbon atoms. Holes 42 may be positioned anywhere in the graphene film 38. The graphene film 38 has a density of holes in the range of about 4 E7 to about 4 E10 holes per square millimeter, or about one hole per 1,000 to 1 million carbon atoms. The holes 42 create additional edges 43 with a large number of edge atoms. The graphene film 38 may also have a functionalized area 224 as disclosed above. The graphene film 38 squeezes each bundle 206 of carbon fiber filaments 204 to a minimum size, which for a bundle 206 of 19 carbon fiber filaments 204 is a graphene-augmented carbon fiber 200B in the form of a five-filament diameter 230 close-packed, hexagonal-shaped, super-filament bundle 232 (see FIG. 16A). The graphene-augmented carbon fiber 200B of this embodiment may be used by itself to make composite materials 28, or it may be bundled with additional graphene-augmented carbon fibers 200B to form, for example, a 3,000 (158×19) or 6,000 (316×19), or greater, filament bundle, which can be spooled for use in making composite materials 28. Composite materials 28 may be made using graphene-augmented carbon fibers 200B in accordance with known equipment and processes, such as the process disclosed above with regard to single filament graphene-augmented carbon fiber 200A. During the composite material production process, additional time will be necessary to permit the resin matrix material 32 to flow and penetrate through the holes 42 in the graphene film 38 before spreading through the graphene-augmented carbon fiber 200B. The graphene-augmented carbon fibers 200B have an increased uniformity of dispersion in a composite material 28 because the graphene-augmented carbon fibers 200B are packed tightly together. This embodiment thus provides a composite material 28 with graphene reinforcements around each group of 19 carbon fiber filaments 204. In the vicinity of graphene sheet 38, the resin 33 is a macromolecule comprised either of the bismaleimide and the base monomer or the benzoxazine-epoxy resin, which may penetrate holes 42 and include multiple connections to each graphene sheet 38.

FIG. 17 shows another embodiment where a graphene-augmented bed 200C of carbon fiber filaments 204 comprises a substantially rectangular bed 208 of carbon fiber filaments 204 separated from a plurality of carbon fiber tows 210, and wrapped with a graphene film 38 having chemical functionalization 40 as disclosed above. Any overlap areas of the wrapped graphene film 38 should be minimized for this embodiment. The rectangular bed 208 is about 12 inches wide and about 250 microns thick, and comprises about 600,000 carbon fiber filaments 204. The rectangular bed 208 may comprise any other suitable widths and thicknesses, comprising any suitable quantity of carbon fiber filaments 204. The carbon fiber filaments of the rectangular bed 208 are generally aligned along the length wise direction, or the direction of the arrow D in FIG. 17, but the filaments 204 may have variations such as cross-over, spiraling or twist. The carbon fiber filaments 204 may be in the form of 600 carbon fiber tows 210, each carbon fiber tow 210 having 1,000 carbon fiber filaments 204. Other configurations may also be used. In this embodiment, the graphene film 38 has a width of about 0.5 microns to about 100 microns and has holes 42 through the graphene film 35. The holes 42 are substantially circular and have a diameter of about 1 to about 20 nanometers, and preferably have a size greater than about 100 carbon atoms 34. Holes 42 may be positioned anywhere in the graphene film 38. The graphene film 38 has a density of holes in the range of about 4 E7 to about 4 E10 holes per square millimeter, or about one hole per 1,000 to 1 million carbon atoms. The holes 42 create additional edges 43 with a large number of edge atoms. The graphene film 38 may also have a functionalized area 224 as disclosed above.

Figure 18:
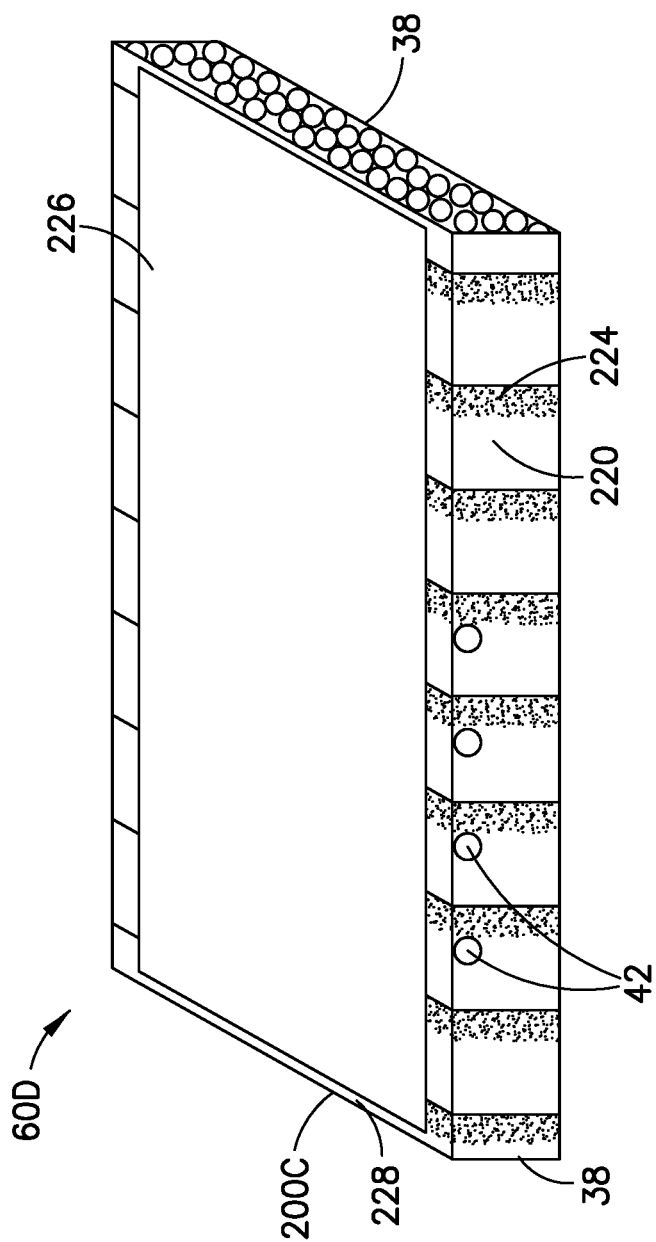
FIG. 18 is an illustration of a composite material comprising a resin material and the bed of carbon fiber filaments formed in FIG. 17.

Referring to FIG. 18, the graphene-augmented carbon fiber 200C in FIG. 17 may be used in producing a composite material 60D by applying a resin film 226 onto a top surface 228 of the graphene-augmented carbon fiber 200C, and then heating to allow the resin to flow to form a prepreg material in accordance with known processes and equipment. Additional time will be necessary to permit the resin film 226 to flow and penetrate through the holes 42 in the graphene film 38 before spreading through the bed 208 of carbon fiber filaments 204 of the graphene-augmented carbon fiber 200C. Multiple composite materials 60D may be stacked such that resin film 226 in each composite material 60D is adjacent to each other. This results in a prepreg laminate with dual sheet reinforcements between each layer of prepreg laminate. In the vicinity of graphene sheet 38, the resin 33 is a macromolecule comprised either of the bismaleimide and the base monomer or the benzoxazine-epoxy resin, which may penetrate holes 42 and include multiple connections to each graphene sheet 38.

Figure 19:
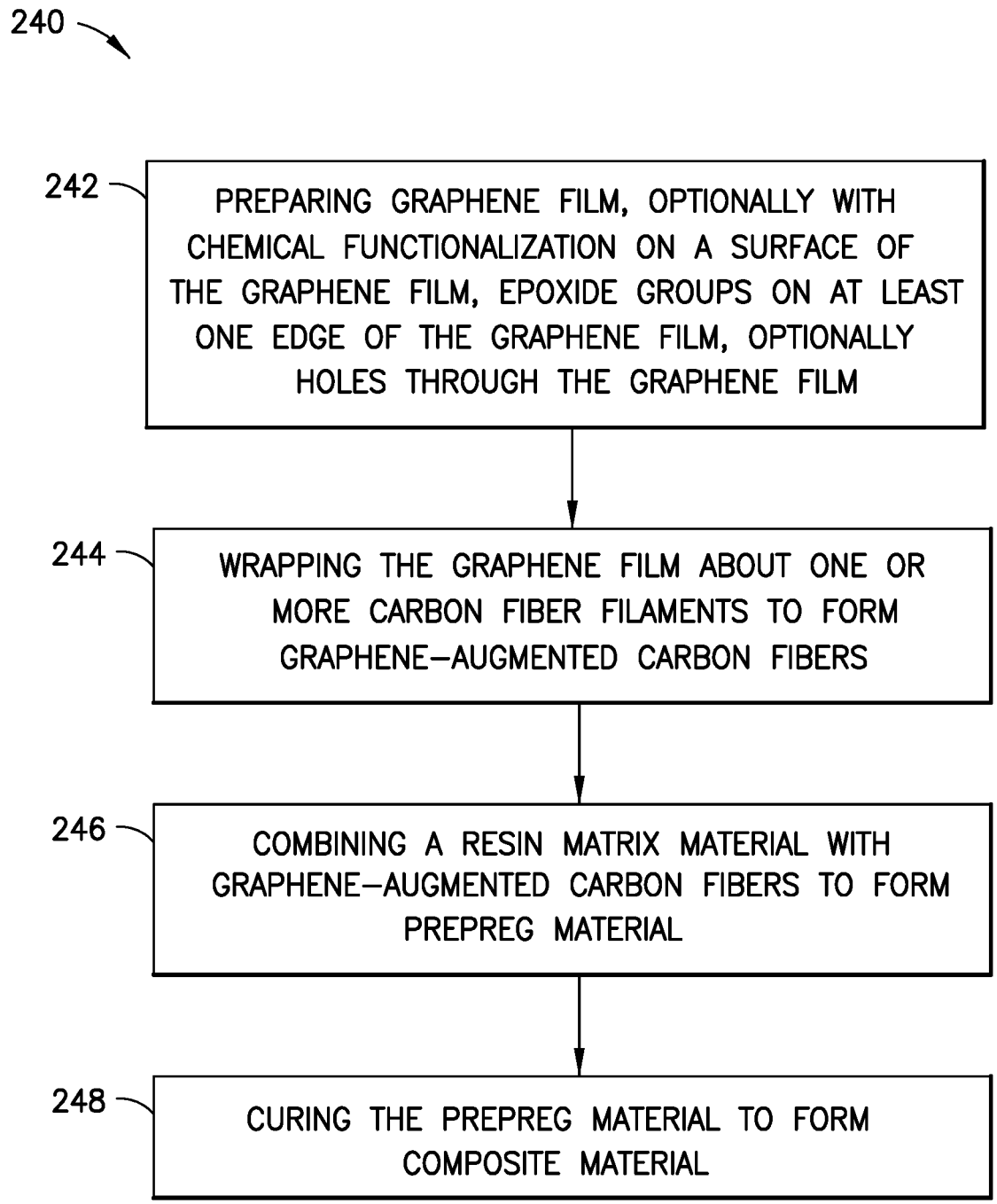
FIG. 19 is an illustration of a flow diagram of an exemplary method for increasing the strength, modulus and stiffness of a composite material with graphene-augmented carbon fibers or a graphene-augmented bed of carbon fiber filaments.

FIG. 19 is an illustration of a flow diagram of an exemplary embodiment of a method 240 of increasing strength, modulus and stiffness of a composite material (like the composite material 28 shown in FIG. 2) comprising carbon reinforcement fibers 30 and a resin matrix material 32. The method 240 comprises step 242 of preparing a graphene film 38 optionally with chemical functionalization 40, such as amine groups 40A, benzoxazine groups 40B, imide groups 40C or a combination of amine groups 40A and imide groups 40C, formed on an outer surface 220 of the graphene film 38, epoxide groups 44 formed on at least one of the first edge 216 and second edges 218 of the graphene film 35, and/or holes 44 formed through the graphene film 38 in accordance with the disclosure above.

In step 244, the graphene film 38 is wrapped about one or more carbon fiber filaments 204 to form graphene-augmented carbon fibers 200A, 200B, or a graphene-augmented bed 200C of carbon fiber filaments 204 in accordance with the disclosure above. In this step, the graphene film 38 may be wrapped around a single carbon fiber filament 204 as shown in FIG. 15, a substantially cylindrical bundle 37 of 7, 19, 37 or 61 carbon fiber filaments 36, or any other suitable quantity of carbon fiber filaments, as shown in FIG. 16, a substantially rectangular bed 208 of carbon fiber filaments from a plurality of carbon fiber tows 210 as shown in FIG. 17, or any other number and arrangement of carbon fiber filaments 204.

In step 246, a plurality of graphene-augmented carbon fibers 200A, 200B or the graphene-augmented bed 200C are combined with a resin matrix material 32 to form a prepreg material. The prepreg material may comprise the graphene-augmented carbon fibers 200A, 200B in unidirectional (aligned) or fabric (woven) form, impregnated to a desired amount with the resin matrix material 32. Preferably, the graphene-augmented carbon fibers 200A, 200B and graphene-augmented bed 200C are pre-impregnated with uncured resin matrix material 32 using equipment and processes known in the art for making prepreg materials. Alternatively, a resin film 226 may be placed on top of the wrapped bed 208 of carbon fiber filaments 204. In step 248, the prepreg material is cured to form a composite material 60D using equipment and processes known in the art for curing prepreg materials.

Example Set #3

In a third set of examples, composite prepreg materials 300A, 300B, 300C are formed from layered graphene films 38 that are bonded together to form composite materials 28. The layered graphene films 38 replace the carbon reinforcement fibers 30 and provide substantial benefits to the strength, stiffness and modulus of the composite materials 28. FIGS. 20A, 20B, 20C, 21A, 21B and 21C illustrate exemplary embodiments of composite prepreg materials 300A, 300B, 300C, respectively, wherein a plurality of layers of graphene films 38 are stacked on top of one another such that upper surfaces 220 and lower surfaces 221 of adjacent layers 302 of graphene film 38 are in contact (FIGS. 20A, 20B, 20C and 20D) and wherein a graphene film 38 is folded to form a crumpled graphene sheet 304 (FIGS. 21A, 21B, 21C and 21D). These embodiments are further described below.

The graphene film 38 employed in all of the embodiments disclosed in this example set #3 is formed as a long graphene sheet having a width that spans a desired width of a composite prepreg material from a first edge 216 to a second edge 218. For example, the graphene film 38 may have a width of 12 inches, 48 inches or 10 meters, or any other width suitable for a composite prepreg material. The graphene film 38 may include chemical functionalization 40 on an upper surface 220 and/or on a lower surface 221 of the graphene film 38 and/or at one or both of the first edge 216 and the second edge 218 or other edges in the graphene film 38. A functionalized graphene film 38 as shown, for example, in FIGS. 3C and 3D with chemical functionalization 40 as disclosed herein, such as added amine groups 40A, benoxazine groups 40B, imide groups 40C, or a combination of amine groups 40A and imide groups 40C, on the upper surface 220 of the graphene film 38, and/or added epoxide groups 44 (when there are no imide groups 40C) on the first edge 216 of the graphene film 38 and/or holes 42 may be used in the embodiments described in this example set #3. Epoxide groups 44 may be added on any edge of the graphene film 38.

Referring to FIG. 5, chemical functionalization 40 may be formed anywhere on the bare substrate 52, including on the lower surface 221 of the graphene film 38, such that the entire graphene film 38 is functionalized. During production of the functionalized graphene film 38, after PAH molecules 50 adsorb to one surface of the substrate 52, the substrate 52 may be flipped over to add chemical functionalization 40 to the other side, or chemical functionalization may be added to both the upper surface 220 and the lower surface 221 at the same time.

The added amine groups 40A, benoxazine groups 40B, imide groups 40C, or a combination of amine groups 40A and imide groups 40C on the upper surface 220 and/or lower surface 221 of the graphene film 38 have a surface density of about 4.0 E10 to about 2.0 E13 groups per square millimeter of the graphene film 38. The surface density may also be described as about 0.1% to about 10.0% of carbon atoms 34 in the graphene film 38 have added amine groups 40A, benoxazine groups 40B, imide groups 40C, or a combination of amine groups 40A and imide groups 40C bonded thereto. That is, 1 to 100 carbon atoms 34 per 1,000 carbon atoms 34 in the graphene film 38 have an amine group 40A, benoxazine group 40B, imide group 40C, or a combination of amine group 40A and imide group 40C bonded thereto.

The graphene film 38 has a linear density of epoxide groups 44 formed on at least one of the first edge 216 and the second edge 218 of the graphene film 38 of about 7,000 to about 1,400,000 groups per millimeter. The density of epoxide groups 44 may also be represented as about 0.1% to about 20% of carbon atoms at the first edge 216 of the graphene film 38 have epoxide groups 44 bonded thereto. That is, 1 to 200 carbon atoms 34 per 1,000 carbon atoms 34 has an epoxide group 44 bonded thereto. Epoxide groups 44 may be formed on any edge in the graphene film 38.

Optionally, as shown in FIGS. 3C and 3D, and FIG. 4, graphene film 38 may be further functionalized by adding at least one hole 42 through the graphene film 38 to provide additional edges 43 where epoxide groups 44 can form. The at least one hole 42 may be formed by providing energy (such as with a laser) to remove molecules from the SAM prior to formation of the CNM, as disclosed herein. Preferably, the at least one hole 42 is formed in the graphene film 38 to have a substantially circular shape with a diameter of about 1-2 nanometers and a size of about 12-80 carbon atoms 34. That is, about 12-80 carbon atoms 34 are removed from the graphene film 38 to form the at least one hole 42 in the graphene film 38. As used herein, the term "substantially circular" means a shape that is either circular, approximating a circle or having rounded edges. The at least one hole 42 may be positioned anywhere on the graphene film 38. The graphene film 38 has a density of holes 42 in the range of about 4 E7 to about 4 E10 holes per square millimeter, or about 1 hole per 1,000 to 1 million carbon atoms. The holes 42 in the graphene film 38 provide space for molecules in, for example, a resin matrix material 32 to penetrate the holes 42 and be mechanically constrained by the graphene film 38, thereby further improving bonding capabilities.

Referring to FIGS. 20A-F, the upper surface 220 and/or lower surface 221 of the graphene film 38, as used in some embodiments, may be functionalized with a density of amine monomers 306 and epoxy monomers 308A, 308B (FIGS. 20A, 20B), a density of BMI monomers 307 (FIGS. 20C, 20D), or a density of BXA monomers 309 (FIGS. 30E, 20F), each having a density of monomers in the range of about 1 E−3 to 4 E−2 (0.001 to 0.04) grams per square meter.

The epoxy monomers 308A, 308B may be bifunctional epoxy monomers 308A or tetrafunctional epoxy monomers 308B. FIG. 20B shows the amine monomers 306 and epoxy monomers 308A, 308B on the graphene film 38 prior to bonding. The amine monomers 306 and epoxy monomers 308A, 308B may be deposited onto the upper surface 220 and/or lower surface 221 of the graphene film 38 using known spray coating methods and equipment. An exemplary amine monomer 306 is 44'DDS, which is readily available from many manufacturers including, for example, Jinan Haohua Industry Co. and Wuhan Fortuna Chemical Co. in China. An exemplary epoxy monomer 308A, 308B is BisF, which is also readily available from many manufacturers, including, for example, Watson International and Hangzhou Dayangchem Co. in China. In the disclosed embodiments, the amine monomers 306 and epoxy monomers 308A, 308B are placed on one of the upper surface 220 and/or lower surface 221 of the graphene film 38.

Figure 20A:
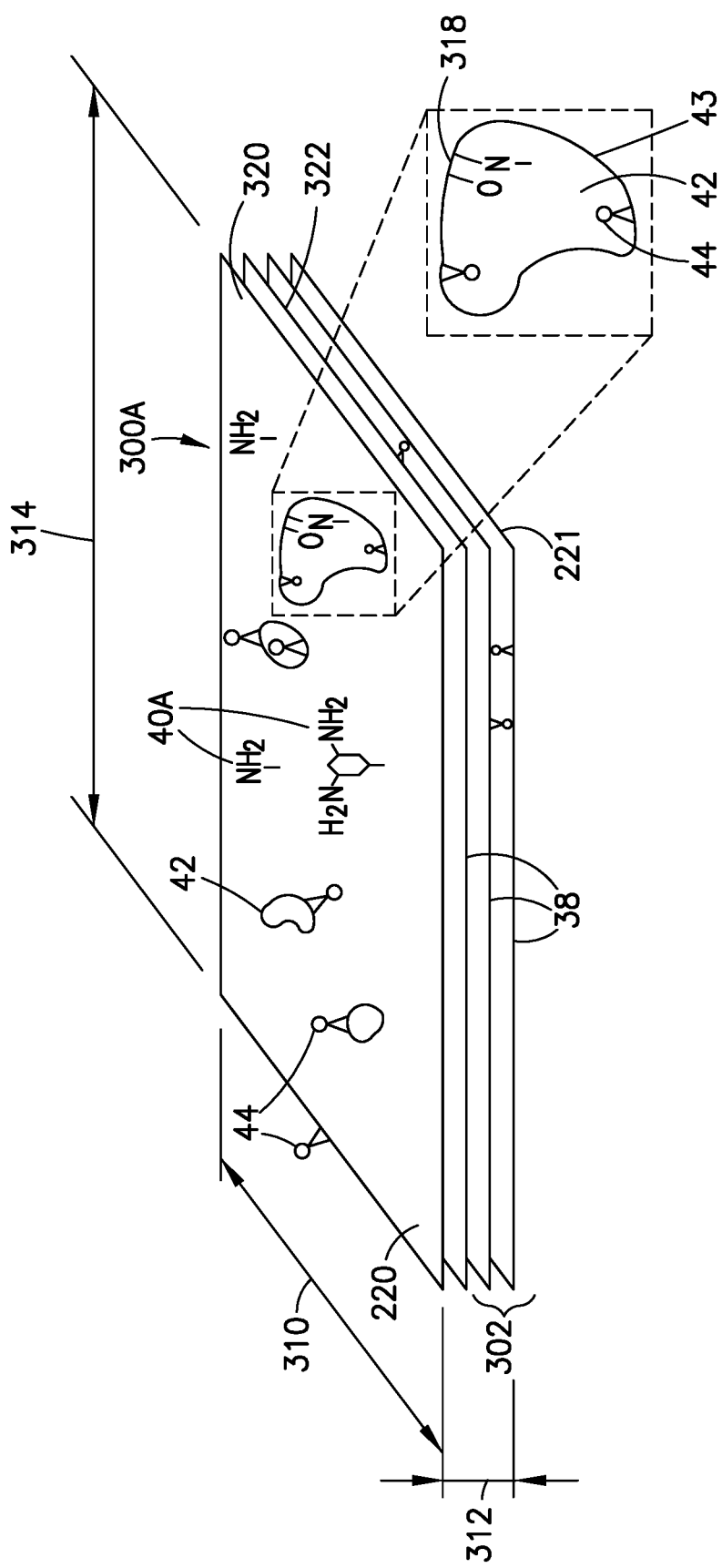
FIG. 20A is an illustration of one embodiment of a stacked composite prepreg material in accordance with this disclosure.
Figure 20B:
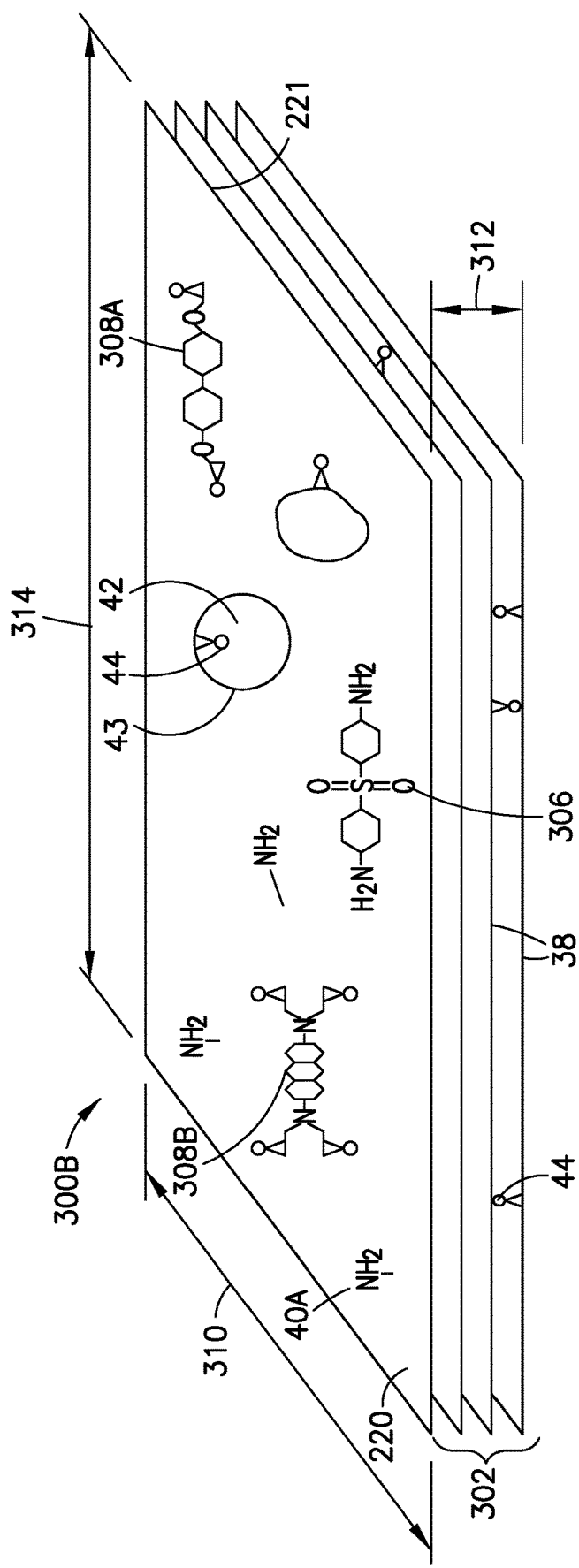
FIG. 20B is an illustration of another embodiment of a stacked composite prepreg material in accordance with this disclosure.
Figure 20C:
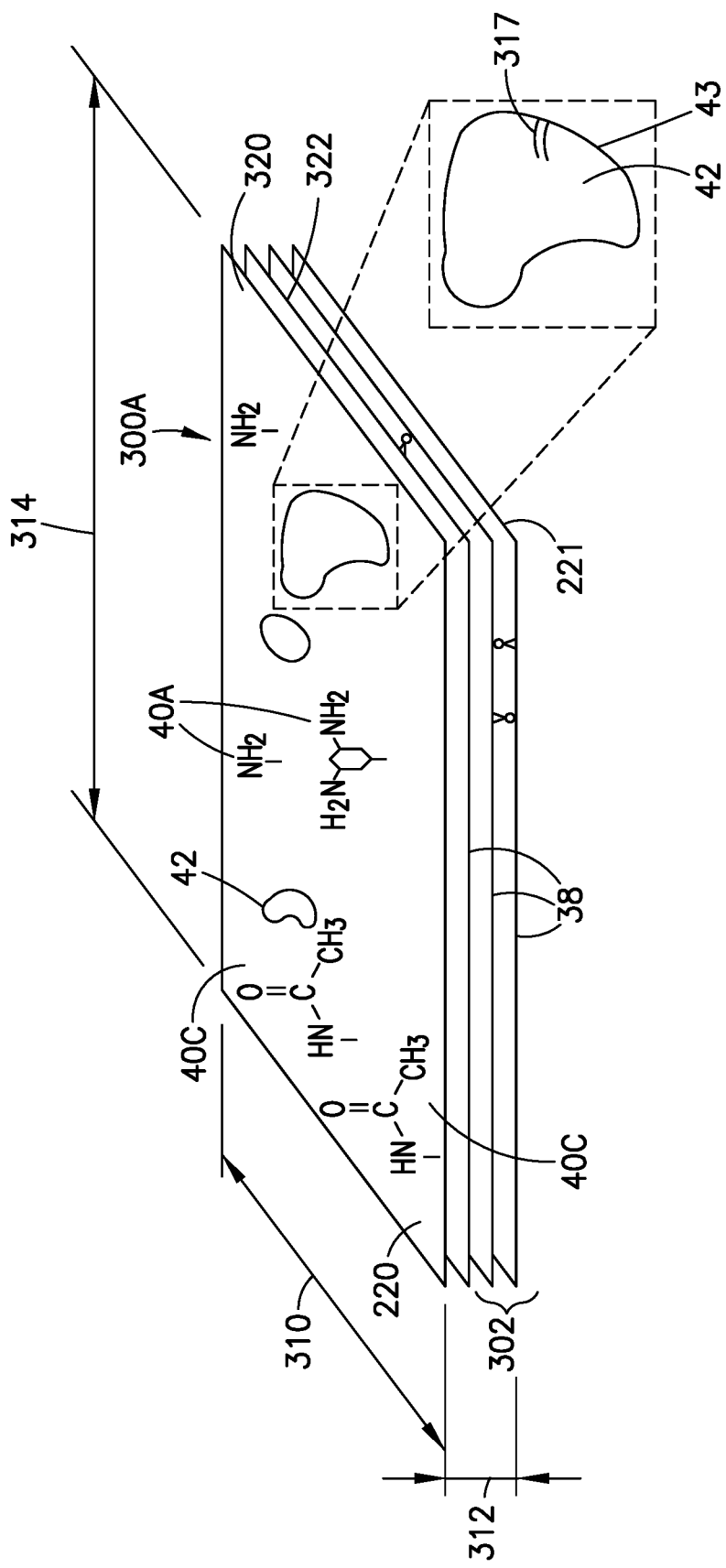
FIG. 20C is an illustration of an alternative embodiment of the stacked composite prepreg material shown in FIG. 20A.
Figure 20D:
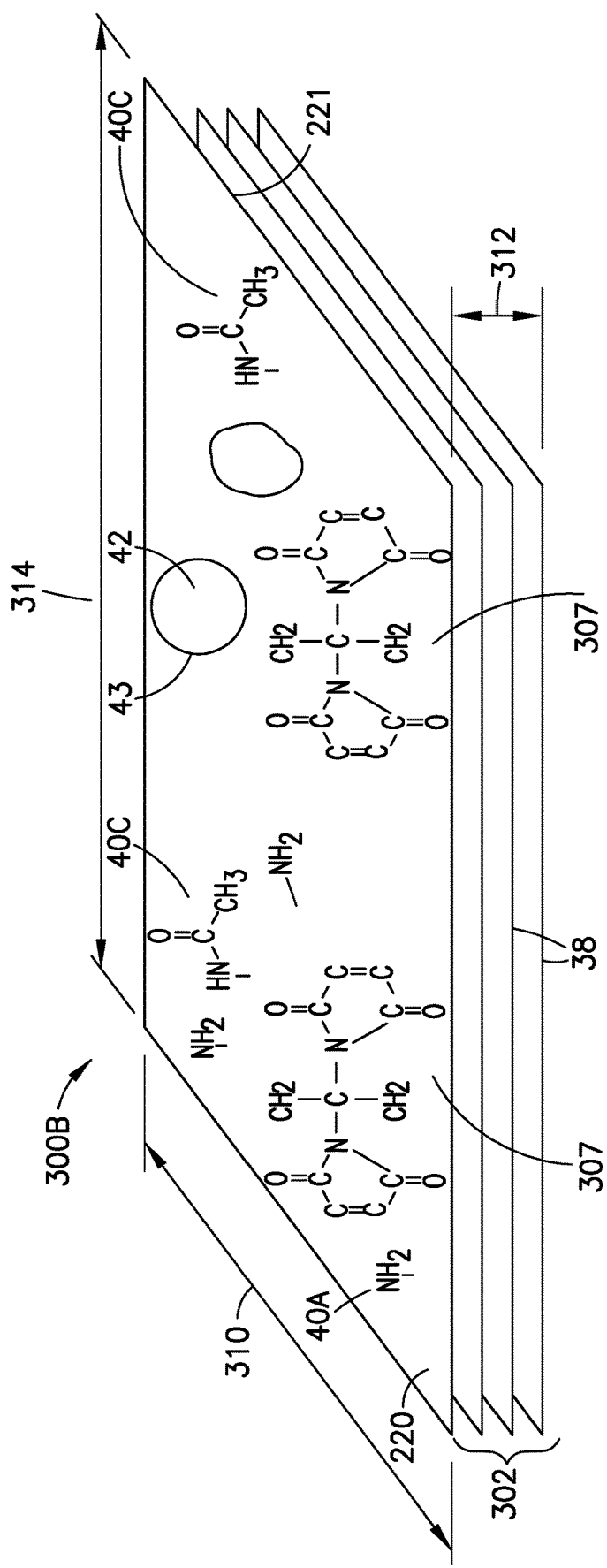
FIG. 20D is an illustration of an alternative embodiment of the stacked composite prepreg material shown in FIG. 20B.

FIG. 20D shows BMI monomers 307 on the graphene film 38 prior to bonding. The BMI monomers 307 m may be deposited onto the upper surface 220 and/or lower surface 221 of the graphene film 38 using known spray coating methods and equipment. An exemplary BMI monomer 307 is 1,1'-(Methylenedi-4,1-phenylen)bismaleimide which is readily available from multiple manufacturers including Sigma Aldrich. In the disclosed embodiments, the BMI monomers 307 are placed on one of the upper surface 220 and/or lower surface 221 of the graphene film 38.

Figure 20E:
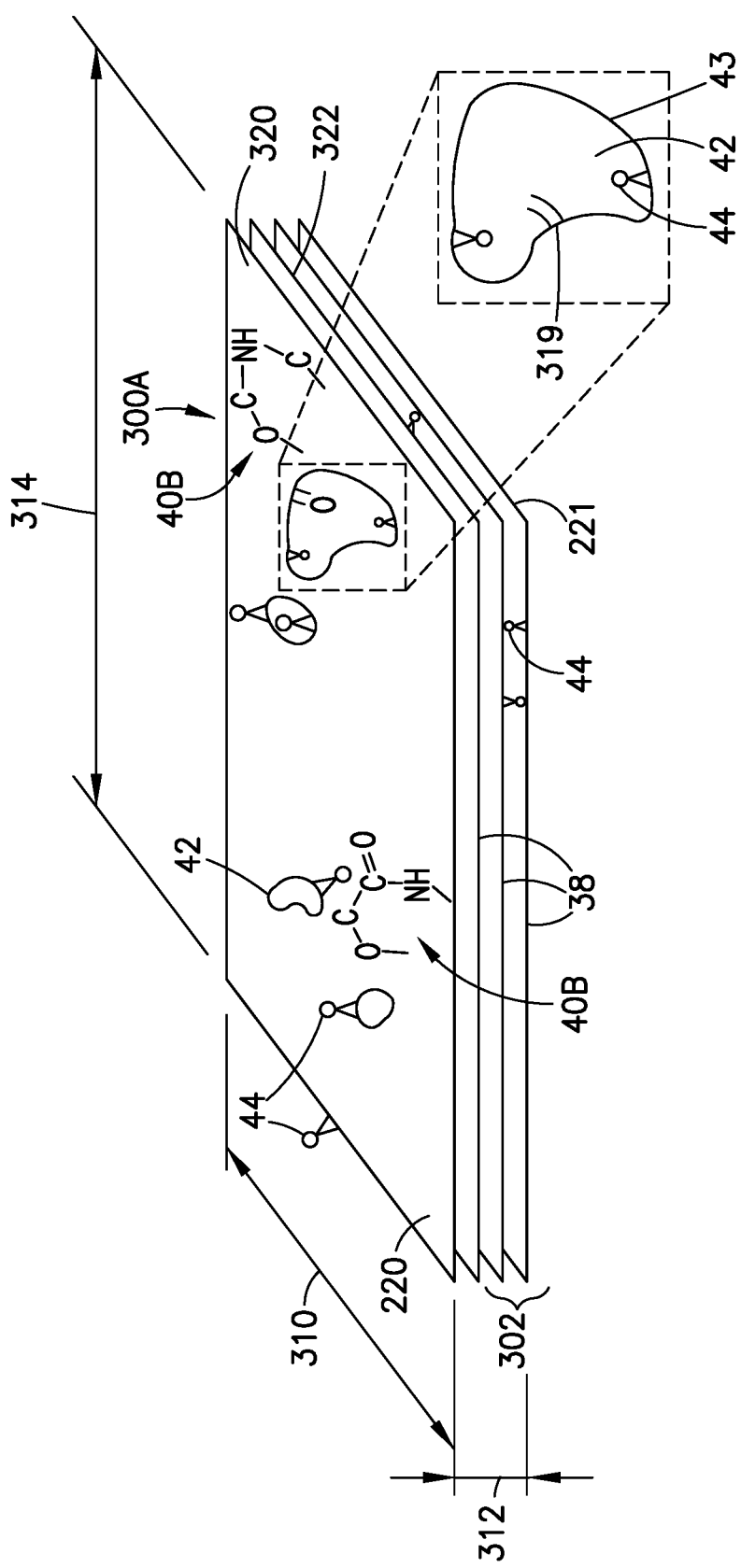
FIG. 20E is an illustration of another alternative embodiment of the stacked composite prepreg material shown in FIG. 20A.
Figure 20F:
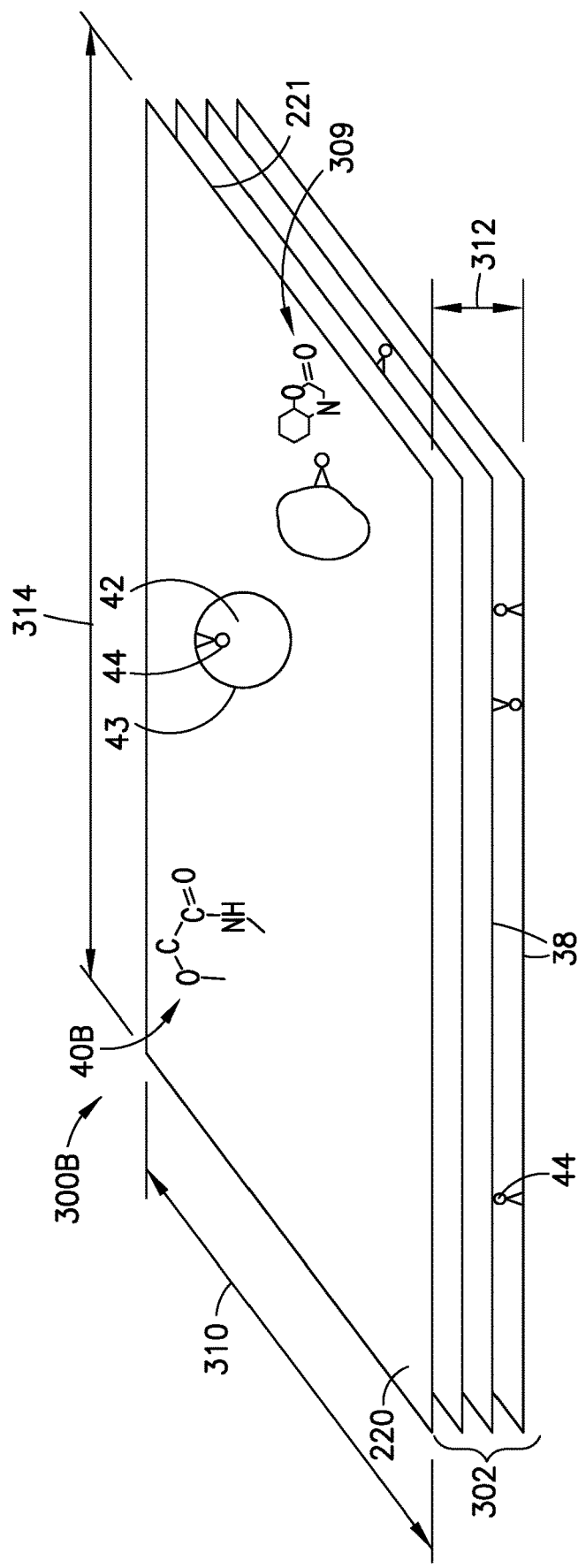
FIG. 20F is an illustration of another alternative embodiment of the stacked composite prepreg material shown in FIG. 20B.

FIG. 20F shows BXA monomers 309 on the graphene film 38 prior to bonding. The BXA monomers 309 may be deposited onto the upper surface 220 and/or lower surface 221 of the graphene film 38 using known spray coating methods and equipment. The BXA monomers 309 may be deposited onto the upper surface 220 and/or lower surface 221 of the graphene film 38 using known spray coating methods and equipment. An exemplary BXA monomer 309 is 2H-1,4-Benzoxazin-3(4H)-one which is readily available from multiple manufacturers including Sigma Aldrich.

FIGS. 20A, 20C and 20E show various embodiments of a stacked composite prepreg material 300A comprising a plurality of layers of graphene film 38 having a size that spans an entire width 310 and an entire length 312 of the stacked composite prepreg material 300A. That is, each of the plurality of layers of graphene film 38 is formed to have the same width 310 and length 312 of the stacked composite prepreg material 300A. In these embodiments, the graphene film 38 is functionalized with holes 42 that are roughly circular in shape and have a size of about 12-80 carbon atoms 34, and either amine groups 40A, benoxazine groups 40B, imide groups 40C, or a combination of amine groups 40A and imide groups 40C having a surface density on both the upper surface 220 and the lower surface 221 of the graphene film 38 of about 4.0 E10 to about 4.0 E13 groups per square millimeter of the graphene film 38 and (in FIGS. 20A and 20E) epoxide groups 44 formed on the edges 316 of the graphene film 38 and the additional edges 43 in the holes 42 of about 7,000 to about 1,400,000 groups per millimeter. FIG. 3B shows a graphene film 38 with a hole 42 having a size of 6 carbon atoms 34, i.e., 6 carbon atoms 34 are removed from the graphene film 38 to form the hole 42.

Thousands of layers of graphene film 38 are stacked to make the stacked composite prepreg material 300A. A preferred thickness of the stacked composite prepreg material 300A is about 0.006 inches, but any thickness may be used for a desired purpose. For example, the layers of graphene film 38 may be stacked to form a stacked composite prepreg material 300A having a defined thickness that can later be built up to a thickness of a composite structure 26, or the layers of graphene film 38 can be stacked to form a stacked composite prepreg 300A having a thickness and thickness contour of the composite structure 26. The stacked composite prepreg material 300A can then be cured in accordance with known processes and equipment for curing composite prepreg materials.

The stacked composite prepreg material 300A may be formed in many ways. For example, the graphene film 38 may be cut and the cut parts can be stacked on top of one another. That process can continue until the desired thickness of the composite prepreg material 300A is achieved. Another method of stacking the graphene films 38 is to merge two or more graphene film production lines to form a continuous multi-layer graphene laminate. A length of the continuous multi-layer graphene laminate may be cut to form the composite prepreg material 300A, or the continuous multi-layer graphene laminate may be cut to a desired size and stacked, and cut and stacked. For example, to form a composite prepreg material 300A having 1,024 layers of graphene film 38 from a 100 meter wide graphene film 38, one could cut the graphene 38 in half (width=50 meters), stack the two halves, cut again to form two halves (width=25 meters), stack those two halves, cut again to form two halves (width=12.5 meters), and that process may continue until the desired width 310 and thickness 312 is achieved. Cutting may also be done from the length of the graphene film 38. The graphene film 38 may be cut with a machine-mounted blade or electron beam, or with any other equipment or processes suitable for cutting graphene film 38.

The stacked layers of graphene film 38 are then heated to form epoxy-amine bonds 318 (FIG. 20A), to react bismaleimide monomers 307 with amine groups 40A and imide groups 40C functionalizing the graphene with bismaleimide-amine bonds 317 (FIG. 20C), or to react benzoxazine monomers 309 with benzoxazine monomers 309, benzoxazine groups 40B and epoxide groups 44 to form polybenzoxazine-epoxy bonds 319 (FIG. 20E) between adjacent layers 302 of the graphene film 38, depending on which chemical functionalization 40 and resin 33 are selected. For example, the chemical structure of a typical epoxy-amine bond 318 is shown in FIG. 20A (in enlarged view) where an epoxide group 44 on an additional edge 43 in a hole 42 in a first graphene film layer 320 has reacted with an amine group 40A on the upper surface 220 of a second graphene film layer 322. Similar reactions occur between amine groups 40A on the lower surface 221 of the first graphene film layer 320 and the epoxide groups 44 on the edges 316 of the second graphene film layer 322. Preferably, every functionalized area on the graphene film 38 is connected to a functionalized area on an adjacent layer 302 of graphene film 38 via the formed bonds. In this case, the stacked composite prepreg material 300A has a density of bonds that is the same as the densities of amine groups 40A, benzoxazine groups 40B, imide groups 40C and epoxide groups 44 disclosed above. The composite prepreg material 300A can then be formed into a composite structure 26 and cured.

FIGS. 20B, 20D and 20F show other embodiments of a stacked composite prepreg material 300B comprising a plurality of layers of graphene film 38 having a size that spans an entire width 310 and an entire length 314 of the stacked composite prepreg material 300B. That is, each of the plurality of layers of graphene film 38 is formed to have the same width 310 and length 312 as the stacked composite prepreg material 300B. In these embodiments, the graphene film 38 is functionalized with holes 42 that are roughly circular in shape and have a size of about 12-80 carbon atoms 34, amine groups 40A, benoxazine groups 40B, imide groups 40C, or a combination of amine groups 40A and imide groups 40C having a surface density on both the upper surface 220 and the lower surface 221 of the graphene film 38 of about 4.0 E10 to about 4.0 E13 groups per square millimeter of the graphene film 38 and (in FIGS. 20B and 20F) epoxide groups 44 formed on the edges 316 of the graphene film 38 and the additional edges 43 in the holes 42 of about 7,000 to about 1,400,000 groups per millimeter.

The graphene film 38 in this embodiment is further functionalized with a density of amine monomers 306 (such as 44'DDS) and a density of epoxy monomers 308A, 308B (such as Bisphenyl F), a density of BMI monomers 307, or a density of BXA monomers 309 as disclosed above, each about 1.0 E−3 to about 4.0 E−2 (i.e., about 0.001 to about 0.04) grams per square meter of the graphene film 38. For example, the epoxy monomer 308A is shown as a bifunctional epoxy monomer on an upper surface 220 of the graphene film 38. The epoxy monomer 308B is shown as a tetrafunctional epoxy monomer on the upper surface 220 of the graphene film 38. The layers of graphene film 38 in this embodiment may be stacked as in the previous embodiment to a desired thickness, such as the thickness of a traditional prepreg, of about 0.006 inch. This embodiment results in a composite prepreg material 300B that is a substitute for traditional prepreg, and has a series of laminated graphene films 38 as in the first embodiment or with epoxy-amine macromolecules, bismaleimide-amine macromolecules, or polybenzoxazine-epoxy macromolecules (not shown).

As described herein, the amine monomers 306, imide monomers 307, benzoxazine monomers 309 and epoxy monomers 308A, 308B can be sprayed onto the graphene film 38. Another approach would be to pick up the graphene film 38 on a perimeter pick up spool, and deposit the amine monomers 306, imide monomers 307, benzoxazine monomers 309 and epoxy monomers 308A, 308B on the graphene film 38 as the pickup spool is rotated, such that the graphene film 38 is layered or stacked at the same time the amine monomers 306, BMI monomers 307, BXA monomers 309 and epoxy monomers 308A, 308B are deposited. This laminated film would then be cut from the spool and formed to the final part shape. The result of this embodiment is a composite prepreg material that is as long as the perimeter of the spool.

Other embodiments of a stacked composite prepreg material 300B employ various combinations of amine groups 40A, benzoxazine groups 40B, imide groups 40C, epoxide groups 44, amine monomers 306, BMI monomers 307, BXA monomers 309 and epoxy monomers 308A, 308B. In one embodiment, the graphene film 38 is functionalized with amine groups 40A, benzoxazine groups 40B, imide groups 40C, or a combination of amine groups 40A and imide groups 40C, having a surface density on both the upper surface 220 and the lower surface 221 of the graphene film 38 of about 4.0 E10 to about 4.0 E13, preferably in the higher range of about 4.0 E12 to about 4.0 E13, groups per square millimeter of the graphene film 38 and a density of BMI monomers 307, BXA monomers 309 of about 1.0 E−3 to about 4.0 E−2 (i.e., about 0.001 to about 0.04) grams per square meter on at least one surface of the graphene film 38. This embodiment does not require any epoxide groups 44 or amine monomers 306. In another embodiment, the graphene film 38 is functionalized with epoxide groups 44 formed on the edges 316 of the graphene film 38 and the additional edges 43 in the holes 42 of about 7,000 to about 1,400,000, preferably in the higher range of about 140,000 to about 1,400,000, groups per millimeter.

FIGS. 21A, 21B, 21C, 21D, 21E and 21F show other embodiments where a folded composite prepreg material 300C comprises a graphene film 38 that has been folded to form a crumpled graphene sheet 304 having a height 324 that spans an entire height 324 of the composite prepreg material 300C. In this embodiment, the graphene film 38 is functionalized with holes 42 having a size of greater than about 100 carbon atoms, amine groups 40A, benzoxazine groups 40B, imide groups 40C, or a combination of amine groups 40A and imide groups 40B, having a surface density on both the upper surface 220 and the lower surface 221 of the graphene film 38 of about 4.0 E10 to about 2.0 E12 groups per square millimeter of the graphene film 38, and epoxide groups 44 formed on at least one edge 216 of the graphene film 38 of about 7,000 to about 700,000 groups per millimeter. The surface density of amine groups 40A, benzoxazine groups 40B, imide groups 40C, or a combination of amine groups 40A and imide groups 40B may also be described as about 0.1% to about 5.0% of carbon atoms 34 in the graphene film 38 have amine groups 40A, benzoxazine groups 40B, imide groups 40C, or a combination of amine groups 40A and imide groups 40B bonded thereto. That is, 1 to 50 carbon atoms 53 per 1,000 carbon atoms in the graphene film 35 have an amine groups 40A, benzoxazine groups 40B, imide groups 40C, or a combination of amine groups 40A and imide groups 40B bonded thereto. The density of epoxide groups 44 may also be represented as about 0.1% to about 10% of carbon atoms in the graphene film 38 have epoxide groups 44 bonded thereto. That is, 1 to 100 carbon atoms 34 per 1,000 carbon atoms 34 has an epoxide group 44 bonded thereto. The graphene film 38 in this embodiment may also be functionalized with a density of amine monomers 306, BMI monomers 307, BXA monomers 309 and epoxy monomers 308A, 308B as described above on at least one of the upper surface 220 or the lower surface 221 of the graphene film 38 in the range of about 1.0 E−3 to about 4.0 E−2 grams per square meter. The amine monomers 306, BMI monomers 307, BXA monomers 309 and epoxy monomers 308A, 308B move through the holes 42 in the graphene film 38.

Figure 21A:
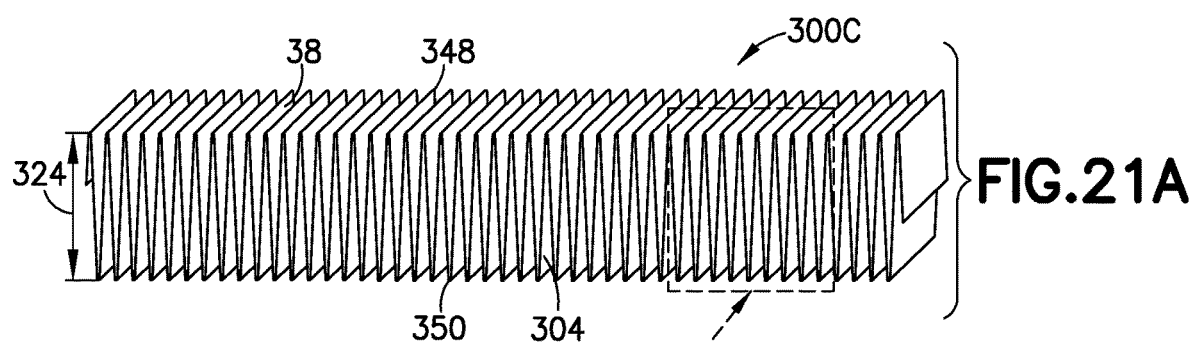
FIG. 21A is an illustration of one embodiment of a crumpled composite prepreg material in accordance with this disclosure.
Figure 21B:
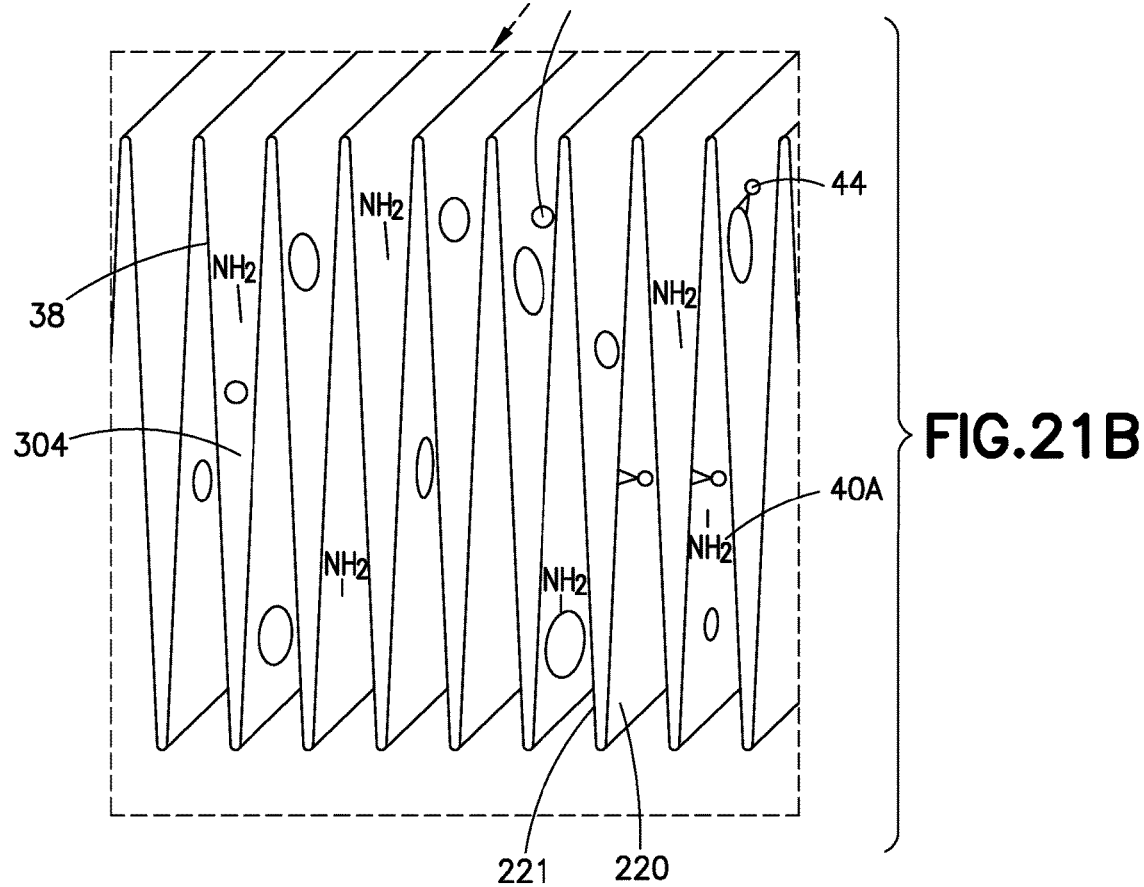
FIG. 21B is an illustration showing a magnified view of a portion of the crumpled prepreg material in FIG. 21A.
Figure 21E:
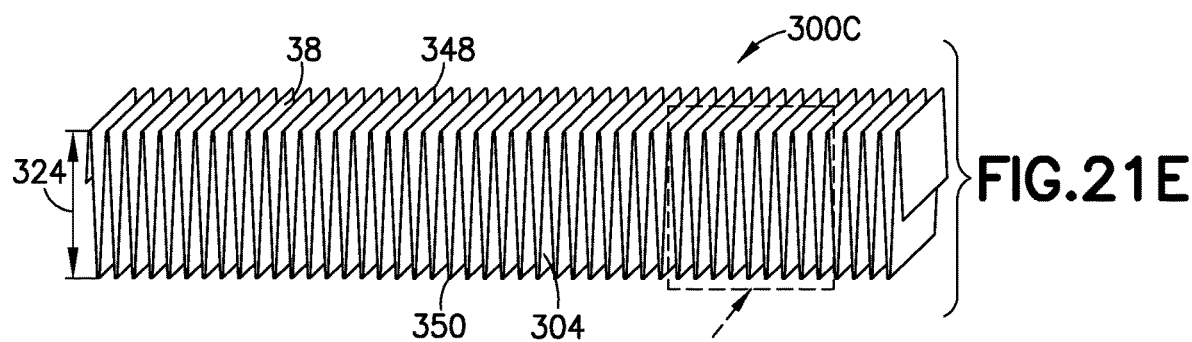
FIG. 21E is an illustration of yet another embodiment of a crumpled composite prepreg material in accordance with this disclosure.
Figure 21F:
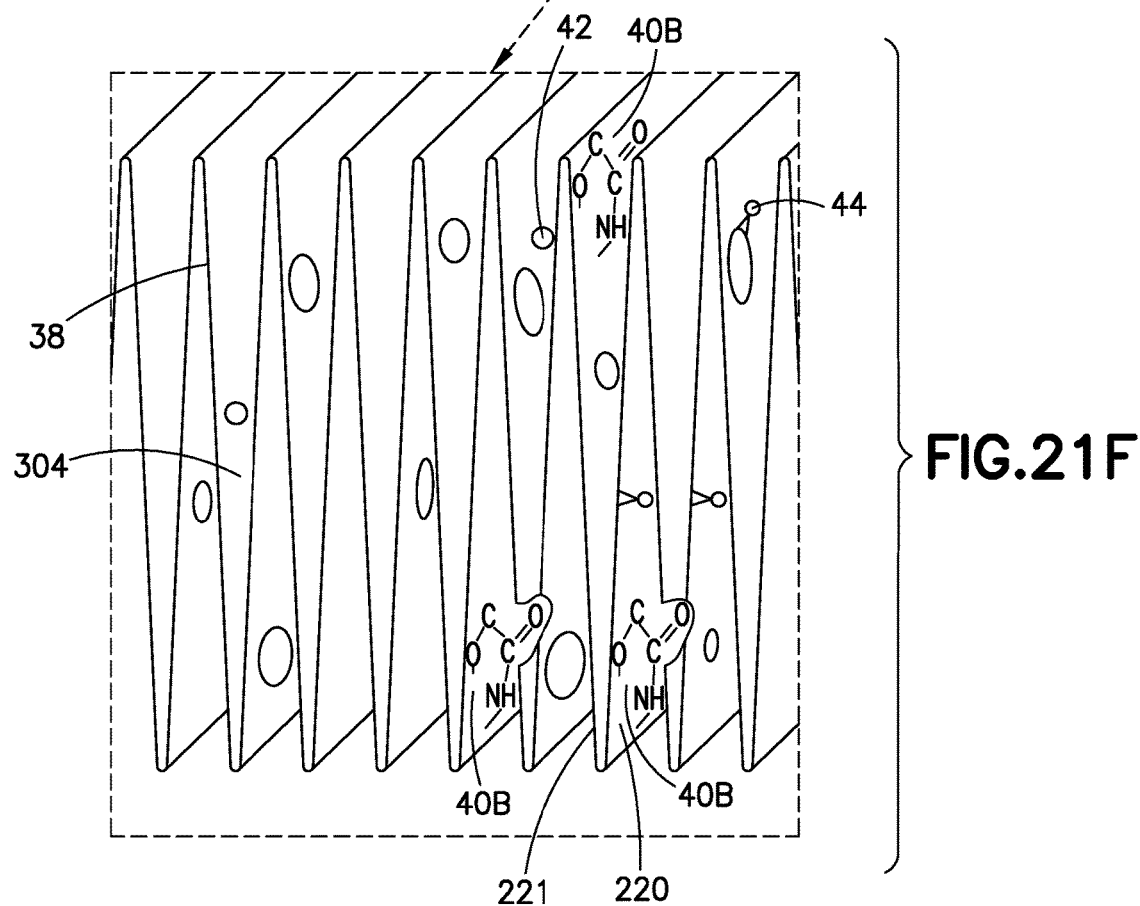
FIG. 21F is an illustration showing a magnified view of a portion of the crumpled prepreg material in FIG. 21E.
Figure 21G:
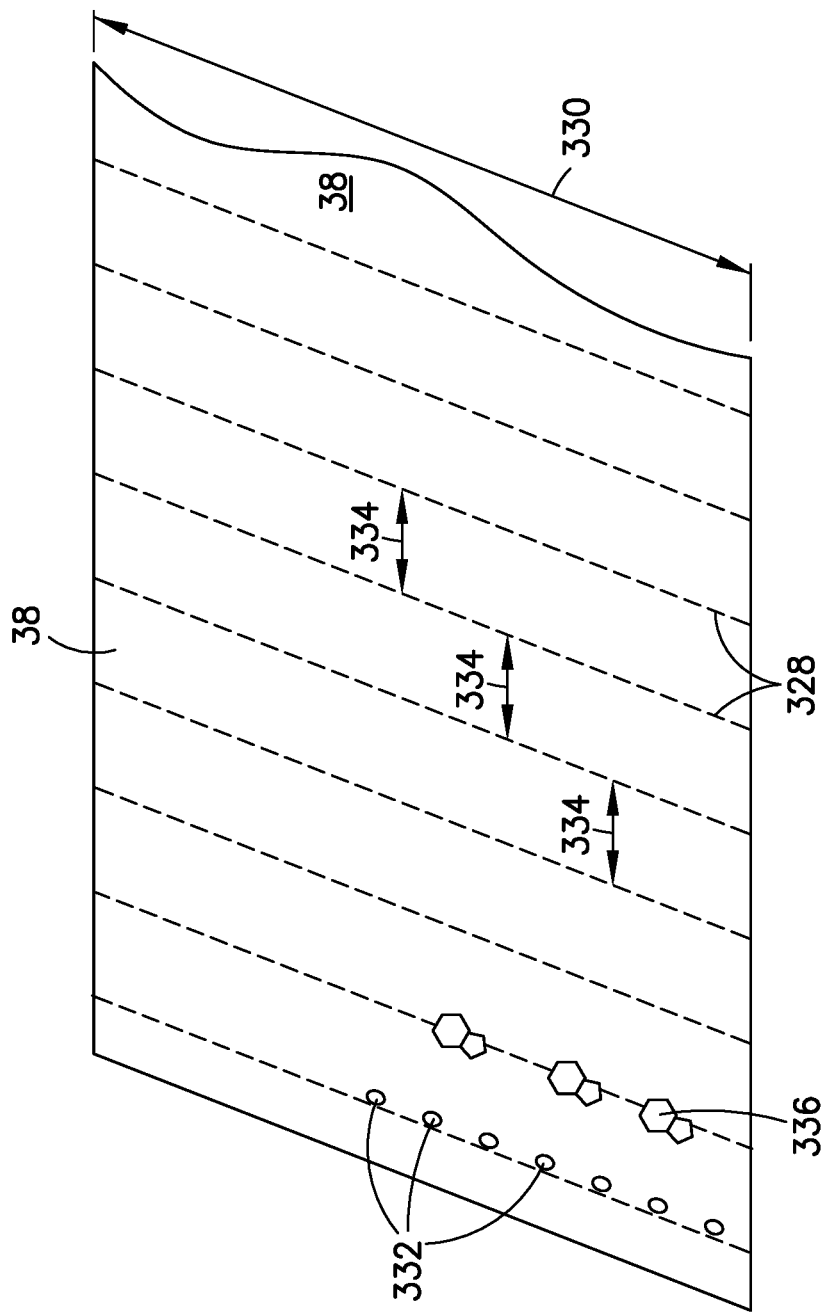
FIG. 21G is an illustration of a graphene film that may be used to make the crumpled composite prepreg material in FIGS. 21A-21F, prior to folding the graphene film.

Referring to FIG. 21G, the graphene film 38 optionally may include regularly spaced lines 328 extending across a width 330 of the graphene film 38 to assist with folding the graphene film 38 to form the crumpled graphene sheet 304. The lines 328 permit the graphene film 38 to fold in an accordion style back and forth along the lines 328. The lines 328 are formed by chemical modification of the upper surface 220 and/or lower surface 221 of the graphene film 38 in regularly spaced lines 328 that are preferentially weaker than unmodified portions of the graphene film 38, thus permitting the graphene film 38 to fold or crumple along the lines 238. Such chemical modification may be achieved by using a laser to instigate a change in the upper surface 220 and/or lower surface 221 of the graphene film 38 during the process of producing the graphene film 38, such as a weaker area where some portion of carbon bonds in the graphene film 38 have been modified or perforations 332 along the lines 328. The lines 328 are preferably regularly spaced apart by a distance 334 approximately equal to the desired thickness of the composite prepreg material 300C (or height 324 of the crumpled graphene sheet 304). For example, to make a crumpled composite prepreg material 300C with a typical prepreg thickness of 0.006 inch, the lines 328 should be spaced apart by a distance 334 of 0.006 inch. The graphene film 38 may also be functionalized with 5-7 defects 336 along the lines 328 where the regular hexagonal lattice of carbon atoms 34 in the graphene film 38 is distributed into a pentagon connected to a heptagon. The defects may be 5-7 carbon defects formed, for example, by ion irradiation of the graphene film 38.

FIG. 22 illustrates one way of forming the crumpled graphene sheet 304 that is used to make the folded composite prepreg material 300C. The graphene film 38 may be unrolled from a spool 212 and pulled continuously through a folding case 338 in a direction shown by arrow A. Force is applied to one end 340 of the graphene film 38 in a direction shown by arrow B as it is pulled through the folding case 338 to cause the graphene film 38 to fold in an accordion style back and forth (along the lines 328 if present) and form the crumpled graphene sheet 304. The folding process may be done continuously, with roll-to-roll processing, therefore not requiring any manual intervention, or it may be done manually. The force may be applied gradually or in increments to gradually fold the graphene film 38 along the lines 328, or as shown in FIGS. 23-24, a plunger 342 may be used to apply the force to the end 340 of the graphene film 38 in the direction shown by arrow B. In FIG. 23, the graphene film 35 is inserted through the folding case 96. In FIG. 10, the plunger 100 is moved in the direction shown by arrow C to a final height 344 above the base 346 of the folding case 338 that is the same as the distance 334 between spaced apart lines 328 in the graphene film 38. For example, in one embodiment, the graphene film 38 is 10 meters wide, 0.4 nanometers thick and 200 meters long as it is unwound from the roll 212 and folded into a crumpled graphene sheet 304 that is 0.3 meter wide, 0.15 mm thick (0.006 inch) and 200 meters long. The length of the graphene film 38 does not change.

After the crumple graphene sheet 304 is formed, or as it emerges from the folding case 338, it has a thickness or height 324 equal to the spaced apart distance 334 between the lines 328, and a width 326 having a size dependent on the width 330 of the graphene film 38. Resin is applied along the width 326 of the crumpled graphene sheet 304 either on the top 348 or the bottom 350 (see FIG. 21A) of the crumpled graphene sheet 304, or on both the top 348 and the bottom 350. The resin may be applied to the crumpled graphene sheet 304 with equipment and processes known for preparing prepreg, such as feeding a film of resin on backing paper and the crumpled graphene sheet 304 through heated rollers to form the crumpled composite prepreg material 300C. The crumpled composite prepreg material 300C may be used as a substitute for traditional prepreg materials. It can be cut to a desired shape and a plurality of cut to shape crumpled composite prepreg materials 300C may be laid up (or laminated together) and then cured to form a composite structure 26.

In another embodiment, the crumpled composite prepreg material 30C may be formed into a particular shape of the desired composite structure 26 by folding the graphene film 35 into the particular shape to form a crumpled graphene sheet 304 having the particular shape that can be infused with resin as described above and cured. Resin may be infused into crumpled graphene sheet 304 using known processes and equipment, such as Resin Transfer Molding (RTM) processes. For example, the crumpled graphene sheet 304 can be placed in a mold having the particular shape, and the mold is closed. Resin is infused into the mold by applying a pressure difference between the air inside the mold and outside the mold so resin will flow into the mold through inlet pipes and air/gas flows out of the mold through outlet pipes. As the resin flows into the mold and surrounds the crumpled graphene sheet 304, the resin displaces air so the result is a fully dense composite structure 26.

Crumpled composite prepreg materials 300C have improved graphitic carbon content over traditional CFRPs, and improved load transfer between resin and carbon. The crumpled composite prepreg material 300C is a macromolecule comprised of the base amine monomer (such as 44'DDS), base epoxy monomer (such as Bisphenyl F), and a single graphene macromolecule, or a macromolecule comprised of polybenzoxazine-epoxy resin and a single graphene macromolecule, or a macromolecule comprised of bismaleimide, the base amine monomer (such as 44'DDS) and a single graphene macromolecule, depending on the chemical functionalization selected.

Figure 25:
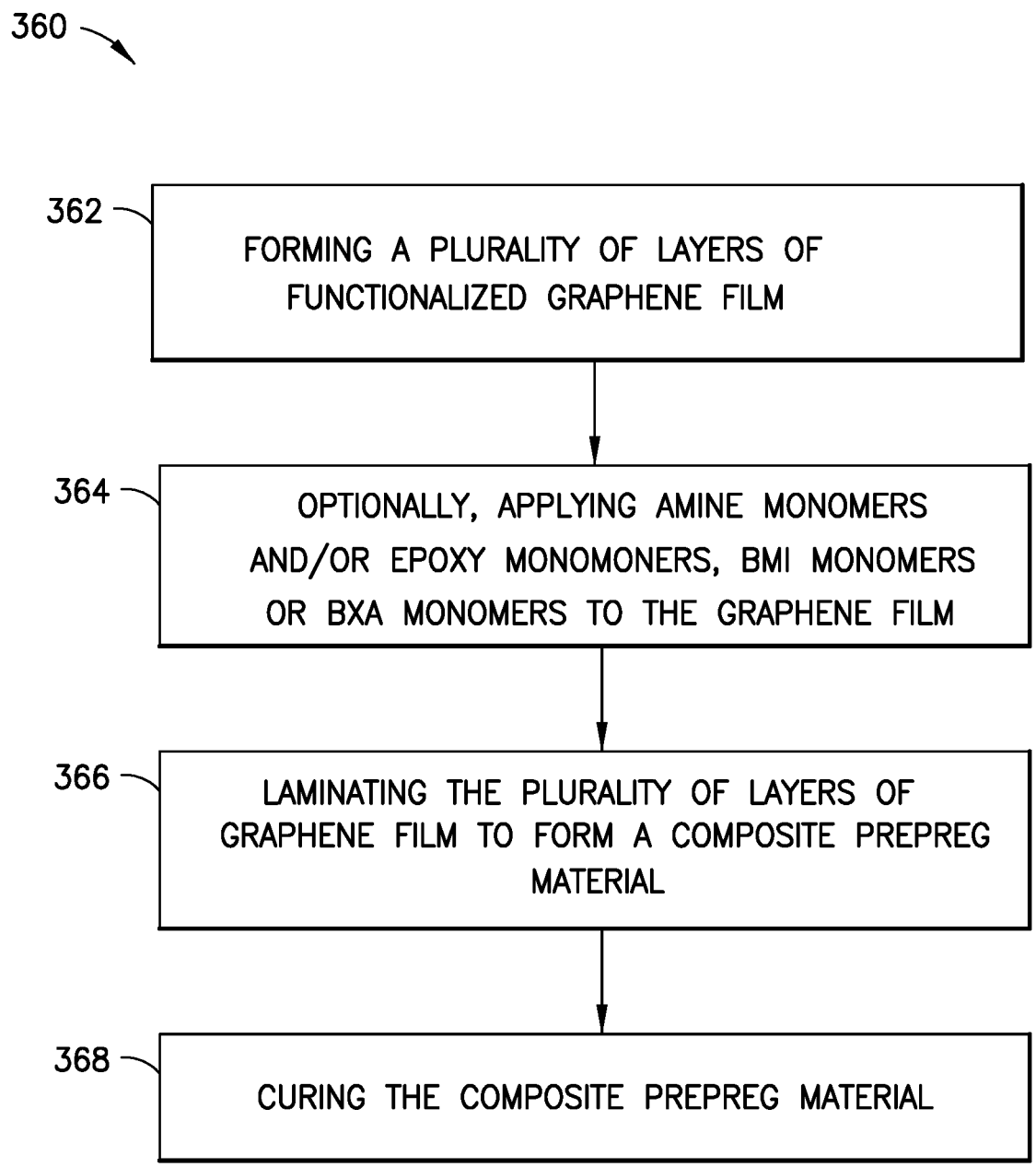
FIG. 25 is an illustration of a flow diagram of an exemplary method for making a composite prepreg material in accordance with this disclosure.

FIG. 25 is an illustration of a flow diagram of an exemplary embodiment of a method 360 of making a stacked composite prepreg material 300A, 300B as shown in FIGS. 20A-20F. The method 360 comprises step 362 of forming a plurality of layers of graphene film 38 optionally having chemical functionalization 40 formed on an outer surface 220 of the graphene film 38, epoxide groups 44 formed on at least one of the first edge 216 and second edges 218 of the graphene film 38, and/or holes 42 formed through the graphene film 38 in accordance with the disclosure above. In step 364, amine monomers 306 and epoxy monomers 308A, 308B, or BMI monomers 307 or BXA monomers 309 may be applied to the graphene film 38 as disclosed above. In step 366, the plurality of layers of graphene film 38 are stacked and laminated together to form a stacked composite prepreg material 300A, 300B as disclosed above. In step 368, the stacked composite prepreg material 300A, 300B may be combined with other stacked composite prepreg materials 300A, 300B or traditional prepreg materials and cured to form a composite structure 26.

Figure 26:
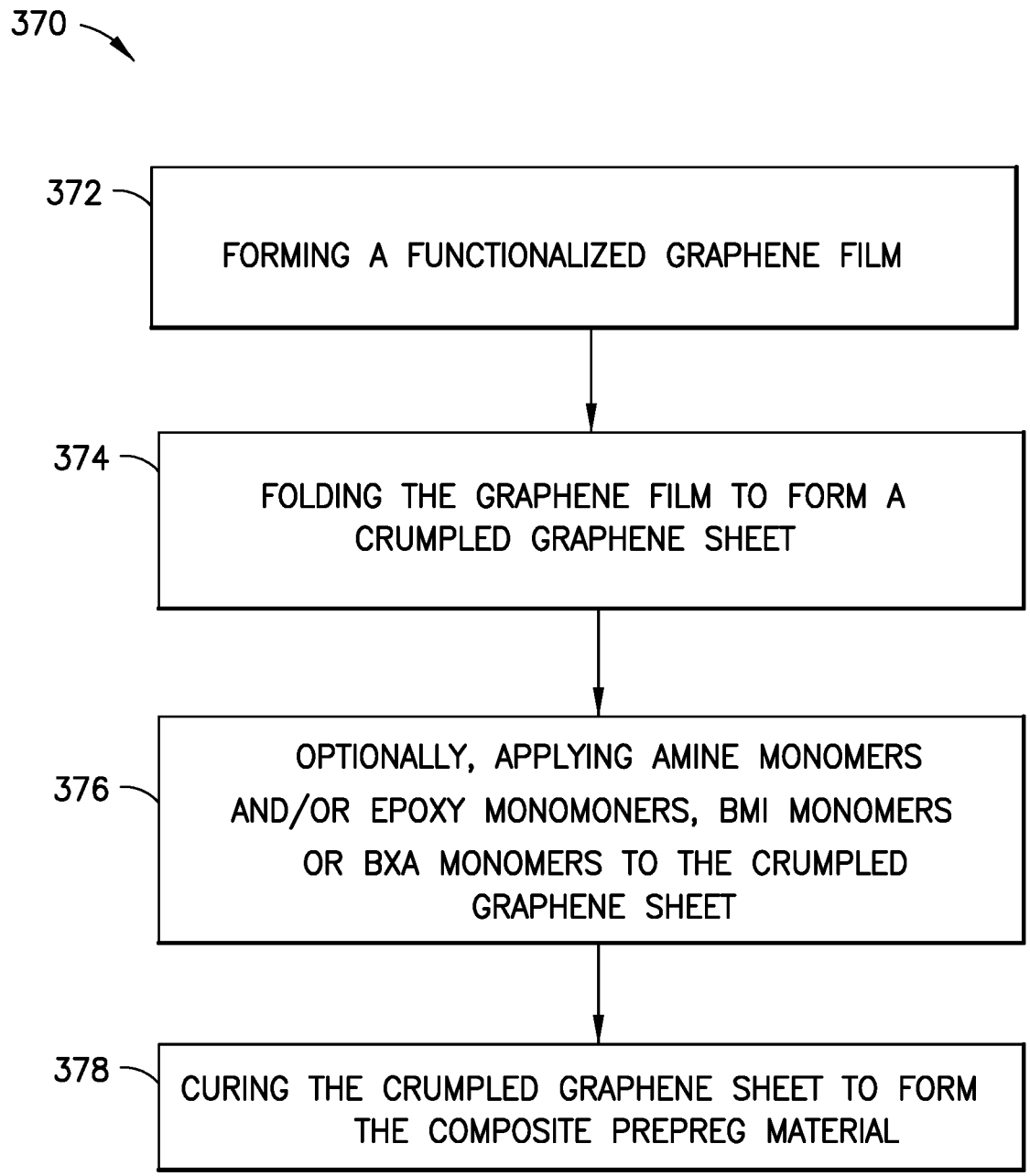
FIG. 26 is an illustration of a flow diagram of another exemplary method for making a composite prepreg material in accordance with this disclosure.

FIG. 26 is an illustration of a flow diagram of another exemplary embodiment of a method 370 of making a crumpled composite prepreg material 300C as shown in FIGS. 21A-21G. The method 370 comprises step 372 of forming a plurality of layers of graphene film 38 optionally having chemical functionalization 40 formed on an outer surface 220 of the graphene film 38, epoxide groups 44 formed on at least one of the first edge 216 and second edges 218 of the graphene film 38, and/or holes 42 formed through the graphene film 38 in accordance with the disclosure above. Other functionalization of the graphene film 38 may be applied, as well as lines 328 to assist with folding. In step 374, the graphene film 35 is folded as described above to form the crumpled graphene sheet 304. In step 376, amine monomers 306 and/or epoxy monomers 308A, 308B, BMI monomers 307 and/or BXA monomers 309 may be applied to the crumpled graphene sheet as disclosed above. In step 378, the crumpled graphene sheet 304 is cured to form the crumpled composite prepreg material 300C is cured, or resin may be applied prior to curing.

Example Set #4

Figure 27:
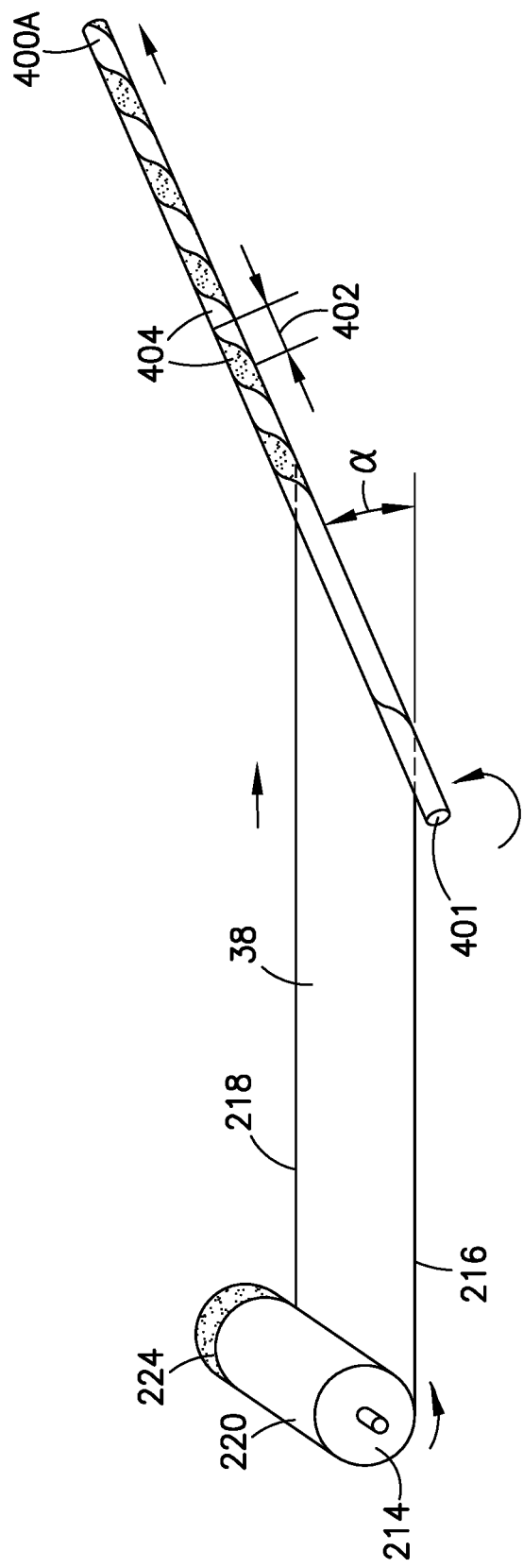
FIG. 27 is an illustration of one embodiment of a graphene fiber made by rolling a graphene sheet and exemplary equipment for producing a graphene fiber by rolling in accordance with this disclosure.
Figure 28:
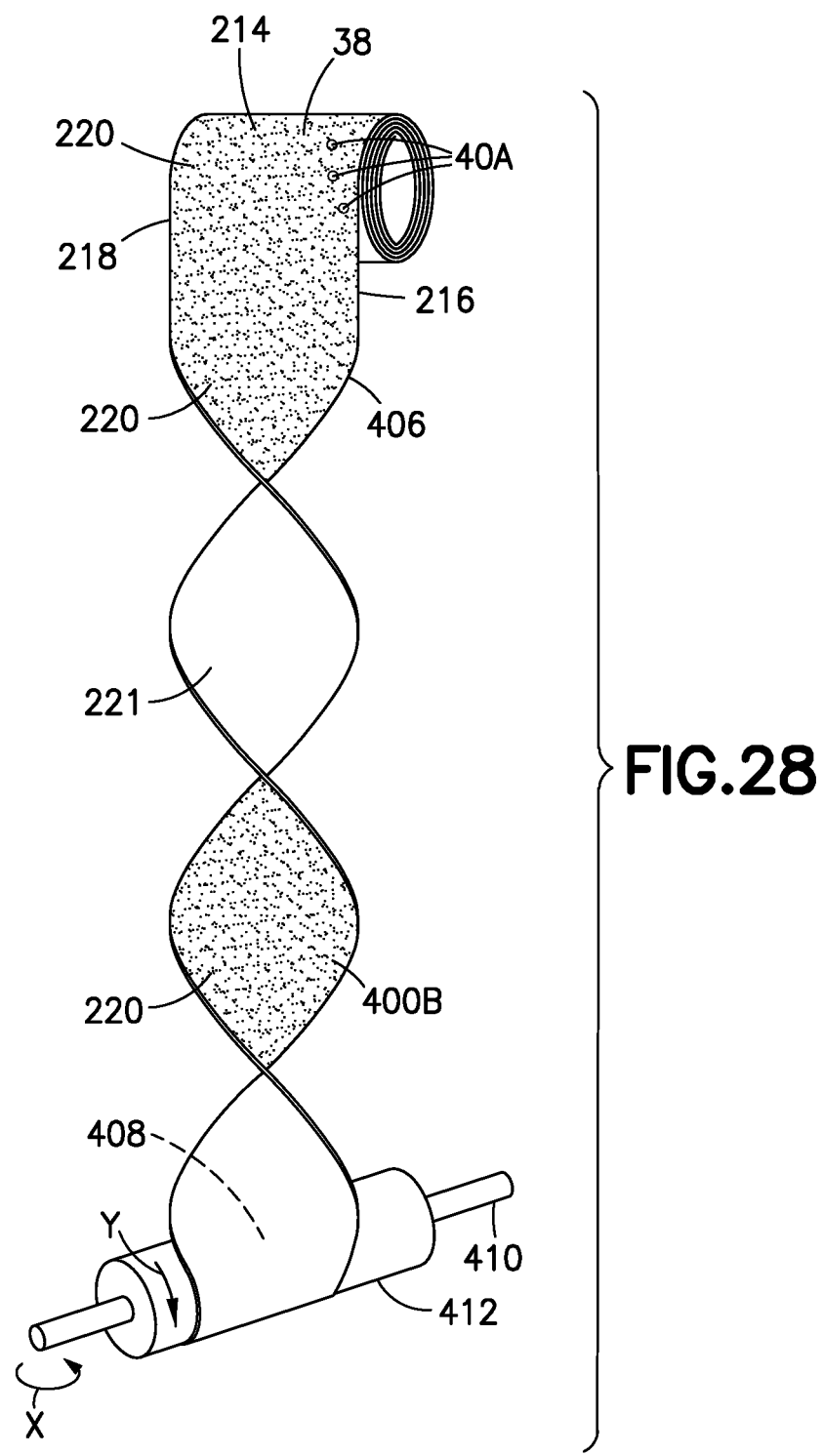
FIG. 28 is an illustration of another embodiment of a graphene fiber made by twisting a graphene sheet and exemplary equipment for producing a graphene fiber by twisting in accordance with this disclosure.

In this fourth example set, graphene fibers 400A, 400B having an elongated fiber-like shape in the form of a rolled or twisted functionalized graphene film 38 are integrated into CFRP-type composite materials 28 as a supplement to or as a replacement for carbon reinforcement fibers 30 to provide substantial benefits to the strength, stiffness and modulus of the composite materials 28. FIGS. 27-28 illustrate two exemplary embodiments of graphene fibers 400A, 400B, respectively, wherein a graphene film 38 is rolled at a slight angle $\alpha$ in an overlapping spiral orientation to form the elongated fiber-like shape of graphene fiber 400A (FIG. 27) or the graphene film 38 is twisted to form the elongated fiber-like shape of graphene fiber 400B (FIG. 28). These embodiments are further described below.

The graphene film 38 employed in all of the embodiments of this example set is formed as a long, thin graphene sheet having a width in the range of about 50 microns to about 500 microns from a first edge 216 to a second edge 216. The graphene film 38 may be rolled on a spool 212 for dispensing to form the graphene fibers 400A, 400B. The graphene film 38 may include chemical functionalization 40, such as amine groups 40A, benzoxazine groups 40B, imide groups 40C, or a combination of amine groups 40A and imide groups 40C, on an outer surface 220 of the graphene film 38 and/or at one or both of the first edge 216 and the second edge 218 as disclosed herein and with reference to FIGS. 3C and 3D. In preferred embodiments, the chemical functionalization is in a functionalized area 224 that extends the length of the graphene film 38 and up to about 10 microns in from the first edge 216. In other embodiments, the functional area 224 may extend the entire width of the graphene film 38 and have added epoxide groups 44 on all edges of the graphene film 38.

The chemical functionalization 40 on the outer surface 48 of the graphene film 35 may have a surface density of about 4.0 E10 to about 2.0 E12 groups per square millimeter (about 4.0 E4 to about 2.0 E6 groups per square micrometer or about 0.4 to about 2.0 groups per square nanometer) of the functionalized area 224. The surface density may also be described as about 0.1% to about 5.0% of carbon atoms 34 in the functionalized area 224 have amine groups 40A, benzoxazine groups 40B, imide groups 40C, or a combination of amine groups 40A and imide groups 40C bonded thereto. That is, 1 to 50 carbon atoms 34 per 1,000 carbon atoms in the functionalized area 224 have an amine group 40A, benzoxazine group 40B, imide group 40C, or a combination of amine groups 40A and imide groups 40C bonded thereto.

The graphene film 38 has a linear density of epoxide groups 44 formed on at least one of the first edge 216 and the second edge 218 of the graphene film 38, preferably on the side of the functionalized area 224, of about 7,000 to about 700,000 groups per millimeter (or about 0.007 to about 0.7 groups per nanometer, or about 7 to about 700 per micrometer). In other embodiments, all edges of the graphene film 38 may have a linear density of epoxide groups 44. The density of epoxide groups 44 may also be represented as about 0.1% to about 10% of carbon atoms at the first edge 216 of the graphene film 38 have epoxide groups 44 bonded thereto. That is, 1 to 100 carbon atoms 34 per 1,000 carbon atoms 34 has an epoxide group 44 bonded thereto. In embodiments functionalized with imide groups 40C, expoxide groups 44 are not necessary.

Optionally, the graphene film 38 may be further functionalized by adding at least one hole 42 through the graphene film 38 to provide additional edges 43 where epoxide groups 44 can form. The at least one hole 42 may be formed by providing energy (such as with a laser) to remove molecules from the SAM prior to formation of the CNM, as disclosed herein. Preferably, the at least one hole 42 is formed in the graphene film 38 to have a substantially circular shape with a diameter of about 1-2 nanometers and a size of about 12-80 carbon atoms 34. That is, about 12-80 carbon atoms 34 are removed from the graphene film 38 to form the at least one hole 42 in the graphene film 38. The at least one hole 42 may be positioned in a random or predetermined pattern anywhere on the graphene film 38. The graphene film has a density of holes 42 in the range of about 4 E7 to about 4 E10 holes per square millimeter, or about 1 hole per 1,000 to 1 million carbon atoms. The holes 42 in the graphene film 38 provide space for molecules in, for example, a resin matrix material 32 to penetrate the holes 42 and be mechanically constrained by the graphene film 38, thereby further improving bonding capabilities.

Referring again to FIG. 27, the graphene film 38 is rolled in a spiral orientation to form a rolled graphene fiber 400A with an elongated fiber-like shape. Rolling may be achieved by any known method for rolling a film or sheet material. For example, a cylindrical pin 401 may be placed near one corner of the graphene film 38 and the graphene film 38 can then be rolled around the pin 401. Multiple layers of rolled graphene film 38 may be formed around the pin 401 by moving the roll 214 of the graphene film 38 longitudinally in both directions along the pin 401. The pin 401 is removed when a sufficient amount of graphene film 38 is rolled to form the desired diameter of the elongated fiber-like shape. The diameter of the rolled graphene fiber 400A is preferably in the range of about 1 micron to about 7 microns, and about 5 microns to about 7 microns for use aerospace applications. During the rolling process, tension should be applied to the graphene film 38 in the range of about 0.001 Newtons (N) per meter width of the graphene sheet. The pin 401 used for rolling the graphene film 38 may be made with lithographic techniques to diameters down in the tens of nanometers. Preferably, the diameter of the pin 401 is less than about 500 nanometers to form a center hollow area or core in the elongated fiber-like shape of the rolled graphene fiber 400A having a diameter of less than 500 nanometers. Other methods of rolling a film or sheet material may be used. For example, rolling methods with no pin 401 may be used to form an elongated fiber-like shape with no center hollow area or core.

The spiral orientation of the rolled graphene film 38 is formed by rolling the graphene film 38 at an angle α relative to a longitudinal axis of the pin 401 and overlapping layers of the graphene film 38. The angle α is preferably less than 0.6 degrees, which leads to a ratio of 1 width to 100 lengths. Rolling at an angle α nearer to zero (0) degrees is beneficial because the final diameter can be longer.

Successive layers of the graphene film 38 partially overlap previous wrapped layers of graphene film 38 such that the functionalized area 224 on the outer surface 220 of the graphene film 38 is not covered, and remains exposed. The offset distance 402 between adjacent overlaps 404 is determined by the angle α and the diameter of the rolled graphene film 38, which changes as it is rolled. In one example, a graphene fiber 400A has a final diameter of 5 microns, with the graphene film 38 rolled at an angle α of 0.6 degrees to provide an offset distance 402 between adjacent overlaps 404 of 50 microns.

In one embodiment of a rolled graphene fiber 400A, the graphene film 38 is functionalized on its outer surface 220 with amine groups 40A in the functionalized area 224 and epoxide groups 44 on the first edge 216 also in the functionalized area 224. In another embodiment, the graphene film 38 is functionalized on its outer surface 220 with benzoxazine groups 40B in the functionalized area 224 and epoxide groups 44 on the first edge 216 also in the functionalized area 224. In a further embodiment, the graphene film 38 is functionalized on its outer surface 220 with imide groups 40C alone or in combination with amine groups 40A in the functionalized area 224 and epoxide groups 44 on the first edge 216 also in the functionalized area 224. The functionalized area 224 is within about 10 microns from the first edge 216. Holes 42 are not necessary for graphene film 38 in this embodiment. The wrapping process provides that the functionalized area 224 is on the outside of the graphene fiber 400A.

In another embodiment of a rolled graphene fiber 400A where the graphene film 35 is functionalized with at least one hole 42 positioned randomly in the graphene film 38, the entire outer surface 220 of the graphene film 38 may include chemical functionalization 40 and both the first edge 216 and the second edge 218 of the graphene film 38 may be functionalized with epoxide groups 44.

Referring to FIG. 28, in another embodiment, the graphene film 38 is twisted to form a graphene fiber 400B with an elongated fiber-like shape having a twisted formation 406. Twisting may be achieved by any known method for twisting a film or sheet material, preferably a continuous process. In one embodiment, one end of the graphene film 38, such as the roll 214, may be supported with something stationary, and the free end 408 of the graphene film 38 may be supported with something that can rotate. For example, in a process that is continuous with the process that forms the graphene film 38, the graphene film 38 may be placed between a pair of rollers to apply a mechanical pressure on it, or between a surface and an air jet to stick the graphene film 38 to the surface so it cannot rotate. Once a good length of graphene film 38 is through the pair of rollers or past the air jet, the free end 408 of the graphene film 38 may be wrapped around a baton 410 and onto a spool or bobbin 412 that is coupled to the baton 410 for movement with the baton 410. The baton 410 and spool or bobbin 412 can then be rotated in the direction X as shown for example in FIG. 28 to twist the graphene film 38 to form the twisted formation 406 of the graphene fiber 400B while the spool or bobbin spins in the direction Y to pick up the graphene fiber 400B. The baton 410 may be rotated once or twice before the spool or bobbin 412 begins to spin. The graphene film 38 is preferably maintained at a tension of below 0.001N during the twisting process. Other types of rotating and spinning devices may be used. The twisted graphene fiber 400B has a diameter in the range of about 1 micron to about 7 microns, and about 5 microns to about 7 microns for use in aerospace composites.

In one embodiment of a twisted graphene fiber 400B, the graphene film 35 has chemical functionalization 40 on a first surface 220 in the functionalized area 224 and epoxide groups 44 on the first edge 216 also in the functionalized area 224. The functionalized area 224 is within about 10 microns from the first edge 216. Holes 42 are not necessary for graphene film 35 in this embodiment.

In other embodiments of a twisted graphene fiber 400B, the entire first surface 220 of the graphene film 38 may include chemical functionalization 40 and both the first edge 216 and the second edge 218 of the graphene film 38 may be functionalized with epoxide groups 44. In yet other embodiments, both the first surface 220 and the second surface 221 of the graphene film 38 may include chemical functionalization 40 in the functionalized area 224 or on the entire outer surface 220 and inner surface 221. The twisting process provides that the chemical functionalization 40 is always exposed. Any of the foregoing embodiments of the twisted graphene fiber 400B may be further functionalized with at least one hole 42 positioned randomly in the graphene film 38.

All of the foregoing embodiments of a rolled graphene fiber 400A and twisted graphene fiber 400B may be used to form a composite material 28 as shown in FIG. 2 the same way carbon reinforcement fibers 30 are used to form composite materials 28. Hundreds of thousands of rolled graphene fibers 400A or twisted graphene fibers 400B are combined together or with carbon reinforcement fibers 30 to form a bed of fibers, and the bed is impregnated with a resin matrix material 32 to form a composite prepreg, which can then be formed into a composite structure 26 and cured in accordance with known processes and equipment. In an embodiment, the rolled graphene fibers 400A or twisted graphene fibers 400B can be combined with carbon fibers to form a composite prepreg, which can then be formed into a composite structure 26 and cured in accordance with known processes and equipment.

Figure 29:
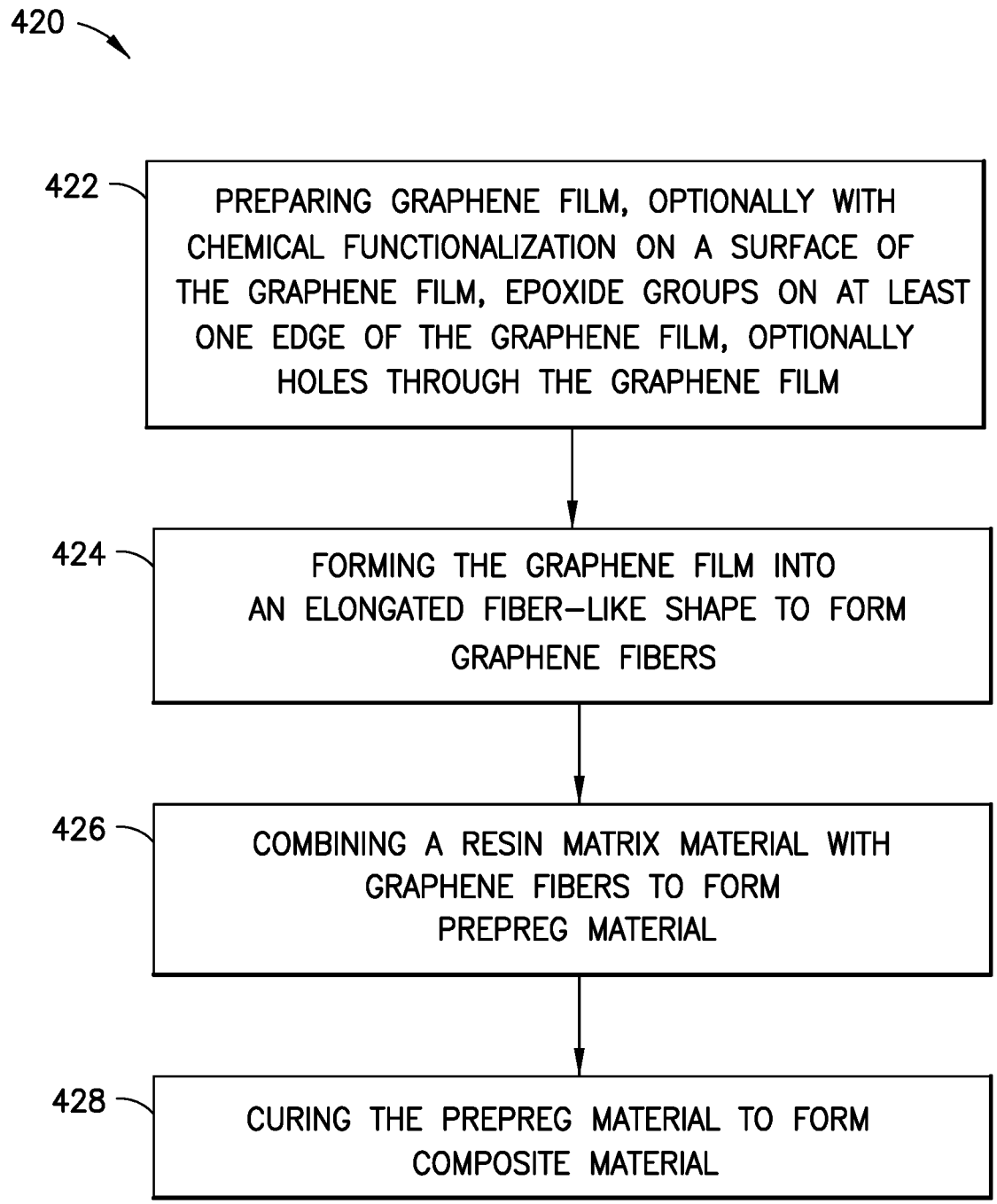
FIG. 29 is an illustration of a flow diagram of an exemplary method for fabricating a graphene fiber reinforced composite with increased strength, modulus and stiffness.

A flow diagram illustrating the steps of a method 420 of fabricating a graphene fiber reinforced composite with increased strength, modulus and stiffness is shown in FIG. 29. The method 420 comprises step 422 of preparing a graphene film 38 optionally having chemical functionalization 40, such as amine groups 40A, benzoxazine groups 40B, imide groups 40C or a combination of amine groups 40A and imide groups 40C, formed on an outer surface 220 of the graphene film 38, epoxide groups 44 formed on at least one of the first edge 216 and second edge 218 of the graphene film 38, and/or holes 42 formed through the graphene film 38 in accordance with the disclosure above.

In step 424, the graphene film 38 is formed into an elongated fiber-like shape to form either a rolled graphene fiber 400A (FIG. 27) or a twisted graphene fiber 400B (FIG. 28) in accordance with the disclosure above.

In step 426, a plurality of graphene fibers 400A, 400B are combined with a resin matrix material 32 to form a prepreg material. The prepreg material may comprise the graphene fibers 400A, 400B in unidirectional (aligned) or fabric (woven) form, impregnated to a desired amount with the resin matrix material 32. Preferably, the graphene fibers 400A, 400B are pre-impregnated with uncured resin matrix material 32 using equipment and processes known in the art for making prepreg materials. In step 428, the prepreg material is cured to form a composite material 28 using equipment and processes known in the art for curing prepreg materials.

The following section of this application describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A composite material comprising carbon reinforcement fibers and a matrix material, the matrix material comprising 0.1% to 100% by weight functionalized graphene nanoplatelets having imide groups formed on a surface of the graphene nanoplatelets.

A2. The composite material of claim A1, wherein the graphene nanoplatelets further comprise amine groups formed on the surface of the graphene nanoplatelets.

A3. The composite material of claim A1, wherein the graphene nanoplatelets further comprise holes formed through the graphene nanoplatelets.

A4. The composite material of claim A3, wherein the holes are substantially circular and have a diameter of 1-2 nanometers.

A5. The composite material of claim A3, wherein the holes have a size of about 12-80 carbon atoms.

A6. The composite material of claim A2, wherein the imide groups and the amine groups on the surface of the graphene nanoplatelets have a surface density of about 4.0 E10 to about 2.0 E12 groups per square millimeter.

A7. The composite material of claim A2, wherein about 0.1% to about 5.0% of carbon atoms in the graphene nanoplatelets have imide groups or amine groups bonded thereto.

A8. The composite material of claim A2, wherein the matrix material comprises an aerospace-grade bismaleimide resin having 0.1% to 5.0% by weight functionalized graphene nanoplatelets.

A9. The composite material of claim A8, wherein the graphene nanoplatelets are present throughout bismaleimide resin and the bismaleimide resin is a macromolecular complex.

A10. The composite material of claim A8, wherein the graphene nanoplatelets form an interlayer between two layers of the bismaleimide resin, and the interlayer is a macromolecular complex of the bismaleimide resin.

A11. The composite material of claim A2, wherein the matrix material comprises 100% by weight functionalized graphene nanoplatelets, and the matrix material is a macromolecular complex of the graphene nanoplatelets.

A12. An aircraft comprising composite structures made from the composite material of claim A1.

A13. A method of increasing strength of a composite material comprising carbon reinforcement fibers and a resin matrix material, the method comprising:
mixing functionalized graphene nanoplatelets into the resin matrix material to form a graphene-resin mixture, the functionalized graphene nanoplatelets having imide groups formed on a surface of the graphene nanoplatelets and epoxide groups formed on at least one edge of the graphene nanoplatelets;
combining the graphene-resin mixture with a plurality of the carbon reinforcement fibers to form a prepreg material; and
curing the prepreg material to form the composite material.

A14. The method of claim A13, wherein the graphene nanoplatelets further comprise amine groups formed on the surface of the graphene nanoplatelets.

A15. The method of claim A14, wherein graphene nanoplatelets have holes formed through the graphene nanoplatelets.

A16. The method of claim A15, wherein the holes are substantially circular and have a diameter of 1-2 nanometers.

A17. The method of claim A15, wherein the holes have a size of about 12-80 carbon atoms.

A18. The method of claim A14, wherein the imide groups and the amine groups on the surface of the graphene nanoplatelets have a surface density of about 4.0 E10 to about 2.0 E12 groups per square millimeter.

A19. The method of claim A14, wherein about 0.1% to about 5.0% of carbon atoms in the graphene nanoplatelets have imide groups or amine groups bonded thereto.

A20. The method of claim A14, wherein the functionalized graphene nanoplatelets are mixed into the resin matrix material in an amount of 0.1% to 5.0% by weight of the graphene-resin mixture.

A21. A method of increasing strength of a composite material comprising carbon reinforcement fibers and a resin matrix material, the method comprising:
combining the resin mixture with a plurality of the carbon reinforcement fibers to form a prepreg material;
depositing functionalized graphene nanoplatelets onto a top surface of the prepreg material to form a graphene interlayer, the functionalized graphene nanoplatelets having imide groups formed on a surface of the graphene nanoplatelets and epoxide groups formed on at least one edge of the graphene nanoplatelets;
laying a second prepreg material on top of the graphene interlayer; and
curing the prepreg material, the graphene interlayer and the second prepreg material to form the composite material.

A22. The method of claim A21, wherein the graphene nanoplatelets further comprise amine groups formed on the surface of the graphene nanoplatelets.

A23. The method of claim A22, wherein the graphene nanoplatelets further comprise holes formed through the graphene nanoplatelets.

A24. The method of claim A23, wherein the holes are substantially circular and have a diameter of 1-2 nanometers.

A25. The method of claim A23, wherein the holes have a size of about 12-80 carbon atoms.

A26. The method of claim A22, wherein the imide groups and the amine groups on the surface of the graphene nanoplatelets have a surface density of about 4.0 E10 to about 2.0 E12 groups per square millimeter.

A27. The method of claim A22, wherein about 0.1% to about 5.0% of carbon atoms in the graphene nanoplatelets have imide groups or amine groups bonded thereto.

A28. The method of claim A22, wherein the prepreg material is cured to a cure state of 0.1.

A29. A method of increasing strength of a composite material comprising carbon reinforcement fibers and a resin matrix material, the method comprising:
forming a bed of the carbon reinforcement fibers;
depositing functionalized graphene nanoplatelets through a top surface of the bed of the carbon reinforcement fibers to penetrate the entire bed of fibers and form a carbon fiber/graphene prepreg material, the functionalized graphene nanoplatelets having imide groups formed on a surface of the graphene nanoplatelets and epoxide groups formed on at least one edge of the graphene nanoplatelets; and
curing the carbon fiber/graphene prepreg material to form the composite material.

A30. The method of claim A29, wherein the graphene nanoplatelets further comprise amine groups formed on the surface of the graphene nanoplatelets.

A31. The method of claim A30, wherein the graphene nanoplatelets further comprise holes formed through the graphene nanoplatelets.

A32. The method of claim A31, wherein the holes are substantially circular and have a diameter of 1-2 nanometers.

A33. The method of claim A31, wherein the holes have a size of about 12-80 carbon atoms.

A34. The method of claim A32, wherein the imide groups and amine groups on the surface of the graphene nanoplatelets have a surface density of about 4.0 E10 to about 2.0 E12 groups per square millimeter.

A35. The method of claim A32, wherein about 0.1% to about 5.0% of carbon atoms in the graphene nanoplatelets have imide groups or amine groups bonded thereto.

A36. The method of claim A32, wherein the prepreg material is cured to a cure state of 0.1.

A37. The method of claim A32, wherein the graphene nanoplatelets are rectangular in shape with sides having a length of 10 nanometers to 100 nanometers.

A38. The composite material of claim A1, wherein the graphene nanoplatelets are rectangular in shape with sides having a length of 10 nanometers to 100 nanometers.

B1. A composite material comprising carbon reinforcement fibers and a matrix material, the matrix material comprising 0.1% to 100% by weight functionalized graphene nanoplatelets having benzoxazine groups formed on a surface of the graphene nanoplatelets and epoxide groups formed on at least one edge of the graphene nanoplatelets.

B2. The composite material of claim B1, wherein the graphene nanoplatelets further comprise holes formed through the graphene nanoplatelets.

B3. The composite material of claim B2, wherein the holes are substantially circular and have a diameter of 1-2 nanometers.

B4. The composite material of claim B2, wherein the holes have a size of about 12-80 carbon atoms.

B5. The composite material of claim B1, wherein the benzoxazine groups on the surface of the graphene nanoplatelets have a surface density of about 4.0 E10 to about 2.0 E12 groups per square millimeter.

B6. The composite material of claim B1, wherein about 0.1% to about 5.0% of carbon atoms in the graphene nanoplatelets have benzoxazine groups bonded thereto.

B7. The composite material of claim B1, wherein the graphene nanoplatelets have a linear density of epoxide groups formed on the edge of about 7,000 to about 700,000 groups per millimeter.

B8. The composite material of claim B1, wherein about 0.1% to about 10% of carbon atoms at the edge of the graphene nanoplatelets have epoxide groups bonded thereto.

B9. The composite material of claim B1, wherein the matrix material comprises an aerospace-grade benzoxazine resin having 0.1% to 5.0% by weight functionalized graphene nanoplatelets.

B10. The composite material of claim B9, wherein the graphene nanoplatelets are present throughout benzoxazine resin and the benzoxazine resin is a macromolecular complex.

B11. The composite material of claim B9, wherein the graphene nanoplatelets form an interlayer between two layers of the benzoxazine resin, and the interlayer is a macromolecular complex of the benzoxazine resin.

B12. The composite material of claim B1, wherein the matrix material comprises 100% by weight functionalized graphene nanoplatelets, and the matrix material is a macromolecular complex of the graphene nanoplatelets.

B13. An aircraft comprising composite structures made from the composite material of claim B1.

B14. A method of increasing strength of a composite material comprising carbon reinforcement fibers and a resin matrix material, the method comprising:
  mixing functionalized graphene nanoplatelets into the resin matrix material to form a graphene-resin mixture, the functionalized graphene nanoplatelets having benzoxazine groups formed on a surface of the graphene nanoplatelets and epoxide groups formed on at least one edge of the graphene nanoplatelets;
  combining the graphene-resin mixture with a plurality of the carbon reinforcement fibers to form a prepreg material; and
  curing the prepreg material to form the composite material.

B15. The method of claim B14, wherein graphene nanoplatelets have holes formed through the graphene nanoplatelets.

B16. The method of claim B15, wherein the holes are substantially circular and have a diameter of 1-2 nanometers.

B17. The method of claim B15, wherein the holes have a size of about 12-80 carbon atoms.

B18. The method of claim B14, wherein the benzoxazine groups on the surface of the graphene nanoplatelets have a surface density of about 4.0 E10 to about 2.0 E12 groups per square millimeter.

B19. The method of claim B14, wherein about 0.1% to about 5.0% of carbon atoms in the graphene nanoplatelets have benzoxazine groups bonded thereto.

B20. The method of claim B14, wherein the graphene nanoplatelets have a linear density of epoxide groups formed on the edge of about 7,000 to about 700,000 groups per millimeter.

B21. The method of claim B14, wherein about 0.1% to about 10% of carbon atoms at the edge of the graphene nanoplatelets have epoxide groups.

B22. The method of claim B14, wherein the functionalized graphene nanoplatelets are mixed into the resin matrix material in an amount of 0.1% to 5.0% by weight of the graphene-resin mixture.

B23. A method of increasing strength of a composite material comprising carbon reinforcement fibers and a resin matrix material, the method comprising:
  combining the resin mixture with a plurality of the carbon reinforcement fibers to form a prepreg material;
  depositing functionalized graphene nanoplatelets onto a top surface of the prepreg material to form a graphene interlayer, the functionalized graphene nanoplatelets having benzoxazine groups formed on a surface of the graphene nanoplatelets and epoxide groups formed on at least one edge of the graphene nanoplatelets;
  laying a second prepreg material on top of the graphene interlayer; and
  curing the prepreg material, the graphene interlayer and the second prepreg material to form the composite material.

B24. The method of claim B23, wherein the graphene nanoplatelets further comprise holes formed through the graphene nanoplatelets.

B25. The method of claim B24, wherein the holes are substantially circular and have a diameter of 1-2 nanometers.

B26. The method of claim B24, wherein the holes have a size of about 12-80 carbon atoms.

B27. The method of claim B23, wherein the benzoxazine groups on the surface of the graphene nanoplatelets have a surface density of about 4.0 E10 to about 2.0 E12 groups per square millimeter.

B28. The method of claim B23, wherein about 0.1% to about 5.0% of carbon atoms in the graphene nanoplatelets have benzoxazine groups bonded thereto.

B29. The method of claim B23, wherein the graphene nanoplatelets have a linear density of epoxide groups formed on the edge of about 7,000 to about 700,000 groups per millimeter.

B30. The method of claim B23, wherein about 0.1% to about 10% of carbon atoms at the edge of the graphene nanoplatelets have epoxide groups.

B31. The method of claim B23, wherein the prepreg material is cured to a cure state of 0.1.

B32. A method of increasing strength of a composite material comprising carbon reinforcement fibers and a resin matrix material, the method comprising:
  forming a bed of the carbon reinforcement fibers;
  depositing functionalized graphene nanoplatelets through a top surface of the bed of the carbon reinforcement fibers to penetrate the entire bed of fibers and form a carbon fiber/graphene prepreg material, the functionalized graphene nanoplatelets having benzoxazine groups formed on a surface of the graphene nanoplatelets and epoxide groups formed on at least one edge of the graphene nanoplatelets; and
  curing the carbon fiber/graphene prepreg material to form the composite material.

B33. The method of claim B32, wherein the graphene nanoplatelets further comprise holes formed through the graphene nanoplatelets.

B34. The method of claim B33, wherein the holes are substantially circular and have a diameter of 1-2 nanometers.

B35. The method of claim B33, wherein the holes have a size of about 12-80 carbon atoms.

B36. The method of claim B32, wherein the benzoxazine groups on the surface of the graphene nanoplatelets have a surface density of about 4.0 E10 to about 2.0 E12 groups per square millimeter.

B37. The method of claim B32, wherein about 0.1% to about 5.0% of carbon atoms in the graphene nanoplatelets have benzoxazine groups bonded thereto.

B38. The method of claim B32, wherein the graphene nanoplatelets have a linear density of epoxide groups formed on the edge of about 7,000 to about 700,000 groups per millimeter.

B39. The method of claim B32, wherein about 0.1% to about 10% of carbon atoms at the edge of the graphene nanoplatelets have epoxide groups.

B40. The method of claim B32, wherein the prepreg material is cured to a cure state of 0.1.

B41. The method of claim B32, wherein the graphene nanoplatelets are rectangular in shape with sides having a length of 10 nanometers to 100 nanometers.

B42. The composite material of claim B1, wherein the graphene nanoplatelets are rectangular in shape with sides having a length of 10 nanometers to 100 nanometers.

C1. A graphene-augmented carbon fiber comprising a functionalized graphene film disposed about a carbon fiber filament, the functionalized graphene film having benzoxazine groups formed on an outer surface of the graphene film and epoxide groups formed on at least one edge of the graphene film C2. The graphene-augmented carbon fiber of claim C1, wherein the functionalized graphene film is wrapped about the carbon fiber filament in a spiral orientation.

C3. The graphene-augmented carbon fiber of claim C2, wherein the functionalized graphene film is wrapped about the carbon fiber filament to a thickness of about 0.1 to about 3.0 microns to form about 300 to about 9,000 layers of the functionalized graphene film on top of the carbon fiber filament.

C4. The graphene-augmented carbon fiber of claim C1, wherein the benzoxazine groups are formed in a functionalized area on the outer surface of the functionalized graphene film that is within about 10 microns from the at least one edge of the functionalized graphene film.

C5. The graphene-augmented carbon fiber of claim C4, wherein the benzoxazine groups in the functionalized area on the outer surface of the functionalized graphene film have a surface density of about 4.0 E10 to about 2.0 E12 groups per square millimeter of the functionalized area.

C6. The graphene-augmented carbon fiber of claim C4, wherein about 0.1% to about 5.0% of carbon atoms in the functionalized area of the functionalized graphene film have benzoxazine groups bonded thereto.

C7. The graphene-augmented carbon fiber of claim C3, wherein the functionalized graphene film has a linear density of epoxide groups formed on the at least one edge of about 7,000 to about 700,000 groups per millimeter.

C8. The graphene-augmented carbon fiber of claim C3, wherein about 0.1% to about 10% of carbon atoms at the least one edge of the functionalized graphene film have epoxide groups bonded thereto.

C9. The graphene-augmented carbon fiber of claim C3, wherein the functionalized graphene film is about 0.5 microns to about 100 microns wide.

C10. The graphene-augmented carbon fiber of claim C3, wherein the functionalized graphene film further comprises at least one hole formed through the graphene film.

C11. The graphene-augmented carbon fiber of claim C10, wherein the holes are substantially circular and have a diameter of 1-2 nanometers.

C12. The graphene-augmented carbon fiber of claim C10, wherein the functionalized graphene film has a density of holes in the range of about 4 E7 to about 4 E10 holes per square millimeter, or about one hole per 1,000 to 1 million carbon atoms.

C13. The graphene-augmented carbon fiber of claim C10, wherein the holes have a size of about 12-80 carbon atoms.

C14. The graphene-augmented carbon fiber of claim C1, wherein the functionalized graphene film is wrapped around a substantially cylindrical bundle of at least one of 7, 19, 37 or 61 carbon fiber filaments.

C15. The graphene-augmented carbon fiber of claim C14, wherein the functionalized graphene film is about 0.5 microns to about 10 microns wide.

C16. The graphene-augmented carbon fiber of claim C14, wherein the functionalized graphene film comprises holes formed through the graphene film.

C17. The graphene-augmented carbon fiber of claim C16, wherein the holes are substantially circular and have a diameter of 1-20 nanometers.

C18. The graphene-augmented carbon fiber of claim C16, wherein the holes have a size of greater than about 100 carbon atoms.

C21. The graphene-augmented carbon fiber of claim C18, wherein the functionalized graphene film has a density of holes in the range of about 4 E7 to about 4 E10 holes per square millimeter, or about one hole per 1,000 to 1 million carbon atoms.

C20. The graphene-augmented carbon fiber of claim C16, wherein the functionalized graphene film is wrapped about the substantially cylindrical bundle of at least one of 7, 19, 37 or 61 carbon fiber filaments in a spiral orientation.

C21. The graphene-augmented carbon fiber of claim C20, wherein the functionalized graphene film is wrapped about the cylindrical bundle of at least one of 7, 19, 37 or 61 carbon fiber filaments to a thickness of about 0.1 to about 3.0 microns to form about 300 to about 9,000 layers of the graphene film on top of the carbon fiber filaments.

C22. The graphene-augmented carbon fiber of claim C16, wherein the functionalized graphene film has benzoxazine groups formed on an outer surface of the graphene film and epoxide groups formed on at least one edge of the graphene film.

C23. The graphene-augmented carbon fiber of claim C22, wherein the benzoxazine groups are formed in a functionalized area on the outer surface of the functionalized graphene film that is within about 10 microns from the at least one edge of the graphene film.

C24. A graphene-augmented bed of carbon fiber, comprising a functionalized graphene film wrapped around a substantially rectangular bed of carbon fiber filaments separated from a plurality of carbon fiber tows, the functionalized graphene film having benzoxazine groups formed on an outer surface of the graphene film and epoxide groups formed on at least one edge of the graphene film.

C25. The graphene-augmented bed of carbon fiber of claim C24, wherein the substantially rectangular bed of carbon fiber filaments is about 12 inches wide and about 250 microns thick.

C26. The graphene-augmented bed of carbon fiber of claim C24, wherein the substantially rectangular bed of carbon fiber filaments comprises about 600,000 of the carbon fiber filaments.

C27. The graphene-augmented bed of carbon fiber of claim C24, wherein the functionalized graphene film is about 0.5 microns to about 100 microns wide.

C28. The graphene-augmented bed of carbon fiber of claim C24, wherein the functionalized graphene film comprises substantially circular holes formed through the graphene film having a diameter of 1-20 nanometers.

C29. The graphene-augmented bed of carbon fiber of claim C28, wherein the functionalized graphene film has a density of holes in the range of about 4 E7 to about 4 E10 holes per square millimeter, or about one hole per 1,000 to 1 million carbon atoms.

C30. The graphene-augmented bed of carbon fiber of claim C24, wherein the functionalized graphene film is wrapped about the rectangular bed of carbon fiber filaments in a spiral orientation.

C31. The graphene-augmented bed of carbon fiber of claim C30, wherein the graphene film is wrapped about the rectangular bed of carbon fiber filaments to a thickness of about 0.1 to about 3.0 microns to form about 300 to about 9,000 layers of the functionalized graphene film on top of the carbon fiber filaments.

C32. The graphene-augmented bed of carbon fiber of claim C24, wherein the benzoxazine groups are formed in a functionalized area on the outer surface of the functionalized graphene film that is within about 10 microns from the at least one edge of the graphene film.

C33. A composite material comprising the graphene-augmented carbon fiber of claim C1 and a matrix material.

C34. A composite material comprising the graphene-augmented carbon fiber of claim C15 and a matrix material.

C35. A composite material comprising the graphene-augmented carbon fiber of claim C24 and a matrix material.

C36. A method of increasing strength of a composite material comprising carbon reinforcement fibers and a resin matrix material, the method comprising:
  forming benzoxazine groups on an outer surface of a graphene film and epoxide groups on at least one edge of the graphene film to form a functionalized graphene film;
  wrapping the functionalized graphene film about each of the carbon reinforcement fibers in a spiral orientation to form graphene-augmented carbon fibers;
  combining the resin matrix material with a plurality of the graphene-augmented carbon fibers to form a prepreg material; and
  curing the prepreg material to form the composite material.

C37. The method of claim 36, wherein each of the carbon reinforcement fibers in the graphene-augmented carbon fibers comprises a carbon fiber filament.

C38. The method of claim C36, wherein each of the carbon reinforcement fibers in the graphene-augmented carbon fibers comprises a substantially cylindrical bundle of at least one of 7, 19, 37 or 61 carbon fiber filaments.

C39. The method of claim C36, wherein each of the carbon reinforcement fibers in the graphene-augmented carbon fibers comprises a substantially rectangular bed of carbon fiber filaments separated from a plurality of carbon fiber tows.

C40. The method of claim C36, wherein the benzoxazine groups are formed on the outer surface of the graphene film in a functionalized area that is within about 10 microns from the at least one edge of the graphene film.

C41. The method of claim C36, wherein the functionalized graphene film is wrapped about the carbon reinforcement fibers to a thickness of about 0.1 to about 3.0 microns to form about 300 to about 9,000 layers of the functionalized graphene film on top of the carbon fiber.

C42. The method of claim C36, further comprising forming holes through the functionalized graphene film having a substantially circular shape and a diameter of 1-20 nanometers.

C43. The method of claim C42, wherein the functionalized graphene film has a density of holes in the range of about 4 E7 to about 4 E10 holes per square millimeter, or about one hole per 1,000 to 1 million carbon atoms.

C44. The method of claim C42, wherein the step of wrapping the functionalized graphene film about each of the carbon reinforcement fibers comprises wrapping the functionalized graphene film to a thickness of about 0.1 to about 3.0 microns to form about 300 to about 9,000 layers of the graphene film on top of the bed of carbon reinforcement fibers.

D1. A graphene-augmented carbon fiber comprising a functionalized graphene film disposed about a carbon fiber filament, the functionalized graphene film having imide groups formed on an outer surface of the graphene film.

D2. The graphene-augmented carbon fiber of claim D1, wherein the functionalized graphene film is wrapped about the carbon fiber filament in a spiral orientation.

D3. The graphene-augmented carbon fiber of claim D2, wherein the functionalized graphene film is wrapped about the carbon fiber filament to a thickness of about 0.1 to about 3.0 microns to form about 300 to about 9,000 layers of the functionalized graphene film on top of the carbon fiber filament.

D4. The graphene-augmented carbon fiber of claim D1, wherein the imide groups are formed in a functionalized area on the outer surface of the functionalized graphene film that is within about 10 microns from the at least one edge of the functionalized graphene film.

D5. The graphene-augmented carbon fiber of claim D4, wherein the imide groups in the functionalized area on the outer surface of the functionalized graphene film have a surface density of about 4.0 E10 to about 2.0 E12 groups per square millimeter of the functionalized area.

D6. The graphene-augmented carbon fiber of claim D4, wherein about 0.1% to about 5.0% of carbon atoms in the functionalized area of the functionalized graphene film have imide groups bonded thereto.

D7. The graphene-augmented carbon fiber of claim D3, wherein the functionalized graphene film is about 0.5 microns to about 100 microns wide.

D8. The graphene-augmented carbon fiber of claim D3, wherein the functionalized graphene film further comprises at least one hole formed through the graphene film.

D9. The graphene-augmented carbon fiber of claim D8, wherein the holes are substantially circular and have a diameter of 1-2 nanometers.

D10. The graphene-augmented carbon fiber of claim D8, wherein the functionalized graphene film has a density of holes in the range of about 4 E7 to about 4 E10 holes per square millimeter, or about one hole per 1,000 to 1 million carbon atoms.

D11. The graphene-augmented carbon fiber of claim D8, wherein the holes have a size of about 12-80 carbon atoms.

D12. The graphene-augmented carbon fiber of claim D1, wherein the functionalized graphene film is wrapped around a substantially cylindrical bundle of at least one of 7, 19, 37 or 61 carbon fiber filaments.

D13. The graphene-augmented carbon fiber of claim D12, wherein the functionalized graphene film is about 0.5 microns to about 10 microns wide.

D14. The graphene-augmented carbon fiber of claim D12, wherein the functionalized graphene film comprises holes formed through the graphene film.

D15. The graphene-augmented carbon fiber of claim D14, wherein the holes are substantially circular and have a diameter of 1-20 nanometers.

D16. The graphene-augmented carbon fiber of claim D14, wherein the holes have a size of greater than about 100 carbon atoms.

D17. The graphene-augmented carbon fiber of claim D16, wherein the functionalized graphene film has a density of holes in the range of about 4 E7 to about 4 E10 holes per square millimeter, or about one hole per 1,000 to 1 million carbon atoms.

D18. The graphene-augmented carbon fiber of claim D14, wherein the functionalized graphene film is wrapped about the substantially cylindrical bundle of at least one of 7, 19, 37 or 61 carbon fiber filaments in a spiral orientation.

D19. The graphene-augmented carbon fiber of claim D18, wherein the functionalized graphene film is wrapped about the cylindrical bundle of at least one of 7, 19, 37 or 61 carbon fiber filaments to a thickness of about 0.1 to about 3.0 microns to form about 300 to about 9,000 layers of the graphene film on top of the carbon fiber filaments.

D20. A graphene-augmented bed of carbon fiber, comprising a functionalized graphene film wrapped around a substantially rectangular bed of carbon fiber filaments separated from a plurality of carbon fiber tows, the functionalized graphene film having imide groups formed on an outer surface of the graphene film.

D21. The graphene-augmented bed of carbon fiber of claim D20, wherein the substantially rectangular bed of carbon fiber filaments is about 12 inches wide and about 250 microns thick.

D22. The graphene-augmented bed of carbon fiber of claim D20, wherein the substantially rectangular bed of carbon fiber filaments comprises about 600,000 of the carbon fiber filaments.

D23. The graphene-augmented bed of carbon fiber of claim D20, wherein the functionalized graphene film is about 0.5 microns to about 100 microns wide.

D24. The graphene-augmented bed of carbon fiber of claim D20, wherein the functionalized graphene film comprises substantially circular holes formed through the graphene film having a diameter of 1-20 nanometers.

D25. The graphene-augmented bed of carbon fiber of claim D24, wherein the functionalized graphene film has a density of holes in the range of about 4 E7 to about 4 E10 holes per square millimeter, or about one hole per 1,000 to 1 million carbon atoms.

D26. The graphene-augmented bed of carbon fiber of claim D20, wherein the functionalized graphene film is wrapped about the rectangular bed of carbon fiber filaments in a spiral orientation.

D27. The graphene-augmented bed of carbon fiber of claim D26, wherein the graphene film is wrapped about the rectangular bed of carbon fiber filaments to a thickness of about 0.1 to about 3.0 microns to form about 300 to about 9,000 layers of the functionalized graphene film on top of the carbon fiber filaments.

D28. The graphene-augmented bed of carbon fiber of claim D20, wherein the imide groups are formed in a functionalized area on the outer surface of the functionalized graphene film that is within about 10 microns from the at least one edge of the graphene film.

D29. A composite material comprising the graphene-augmented carbon fiber of claim D1 and a matrix material.

D30. A composite material comprising the graphene-augmented carbon fiber of claim D13 and a matrix material.

D31. A composite material comprising the graphene-augmented carbon fiber of claim D20 and a matrix material.

D32. A method of increasing strength of a composite material comprising carbon reinforcement fibers and a resin matrix material, the method comprising:
forming imide groups on an outer surface of a graphene film to form a functionalized graphene film;
wrapping the functionalized graphene film about each of the carbon reinforcement fibers in a spiral orientation to form graphene-augmented carbon fibers;
combining the resin matrix material with a plurality of the graphene-augmented carbon fibers to form a prepreg material; and
curing the prepreg material to form the composite material.

D33. The method of claim D32, wherein each of the carbon reinforcement fibers in the graphene-augmented carbon fibers comprises a carbon fiber filament.

D34. The method of claim D32, wherein each of the carbon reinforcement fibers in the graphene-augmented carbon fibers comprises a substantially cylindrical bundle of at least one of 7, 19, 37 or 61 carbon fiber filaments.

D35. The method of claim D32, wherein each of the carbon reinforcement fibers in the graphene-augmented carbon fibers comprises a substantially rectangular bed of carbon fiber filaments separated from a plurality of carbon fiber tows.

D36. The method of claim D32, wherein the imide groups are formed on the outer surface of the graphene film in a functionalized area that is within about 10 microns from the at least one edge of the graphene film.

D37. The method of claim D32, wherein the functionalized graphene film is wrapped about the carbon reinforcement fibers to a thickness of about 0.1 to about 3.0 microns to form about 300 to about 9,000 layers of the functionalized graphene film on top of the carbon fiber.

D38. The method of claim D32, further comprising forming holes through the functionalized graphene film having a substantially circular shape and a diameter of 1-20 nanometers.

D39. The method of claim D38, wherein the functionalized graphene film has a density of holes in the range of about 4 E7 to about 4 E10 holes per square millimeter, or about one hole per 1,000 to 1 million carbon atoms.

D40. The method of claim D38, wherein the step of wrapping the functionalized graphene film about each of the carbon reinforcement fibers comprises wrapping the functionalized graphene film to a thickness of about 0.1 to about 3.0 microns to form about 300 to about 9,000 layers of the graphene film on top of the bed of carbon reinforcement fibers.

E1. A composite prepreg material comprising a plurality of layers of graphene film having a size that spans an entire width and an entire length of the composite prepreg material, each of the layers of graphene film being functionalized with holes formed through the graphene film, benzoxazine groups formed on both an upper and a lower surface of the graphene film and/or epoxide groups formed on at least one edge of the graphene film.

E2. The composite prepreg material of claim E1, wherein the layers of graphene film are stacked on top of one another such that upper and lower surfaces of adjacent layers of the graphene film are in contact.

E3. The composite prepreg material of claim E2, wherein the adjacent layers of the graphene film are bonded together through epoxy-benzoxazine bonds.

E4. The composite prepreg material of claim E3, wherein the graphene film is functionalized with holes having a size of about 12-80 carbon atoms, benzoxazine groups having a surface density on both the upper and the lower surface of the graphene film of about 4.0 E10 to about 4.0 E13 groups per square millimeter of the graphene film and epoxide groups formed on the at least one edge of about 7,000 to about 1,400,000 groups per millimeter.

E5. The composite prepreg material of claim E4, wherein the graphene film further comprises a density of benzoxazine monomers of about 1.0 E−3 to about 4.0 E−2 grams per square meter.

E6. The composite prepreg material of claim E3, wherein the graphene film is functionalized with holes having a size of about 12-80 carbon atoms, benzoxazine groups having a surface density on both the upper and the lower surface of the graphene film of about 4.0 E12 to about 4.0 E13 groups per square millimeter of the graphene film, and a density of benzoxazine monomers on at least one surface of the graphene film about 1.0 E−3 to about 4.0 E−2 grams per square meter.

E7. The composite prepreg material of claim E3, wherein the graphene film is functionalized with holes having a size of about 6-19 carbon atoms, benzoxazine groups having a surface density on both the upper and the lower surface of the graphene film of about 4.0 E10 to about 4.0 E13 groups per square millimeter of the graphene film and epoxide groups formed on the at least one edge of about 7,000 to about 1,400,000 groups per millimeter.

E8. The composite prepreg material of claim E1, wherein the graphene film has a density of holes in the range of about 4 E7 to about 4 E10 holes per square millimeter, or about one hole per 1,000 to 1 million carbon atoms.

E9. The composite prepreg material of claim E1, wherein the graphene film is folded to form a crumpled graphene sheet having a height that spans an entire height of the composite prepreg material.

E10. The composite prepreg material of claim E10, wherein the graphene film is functionalized with holes having a size of greater than about 100 carbon atoms, benzoxazine groups having a surface density on both the upper and the lower surface of the graphene film of about 4.0 E10 to about 4.0 E13 groups per square millimeter of the graphene film and epoxide groups formed on the at least one edge of about 7,000 to about 1,400,000 groups per millimeter E11. The composite prepreg material of claim E10, wherein the graphene film further comprises a density of amine monomers and epoxy monomers on at least one surface of the graphene film in the range of about 1.0 E−3 to about 4.0 E−2 grams per square meter.

E12. The composite prepreg material of claim E9, wherein the graphene film further comprises lines extending across a width of the graphene film where some portion of carbon bonds in the graphene film have been modified to permit the graphene film to preferentially fold along the lines.

E13. A method of making a composite prepreg material comprising the steps of:
forming a plurality of layers of graphene film functionalized with holes formed through the graphene films, benzoxazine groups formed on both an upper and a lower surface of the graphene film and/or epoxide groups formed on at least one edge of the graphene film and having a size that spans an entire width and an entire length of the composite prepreg material; and
laminating the plurality of layers of graphene film to form the composite prepreg material.

E14. The method of claim E13, wherein forming the plurality of layers of graphene film comprises stacking the plurality of layers on top of one another such that upper and lower surfaces of adjacent layers of the graphene film are in contact.

E15. The method of claim E14, wherein laminating the plurality of layers of the graphene film comprises applying heat to form epoxy-benzoxazine bonds between the adjacent layers of graphene film.

E16. The method of claim E15, wherein the graphene film is functionalized with holes having a size of about 12-80 carbon atoms, benzoxazine groups having a surface density on both the upper and the lower surface of the graphene film of about 4.0 E10 to about 4.0 E13 groups per square millimeter of the graphene film and epoxide groups formed on the at least one edge of about 7,000 to about 1,400,000 groups per millimeter.

E17. The method of claim E16, wherein the graphene film further comprises a density of benzoxazine in the range of about 1.0 E−3 to about 4.0 E−2 grams per square meter.

E18. The method of claim E16, wherein the graphene film is functionalized with holes having a size of about 12-80 carbon atoms, benzoxazine groups having a surface density on both the upper and the lower surface of the graphene film of about 4.0 E12 to about 4.0 E13 groups per square millimeter of the graphene film, and a density of benzoxazine monomers on at least one surface of the graphene film about 1.0 E−3 to about 4.0 E−2 grams per square meter.

E19. The method of claim E14, wherein the graphene film is functionalized with holes having a size of about 6-19 carbon atoms, benzoxazine groups having a surface density on both the upper and the lower surface of the graphene film of about 4.0 E10 to about 4.0 E13 groups per square millimeter of the graphene film and epoxide groups formed on the at least one edge of about 7,000 to about 1,400,000 groups per millimeter.

E20. The method of claim E14, wherein the graphene film has a density of holes in the range of about 4 E7 to about 4 E10 holes per square millimeter, or about one hole per 1,000 to 1 million carbon atoms.

E21. The method of claim E14, wherein forming the plurality of graphene layers comprises folding the graphene film to form a crumpled graphene sheet having a height that spans an entire height of the composite prepreg material.

E22. The method of claim E21, wherein the graphene film is functionalized with holes having a size of greater than about 100 carbon atoms, benzoxazine groups having a surface density on both the upper and the lower surface of the graphene film of about 4.0 E10 to about 4.0 E13 groups per square millimeter of the graphene film and epoxide groups formed on the at least one edge of about 7,000 to about 1,400,000 groups per millimeter.

E23. The method of claim E21, wherein the graphene film further comprises a density of benzoxazine monomers on at least one surface of the graphene film in the range of about 1.0 E−3 to about 4.0 E−2 grams per square meter.

E24. The method of claim E21, further comprising modifying a portion of carbon bonds in the graphene film along lines extending across a width of the graphene film, and folding the graphene film along the lines.

E25. The method of claim E21, further comprising impregnating a film of resin onto both a top and a bottom of the crumpled graphene sheet.

E26. The method of claim E21, further comprising forming the crumpled graphene sheet into a final product shape, infusing a resin into the crumpled graphene sheet via resin transfer molding and curing the crumpled graphene sheet to form a composite material.

F1. A composite prepreg material comprising a plurality of layers of graphene film having a size that spans an entire width and an entire length of the composite prepreg material, each of the layers of graphene film being functionalized with holes formed through the graphene film and imide groups formed on both an upper and a lower surface of the graphene film.

F2. The composite prepreg material of claim F1, wherein the layers of graphene film are stacked on top of one another such that upper and lower surfaces of adjacent layers of the graphene film are in contact.

F3. The composite prepreg material of claim F2, wherein the adjacent layers of the graphene film are bonded together through amine-imide bonds.

F4. The composite prepreg material of claim F3, wherein the graphene film is functionalized with holes having a size of about 12-80 carbon atoms and imide groups having a surface density on both the upper and the lower surface of the graphene film of about 4.0 E10 to about 4.0 E13 groups per square millimeter of the graphene film.

F5. The composite prepreg material of claim F4, wherein the graphene film further comprises a density of imide monomers of about 1.0 E−3 to about 4.0 E−2 grams per square meter.

F6. The composite prepreg material of claim F3, wherein the graphene film is functionalized with holes having a size of about 12-80 carbon atoms, imide groups having a surface density on both the upper and the lower surface of the graphene film of about 4.0 E12 to about 4.0 E13 groups per square millimeter of the graphene film, and a density of benzoxazine monomers on at least one surface of the graphene film about 1.0 E−3 to about 4.0 E−2 grams per square meter.

F7. The composite prepreg material of claim F3, wherein the graphene film is functionalized with holes having a size of about 6-19 carbon atoms and imide groups having a surface density on both the upper and the lower surface of the graphene film of about 4.0 E10 to about 4.0 E13 groups per square millimeter of the graphene film.

F8. The composite prepreg material of claim F1, wherein the graphene film has a density of holes in the range of about 4 E7 to about 4 E10 holes per square millimeter, or about one hole per 1,000 to 1 million carbon atoms.

F9. The composite prepreg material of claim F1, wherein the graphene film is folded to form a crumpled graphene sheet having a height that spans an entire height of the composite prepreg material.

F10. The composite prepreg material of claim F1, wherein the graphene film is functionalized with holes having a size of greater than about 100 carbon atoms and imide groups having a surface density on both the upper and the lower surface of the graphene film of about 4.0 E10 to about 4.0 E13 groups per square millimeter of the graphene film.

F11. The composite prepreg material of claim F10, wherein the graphene film further comprises a density of amine monomers and epoxy monomers on at least one surface of the graphene film in the range of about 1.0 E−3 to about 4.0 E−2 grams per square meter.

F12. The composite prepreg material of claim F9, wherein the graphene film further comprises lines extending across a width of the graphene film where some portion of carbon bonds in the graphene film have been modified to permit the graphene film to preferentially fold along the lines.

F13. A method of making a composite prepreg material comprising the steps of:
forming a plurality of layers of graphene film functionalized with holes formed through the graphene films and imide groups formed on both an upper and a lower surface of the graphene film and having a size that spans an entire width and an entire length of the composite prepreg material; and laminating the plurality of layers of graphene film to form the composite prepreg material.

F14. The method of claim F13, wherein forming the plurality of layers of graphene film comprises stacking the plurality of layers on top of one another such that upper and lower surfaces of adjacent layers of the graphene film are in contact.

F15. The method of claim F14, wherein laminating the plurality of layers of the graphene film comprises applying heat to form amine-imide bonds between the adjacent layers of graphene film.

F16. The method of claim F15, wherein the graphene film is functionalized with holes having a size of about 12-80 carbon atoms and imide groups having a surface density on both the upper and the lower surface of the graphene film of about 4.0 E10 to about 4.0 E13 groups per square millimeter of the graphene film.

F17. The method of claim F16, wherein the graphene film further comprises a density of imide monomers in the range of about 1.0 E−3 to about 4.0 E−2 grams per square meter.

F18. The method of claim F16, wherein the graphene film is functionalized with holes having a size of about 12-80 carbon atoms and imide groups having a surface density on both the upper and the lower surface of the graphene film of about 4.0 E12 to about 4.0 E13 groups per square millimeter of the graphene film, and a density of imide monomers on at least one surface of the graphene film about 1.0 E−3 to about 4.0 E−2 grams per square meter.

F19. The method of claim F14, wherein the graphene film is functionalized with holes having a size of about 6-19 carbon atoms and imide groups having a surface density on both the upper and the lower surface of the graphene film of about 4.0 E10 to about 4.0 E13 groups per square millimeter of the graphene film.

F20. The method of claim F14, wherein the graphene film has a density of holes in the range of about 4 E7 to about 4 E10 holes per square millimeter, or about one hole per 1,000 to 1 million carbon atoms.

F21. The method of claim F14, wherein forming the plurality of graphene layers comprises folding the graphene film to form a crumpled graphene sheet having a height that spans an entire height of the composite prepreg material.

F22. The method of claim F21, wherein the graphene film is functionalized with holes having a size of greater than about 100 carbon atoms and imide groups having a surface density on both the upper and the lower surface of the graphene film of about 4.0 E10 to about 4.0 E13 groups per square millimeter of the graphene film.

F23. The method of claim F21, wherein the graphene film further comprises a density of imide monomers on at least one surface of the graphene film in the range of about 1.0 E−3 to about 4.0 E−2 grams per square meter.

F24. The method of claim F21, further comprising modifying a portion of carbon bonds in the graphene film along lines extending across a width of the graphene film, and folding the graphene film along the lines.

F25. The method of claim F21, further comprising impregnating a film of resin onto both a top and a bottom of the crumpled graphene sheet.

F26. The method of claim F21, further comprising forming the crumpled graphene sheet into a final product shape, infusing a resin into the crumpled graphene sheet via resin transfer molding and curing the crumpled graphene sheet to form a composite material.

G1. A graphene fiber comprising a graphene film formed into an elongated fiber-like shape and having benzoxazine groups formed on at least an outer surface of the graphene film and epoxide groups formed on at least one edge of the graphene film.

G2. The graphene fiber of claim G1, wherein the graphene film has a linear density of epoxide groups formed on the at least one edge of about 7,000 to about 700,000 groups per millimeter.

G3. The graphene fiber of claim G1, wherein about 0.1% to about 10% of carbon atoms at the least one edge of the graphene film have epoxide groups bonded thereto.

G4. The graphene fiber of claim G1, wherein the elongated fiber-like shape comprises the graphene film in a rolled spiral orientation.

G5. The graphene fiber of claim G4, wherein the benzoxazine groups are formed in a functionalized area on the outer surface of the graphene film that is within about 10 microns from the at least one edge of the graphene film.

G6. The graphene fiber of claim G5, wherein the benzoxazine groups in the functionalized area on the outer surface of the graphene film have a surface density of about 4.0 E10 to about 2.0 E12 groups per square millimeter of the functionalized area.

G7. The graphene fiber of claim G5, wherein about 0.1% to about 5.0% of carbon atoms in the functionalized area of the graphene film have benzoxazine groups bonded thereto.

G8. The graphene fiber of claim G4, wherein the graphene fiber has a diameter of about 1 to about 7 microns and a circumference of about 3 to about 22 microns.

G9. The graphene fiber of claim G4, wherein the elongated fiber-like shape has a center hollow area having a diameter of less than 500 nanometers.

G10. The graphene fiber of claim G4, wherein the spiral orientation comprises the graphene film rolled at an angle less than 0.6 degrees and overlapping layers of the graphene film.

G11. The graphene fiber of claim G1, wherein the elongated fiber-like shape comprises the graphene film in a twisted formation.

G12. The graphene fiber of claim G11, wherein the benzoxazine groups on the outer surface of the graphene film have a surface density of about 4.0 E10 to about 2.0 E12 groups per square millimeter of the outer surface of the graphene film.

G13. The graphene fiber of claim G1, wherein the graphene film further comprises at least one hole formed through the graphene film.

G14. The graphene fiber of claim G13, wherein the at least one hole is substantially circular and has a diameter of 1-2 nanometers.

G15. The graphene fiber of claim G13, wherein the graphene film has a density of holes in the range of about 4 E7 to about 4 E10 holes per square millimeter, or about one hole per 1,000 to 1 million carbon atoms.

G16. The graphene fiber of claim G13, wherein the at least one hole has a size of about 12-80 carbon atoms.

G17. The graphene fiber of claim G13, wherein the benzoxazine groups on the outer surface of the graphene film have a surface density of about 4.0 E10 to about 2.0 E12 groups per square millimeter of the outer surface of the graphene film.

G18. The graphene fiber of claim G13, wherein the graphene film has a linear density of epoxide groups formed on all edges of the graphene film of about 7,000 to about 700,000 groups per millimeter.

G19. The graphene fiber of claim G13, wherein about 0.1% to about 10% of carbon atoms at all edges of the graphene film have epoxide groups bonded thereto.

G20. The graphene fiber of claim G13, wherein the elongated fiber-like shape comprises the graphene film in a rolled spiral orientation.

G21. The graphene fiber of claim G13, wherein the elongated fiber-like shape comprises the graphene film in a twisted formation.

G22. The graphene fiber of claim G1, wherein the graphene film is about 50 microns to about 500 microns wide.

G23. A composite material comprising the graphene fiber of claim G1 and a matrix material.

G24. A method of increasing strength of a composite material, the method comprising:
    forming a graphene fiber comprising a graphene film formed into an elongated fiber-like shape and having benzoxazine groups formed on at least an outer surface of the graphene film and epoxide groups formed on at least one edge of the graphene film;
    combining a resin matrix material with a plurality of the graphene fibers to form a prepreg material; and
    curing the prepreg material to form the composite material.

G25. The method of claim G24, wherein the step of forming the graphene fiber comprises rolling the graphene film in a spiral orientation to form the elongated fiber-like shape of the graphene fiber.

G26. The method of claim G25, wherein the step of forming the graphene fiber further comprises forming the graphene fiber with a diameter of about 1 to about 7 microns, a circumference of about 3 to about 22 microns, and a center hollow area having a diameter of less than 500 nanometers.

G27. The method of claim G25, wherein the step of forming the graphene fiber further comprises maintaining a tension in the graphene film at about 0.001 N per meter of film width.

G28. The method of claim G24, wherein the step of forming the graphene fiber comprises twisting the graphene film to form the elongated fiber-like shape.

G29. The method of claim G24, wherein the step of forming the graphene fiber further comprises forming at least one hole in the graphene film.

G30. The method of claim G24, wherein the step of forming the graphene fiber further comprises forming benzoxazine groups in a functionalized area on the outer surface of the graphene film that is within about 10 microns from the at least one edge of the graphene film.

G31. The method of claim G29, wherein the at least one hole is formed in a substantially circular shape with a diameter of 1-20 nanometers.

G32. The method of claim G31, wherein the graphene film has a density of holes in the range of about 4 E7 to about 4 E10 holes per square millimeter, or about one hole per 1,000 to 1 million carbon atoms.

G33. The method of claim G24, further comprising combining carbon fiber with the graphene fiber to form the prepreg material.

H1. A graphene fiber comprising a graphene film formed into an elongated fiber-like shape and having imide groups formed on at least an outer surface of the graphene film.

H2. The graphene fiber of claim H1, wherein the elongated fiber-like shape comprises the graphene film in a rolled spiral orientation.

H3. The graphene fiber of claim H2, wherein the imide groups are formed in a functionalized area on the outer surface of the graphene film that is within about 10 microns from the at least one edge of the graphene film.

H4. The graphene fiber of claim H3, wherein the imide groups in the functionalized area on the outer surface of the graphene film have a surface density of about 4.0 E10 to about 2.0 E12 groups per square millimeter of the functionalized area.

H5. The graphene fiber of claim H3, wherein about 0.1% to about 5.0% of carbon atoms in the functionalized area of the graphene film have imide groups bonded thereto.

H6. The graphene fiber of claim H2, wherein the graphene fiber has a diameter of about 1 to about 7 microns and a circumference of about 3 to about 22 microns.

H7. The graphene fiber of claim H2, wherein the elongated fiber-like shape has a center hollow area having a diameter of less than 500 nanometers.

H8. The graphene fiber of claim H2, wherein the spiral orientation comprises the graphene film rolled at an angle less than 0.6 degrees and overlapping layers of the graphene film.

H9. The graphene fiber of claim H1, wherein the elongated fiber-like shape comprises the graphene film in a twisted formation.

H10. The graphene fiber of claim H9, wherein the imide groups on the outer surface of the graphene film have a surface density of about 4.0 E10 to about 2.0 E12 groups per square millimeter of the outer surface of the graphene film.

H11. The graphene fiber of claim H10, wherein the graphene film further comprises at least one hole formed through the graphene film.

H12. The graphene fiber of claim H11, wherein the at least one hole is substantially circular and has a diameter of 1-2 nanometers.

H13. The graphene fiber of claim H11, wherein the graphene film has a density of holes in the range of about 4 E7 to about 4 E10 holes per square millimeter, or about one hole per 1,000 to 1 million carbon atoms.

H14. The graphene fiber of claim H12, wherein the at least one hole has a size of about 12-80 carbon atoms.

H15. The graphene fiber of claim H11, wherein the imide groups on the outer surface of the graphene film have a surface density of about 4.0 E10 to about 2.0 E12 groups per square millimeter of the outer surface of the graphene film.

H16. The graphene fiber of claim H1, wherein the elongated fiber-like shape comprises the graphene film in a rolled spiral orientation.

H17. The graphene fiber of claim H1, wherein the elongated fiber-like shape comprises the graphene film in a twisted formation.

H18. The graphene fiber of claim H1, wherein the graphene film is about 50 microns to about 500 microns wide.

H19. A composite material comprising the graphene fiber of claim H1 and a matrix material.

H20. A method of increasing strength of a composite material, the method comprising:
forming a graphene fiber comprising a graphene film formed into an elongated fiber-like shape and having imide groups formed on at least an outer surface of the graphene film;
combining a resin matrix material with a plurality of the graphene fibers to form a prepreg material; and
curing the prepreg material to form the composite material.

H21. The method of claim H20, wherein the step of forming the graphene fiber comprises rolling the graphene film in a spiral orientation to form the elongated fiber-like shape of the graphene fiber.

H22. The method of claim H21, wherein the step of forming the graphene fiber further comprises forming the graphene fiber with a diameter of about 1 to about 7 microns, a circumference of about 3 to about 22 microns, and a center hollow area having a diameter of less than 500 nanometers.

H23. The method of claim H21, wherein the step of forming the graphene fiber further comprises maintaining a tension in the graphene film at about 0.001 N per meter of film width.

H24. The method of claim H20, wherein the step of forming the graphene fiber comprises twisting the graphene film to form the elongated fiber-like shape.

H25. The method of claim H20, wherein the step of forming the graphene fiber further comprises forming at least one hole in the graphene film.

H26. The method of claim H20, wherein the step of forming the graphene fiber further comprises forming imide groups in a functionalized area on the outer surface of the graphene film that is within about 10 microns from the at least one edge of the graphene film.

H27. The method of claim H25, wherein the at least one hole is formed in a substantially circular shape with a diameter of 1-20 nanometers.

H28. The method of claim H27, wherein the graphene film has a density of holes in the range of about 4 E7 to about 4 E10 holes per square millimeter, or about one hole per 1,000 to 1 million carbon atoms.

H29. The method of claim H20, further comprising combining carbon fiber with the graphene fiber to form the prepreg material.

Many other modifications and variations may of course be devised given the above description of various embodiments for implementing the principles in the present disclosure. For example, and without limitation, the same technology may be applied to fabric forms of prepreg materials where the carbon fibers are not aligned. It is intended that all such modifications and variations be considered as within the spirit and scope of this disclosure, as defined in the following claims.

The invention claimed is:

1. A graphene fiber comprising a graphene film formed into an elongated fiber-like shape and having imide groups formed on at least an outer surface of the graphene film.

2. The graphene fiber of claim 1, wherein the elongated fiber-like shape comprises the graphene film in a rolled spiral orientation.

3. The graphene fiber of claim 2, wherein the imide groups are formed in a functionalized area on the outer surface of the graphene film that is within about 10 microns from the at least one edge of the graphene film.

4. The graphene fiber of claim 3, wherein the imide groups in the functionalized area on the outer surface of the graphene film have a surface density of about 4.0 E10 to about 2.0 E12 groups per square millimeter of the functionalized area.

5. The graphene fiber of claim 3, wherein about 0.1% to about 5.0% of carbon atoms in the functionalized area of the graphene film have imide groups bonded thereto.

6. The graphene fiber of claim 3, wherein the graphene fiber has a diameter of about 1 to about 7 microns and a circumference of about 3 to about 22 microns.

7. The graphene fiber of claim 2, wherein the elongated fiber-like shape has a center hollow area having a diameter of less than 500 nanometers.

8. The graphene fiber of claim 2, wherein the spiral orientation comprises the graphene film rolled at an angle less than 0.6 degrees and overlapping layers of the graphene film.

9. The graphene fiber of claim 1, wherein the elongated fiber-like shape comprises the graphene film in a twisted formation.

10. The graphene fiber of claim 9, wherein the imide groups on the outer surface of the graphene film have a surface density of about 4.0 E10 to about 2.0 E12 groups per square millimeter of the outer surface of the graphene film.

11. The graphene fiber of claim 10, wherein the graphene film further comprises at least one hole having a diameter of 1-2 nanometers formed through the graphene film.

12. The graphene fiber of claim 11, wherein the graphene film has a density of holes in the range of about 4 E7 to about 4 E10 holes per square millimeter, or about one hole per 1,000 to 1 million carbon atoms.

13. The graphene fiber of claim 1, wherein the graphene film is about 50 microns to about 500 microns wide.

14. A composite material comprising the graphene fiber of claim 1 and a matrix material.

15. A method of increasing strength of a composite material, the method comprising:
forming a graphene fiber comprising a graphene film formed into an elongated fiber-like shape and having imide groups formed on at least an outer surface of the graphene film;
combining a resin matrix material with a plurality of the graphene fibers to form a prepreg material; and
curing the prepreg material to form the composite material.

16. The method of claim 15, wherein the step of forming the graphene fiber comprises rolling the graphene film in a spiral orientation to form the elongated fiber-like shape of the graphene fiber.

17. The method of claim 16, wherein the step of forming the graphene fiber further comprises forming the graphene fiber with a diameter of about 1 to about 7 microns, a circumference of about 3 to about 22 microns, and a center hollow area having a diameter of less than 500 nanometers.

18. The method of claim 16, wherein the step of forming the graphene fiber further comprises maintaining a tension in the graphene film at about 0.001 N per meter of film width.

19. The method of claim 15, wherein the step of forming the graphene fiber comprises twisting the graphene film to form the elongated fiber-like shape.

20. The method of claim 15, wherein the step of forming the graphene fiber further comprises forming at least one hole having a diameter of 1-20 nanometers in the graphene film.

21. The method of claim 15, wherein the step of forming the graphene fiber further comprises forming imide groups in a functionalized area on the outer surface of the graphene film that is within about 10 microns from the at least one edge of the graphene film.

22. The method of claim 20, wherein the graphene film has a density of holes in the range of about 4 E7 to about 4 E10 holes per square millimeter, or about one hole per 1,000 to 1 million carbon atoms.

* * * * *